(12) United States Patent
Williams et al.

(10) Patent No.: US 10,648,595 B2
(45) Date of Patent: May 12, 2020

(54) COMPONENT RETAINING STRUCTURE FOR CONDUIT FITTING

(71) Applicant: Swagelok Company, Solon, OH (US)

(72) Inventors: Peter C. Williams, Cleveland Heights, OH (US); Mark D. Bearer, Akron, OH (US); Cal R. Brown, Lyndhurst, OH (US); Stephen J. Zaborszki, Northfield, OH (US); Douglas S. Welch, Chesterland, OH (US); Ronald P. Campbell, Shaker Heights, OH (US); Gregory S. Kalata, Avon, OH (US); Douglas J. McClure, Mentor, OH (US)

(73) Assignee: Swagelok Company, Solon, OH (US)

( * ) Notice: Subject to any disclaimer, the term of this patent is extended or adjusted under 35 U.S.C. 154(b) by 126 days.

(21) Appl. No.: 15/912,632

(22) Filed: Mar. 6, 2018

(65) Prior Publication Data

US 2018/0195651 A1    Jul. 12, 2018

Related U.S. Application Data

(63) Continuation of application No. 15/416,048, filed on Jan. 26, 2017, now abandoned.
(Continued)

(51) Int. Cl.
*F16L 19/02* (2006.01)
*F16L 19/07* (2006.01)
(Continued)

(52) U.S. Cl.
CPC .............. *F16L 13/146* (2013.01); *F16L 19/02* (2013.01); *F16L 19/103* (2013.01)

(58) Field of Classification Search
CPC ......... F16L 13/146; F16L 19/02; F16L 19/06; F16L 19/065; F16L 19/103; F16L 19/106
See application file for complete search history.

(56) References Cited

U.S. PATENT DOCUMENTS

| 859,573 A | 7/1907 | McMillan |
| 1,906,266 A | 5/1933 | Hoffman |

(Continued)

FOREIGN PATENT DOCUMENTS

| CN | 201363452 | 12/2009 |
| CN | 202056344 | 11/2011 |

(Continued)

OTHER PUBLICATIONS

Office action from U.S. Appl. No. 15/248,288 dated Oct. 9, 2018.
(Continued)

*Primary Examiner* — Amber R Anderson
*Assistant Examiner* — Stacy N Lawson
(74) *Attorney, Agent, or Firm* — Calfee, Halter & Griswold LLP

(57) ABSTRACT

A preassembly for a conduit fitting includes an annular fitting component and a conduit gripping device. The annular fitting component has an interior wall extending along a central axis from an inboard end to an outboard end. The interior wall includes an inboard surface having a first diameter, an outboard surface having a second diameter smaller than the first diameter, and an intermediate surface recessed from the inboard surface by an outward facing inboard radial wall and recessed from the outboard surface by an inward facing outboard radial wall. The conduit gripping device is retained within the annular fitting component and includes a projection extending radially outward of an outer circumferential surface of the conduit gripping device, and axially toward an inboard end of the conduit gripping device, with an end portion of the projection being axially captured between the inboard radial wall and the outboard radial wall.

16 Claims, 55 Drawing Sheets

Related U.S. Application Data

(60) Provisional application No. 62/291,098, filed on Feb. 4, 2016, provisional application No. 62/417,457, filed on Nov. 4, 2016.

(51) Int. Cl.
  *F16L 19/10* (2006.01)
  *F16L 13/14* (2006.01)

(56) References Cited

U.S. PATENT DOCUMENTS

| | | | |
|---|---|---|---|
| 1,973,418 A | | 9/1934 | Sibley |
| 2,389,233 A | * | 11/1945 | Cowles ................ F16L 19/045 |
| | | | 285/116 |
| 2,547,889 A | | 4/1951 | Richardson |
| 2,839,074 A | | 6/1958 | Kaiser |
| 3,075,793 A | | 1/1963 | Lennon et al. |
| 3,077,201 A | | 2/1963 | Dumm |
| 3,077,895 A | | 2/1963 | Vickery |
| 3,168,280 A | | 2/1965 | Mueller |
| 3,472,270 A | | 10/1969 | Masheder |
| 3,588,042 A | | 6/1971 | Yopp |
| 3,675,893 A | | 7/1972 | Avelines |
| 3,679,239 A | * | 7/1972 | Schmitt ................ F16L 19/065 |
| | | | 285/148.22 |
| 3,695,640 A | * | 10/1972 | Clague .................. F16L 19/12 |
| | | | 285/116 |
| 4,342,330 A | | 8/1982 | Wieveg et al. |
| 4,936,545 A | | 6/1990 | Ferrero |
| 5,188,335 A | | 2/1993 | Pettinaroli |
| 5,360,036 A | | 11/1994 | Kieper |
| 5,361,801 A | | 11/1994 | Kerpan et al. |
| 5,833,277 A | * | 11/1998 | Reinert ................. F16L 37/092 |
| | | | 285/39 |
| 6,425,571 B1 | | 7/2002 | Schadewald et al. |
| 6,508,493 B1 | | 1/2003 | Guivarc'h |
| 6,640,457 B2 | | 11/2003 | Williams et al. |
| 6,988,709 B2 | | 1/2006 | Scaramucci |
| 7,234,682 B2 | | 6/2007 | Kitazawa et al. |
| 7,306,010 B2 | | 12/2007 | Gruener, Sr. |
| 7,506,665 B2 | | 3/2009 | Gruener, Sr. |
| 7,681,865 B2 | | 3/2010 | Furnival |
| 8,007,013 B2 | | 8/2011 | Arstein et al. |
| 8,783,656 B2 | | 7/2014 | Allison |
| 8,783,657 B2 | | 7/2014 | Yang et al. |
| 8,919,825 B2 | | 12/2014 | Nakata |
| 8,931,810 B2 | | 1/2015 | Clason et al. |
| 9,726,309 B1 | * | 8/2017 | Rowley ................ F16L 19/061 |
| 10,024,468 B2 | | 7/2018 | Trivett et al. |
| 2002/0145126 A1 | | 10/2002 | Lian |
| 2004/0041399 A1 | | 3/2004 | Chelchowski |
| 2004/0178382 A1 | | 9/2004 | Yun |
| 2005/0264005 A1 | * | 12/2005 | Norman ............... F16L 19/0206 |
| | | | 285/249 |
| 2006/0006651 A1 | * | 1/2006 | Watanabe ........... F16L 25/0036 |
| | | | 285/247 |
| 2007/0029795 A1 | * | 2/2007 | Moner ................. F16L 25/0036 |
| | | | 285/245 |
| 2010/0148501 A1 | | 6/2010 | Bennett et al. |
| 2011/0181042 A1 | | 7/2011 | Clason |
| 2011/0260088 A1 | | 10/2011 | Cunningham |
| 2013/0106103 A1 | | 5/2013 | Horsfall |
| 2014/0021719 A1 | * | 1/2014 | Salehi-Bakhtiari ... F16L 13/142 |
| | | | 285/374 |
| 2014/0232111 A1 | | 8/2014 | Shimamura |
| 2015/0323110 A1 | | 11/2015 | Trivett et al. |
| 2017/0059065 A1 | | 3/2017 | Williams |
| 2017/0227151 A1 | | 8/2017 | Williams |
| 2017/0261137 A1 | | 9/2017 | Williams |

FOREIGN PATENT DOCUMENTS

| | | |
|---|---|---|
| CN | 203009892 | 6/2013 |
| CN | 104350314 | 2/2015 |
| CN | 204187036 | 3/2015 |
| CN | 204922080 | 12/2015 |
| EP | 1000282 | 5/2000 |
| EP | 2180221 | 4/2010 |
| EP | 2762759 | 8/2014 |
| MX | 2009009674 | 3/2010 |
| WO | 2008/051955 | 5/2008 |
| WO | 2010/068762 | 6/2010 |
| WO | 2017/035439 | 3/2017 |

OTHER PUBLICATIONS

International Search Report and Written Opinion from PCT/US2017/015019 dated May 19, 2017.

International Search Report and Written Opinion from PCT/US2016/048891 dated Jan. 13, 2017.

\* cited by examiner

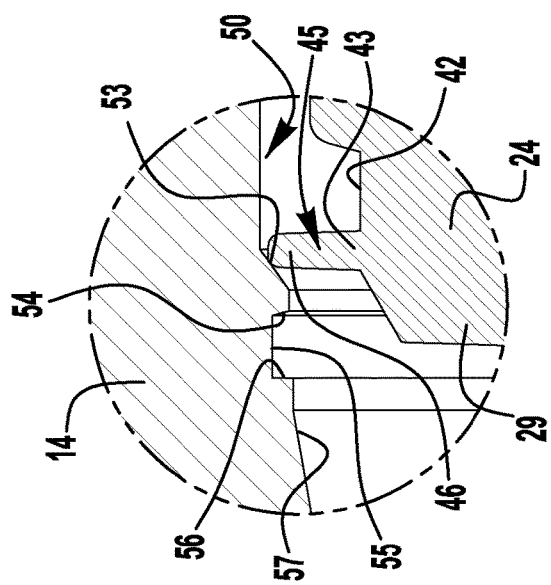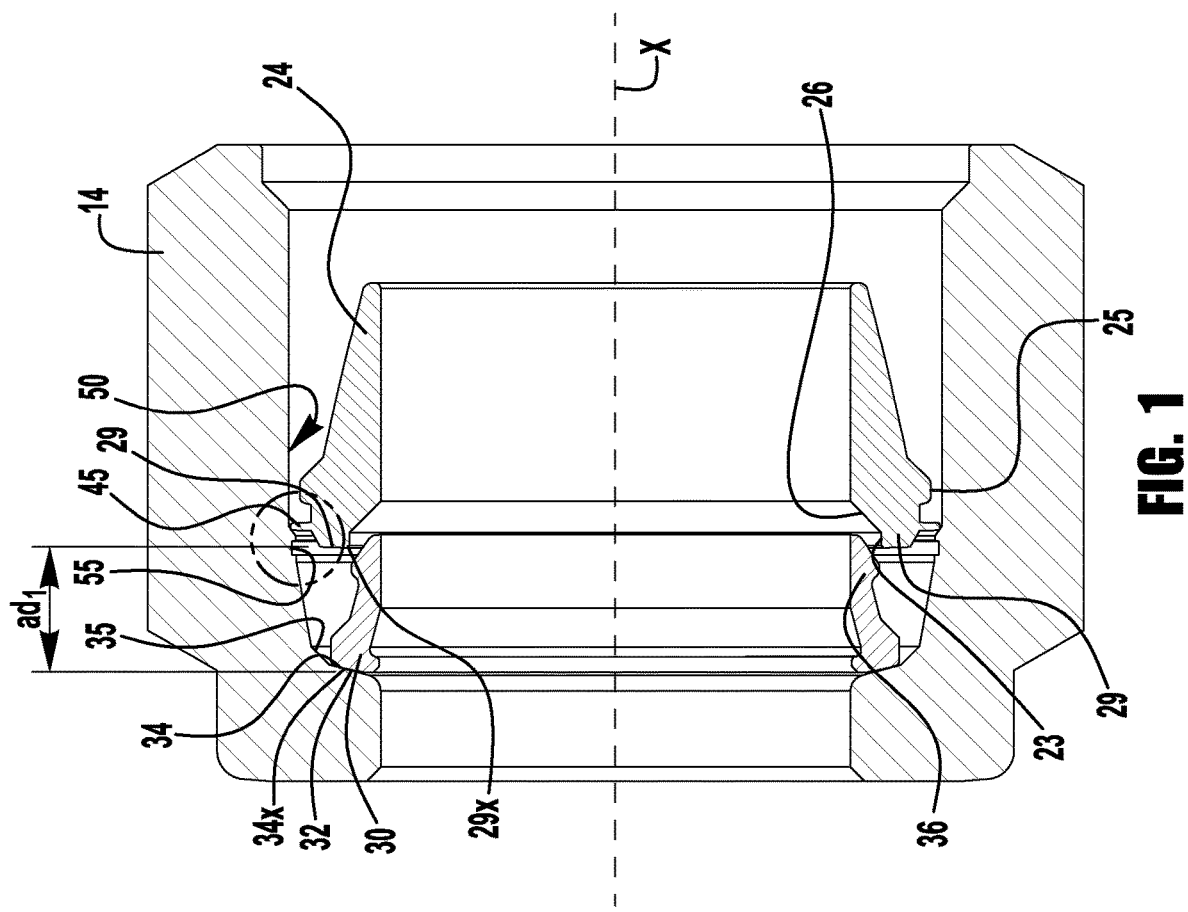

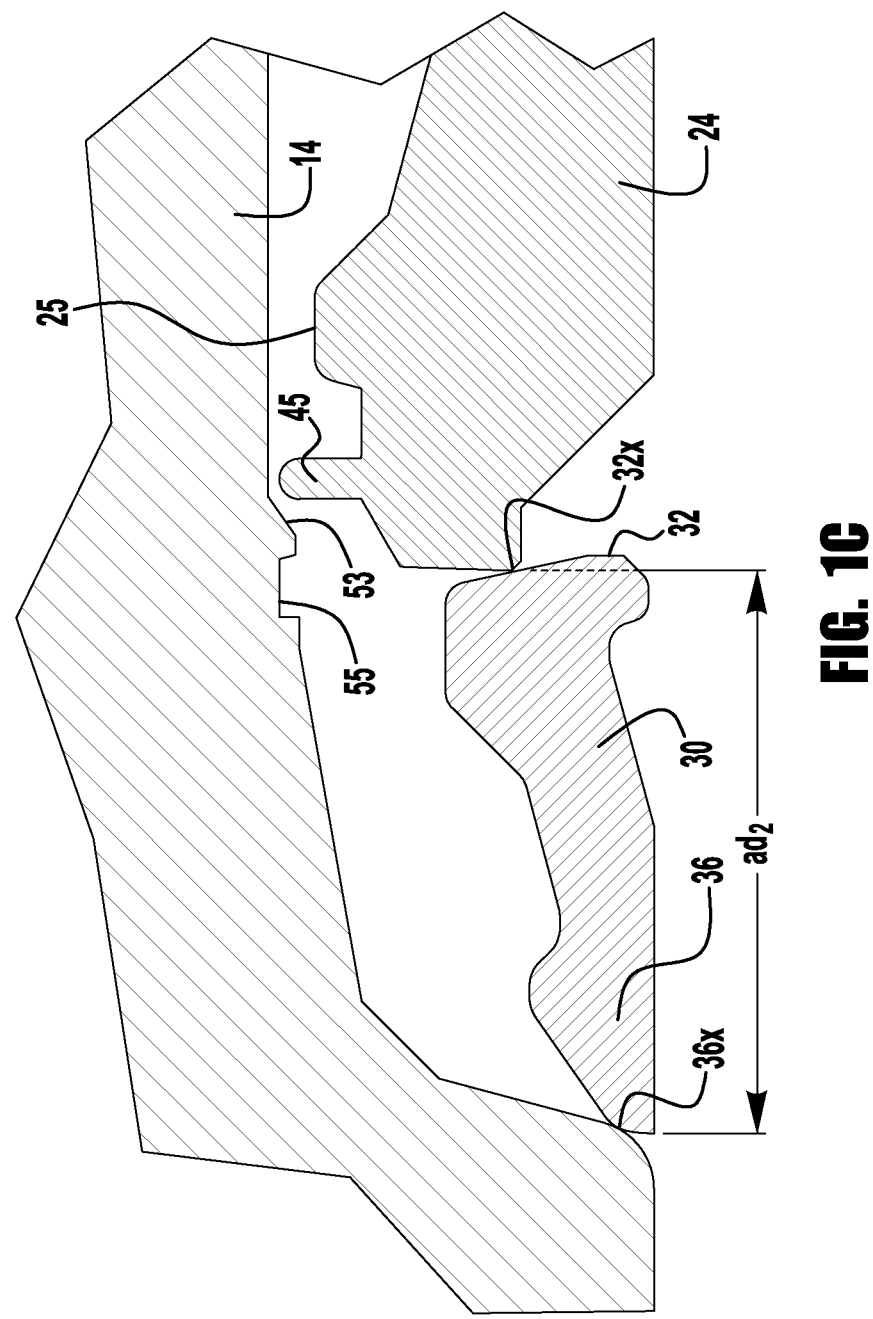

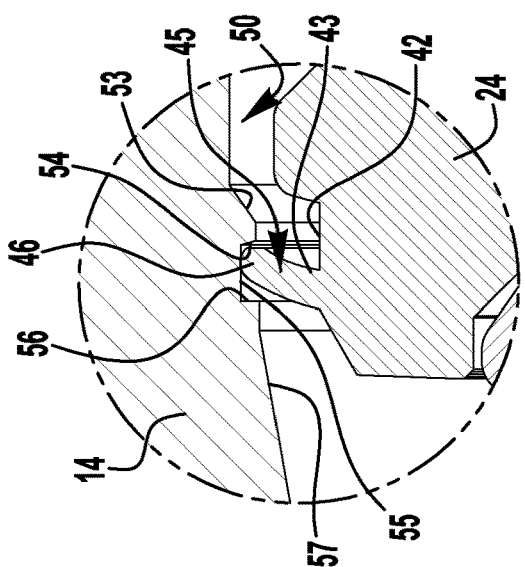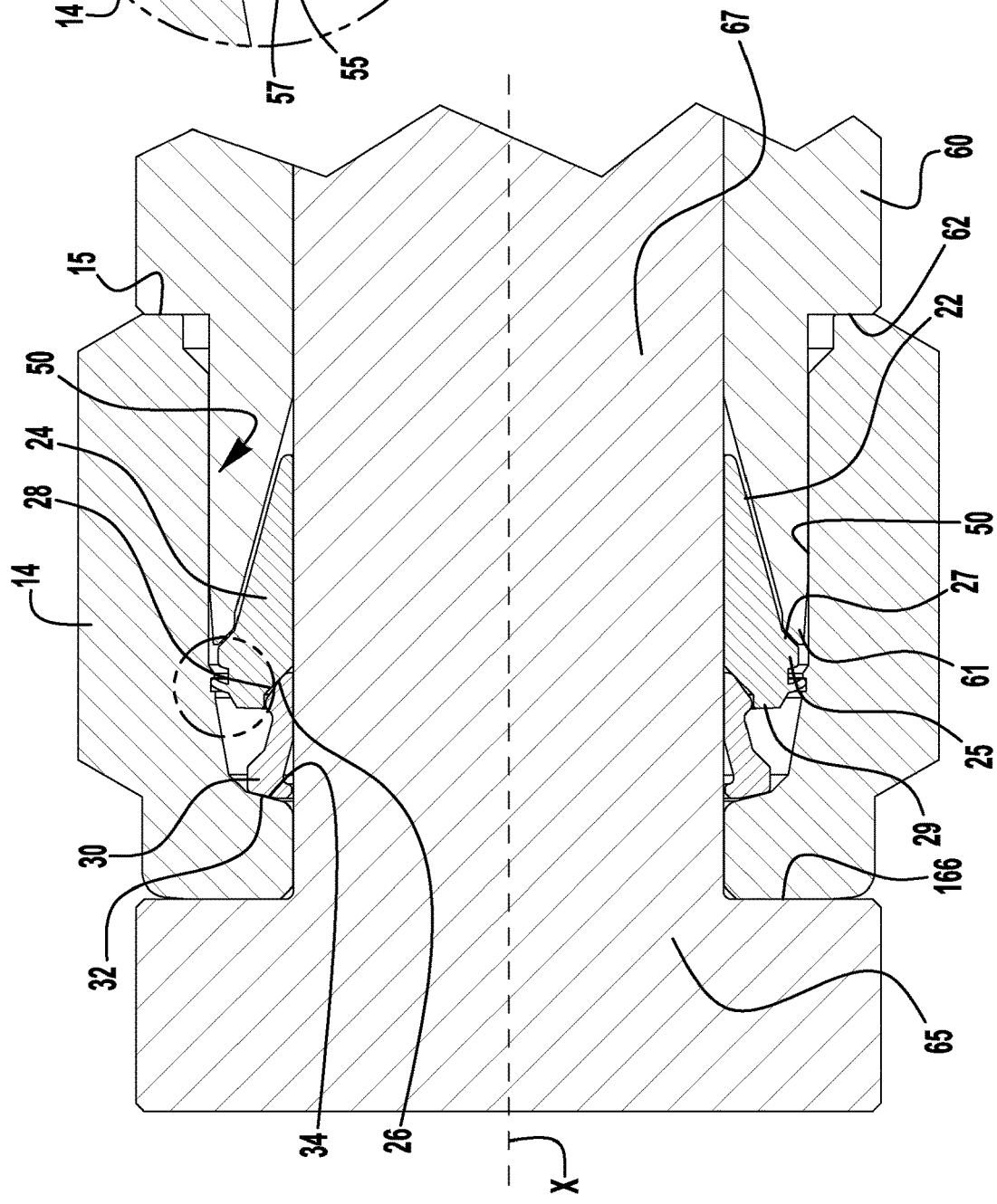

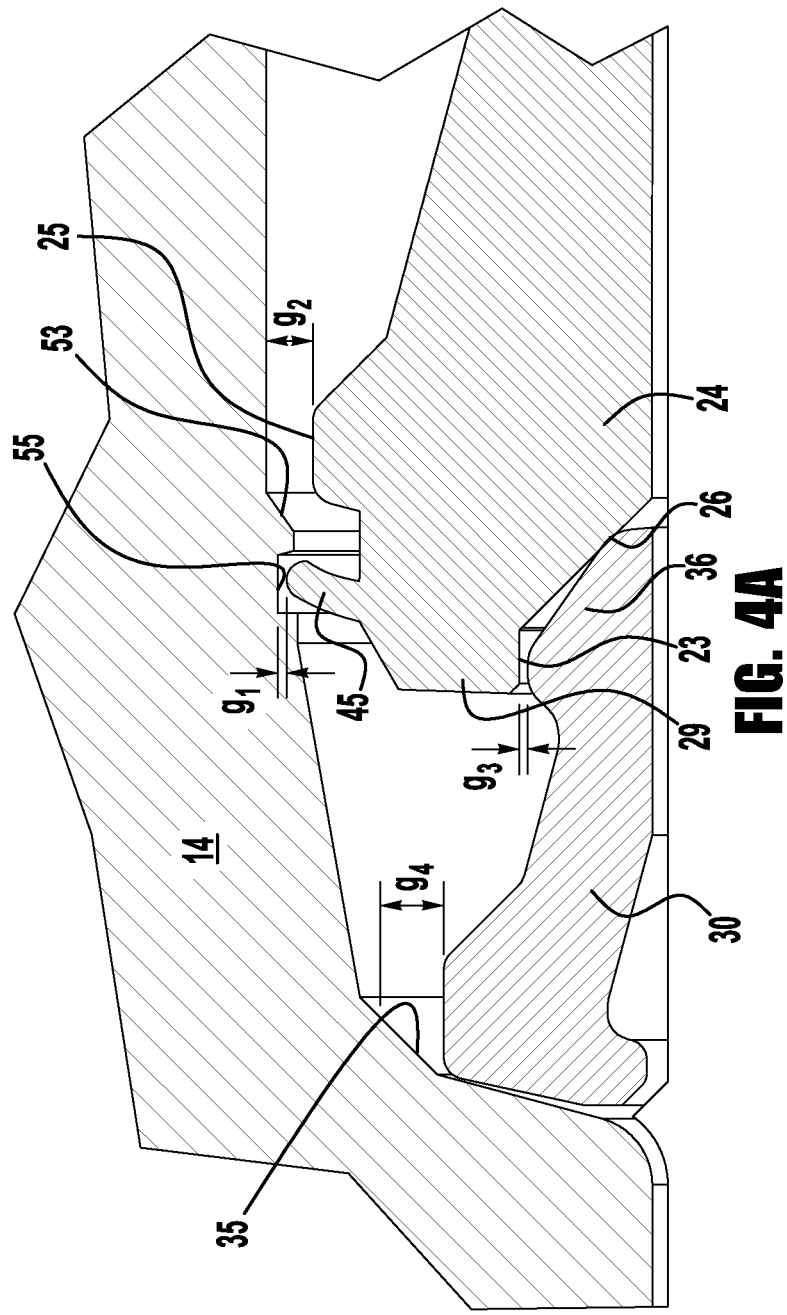

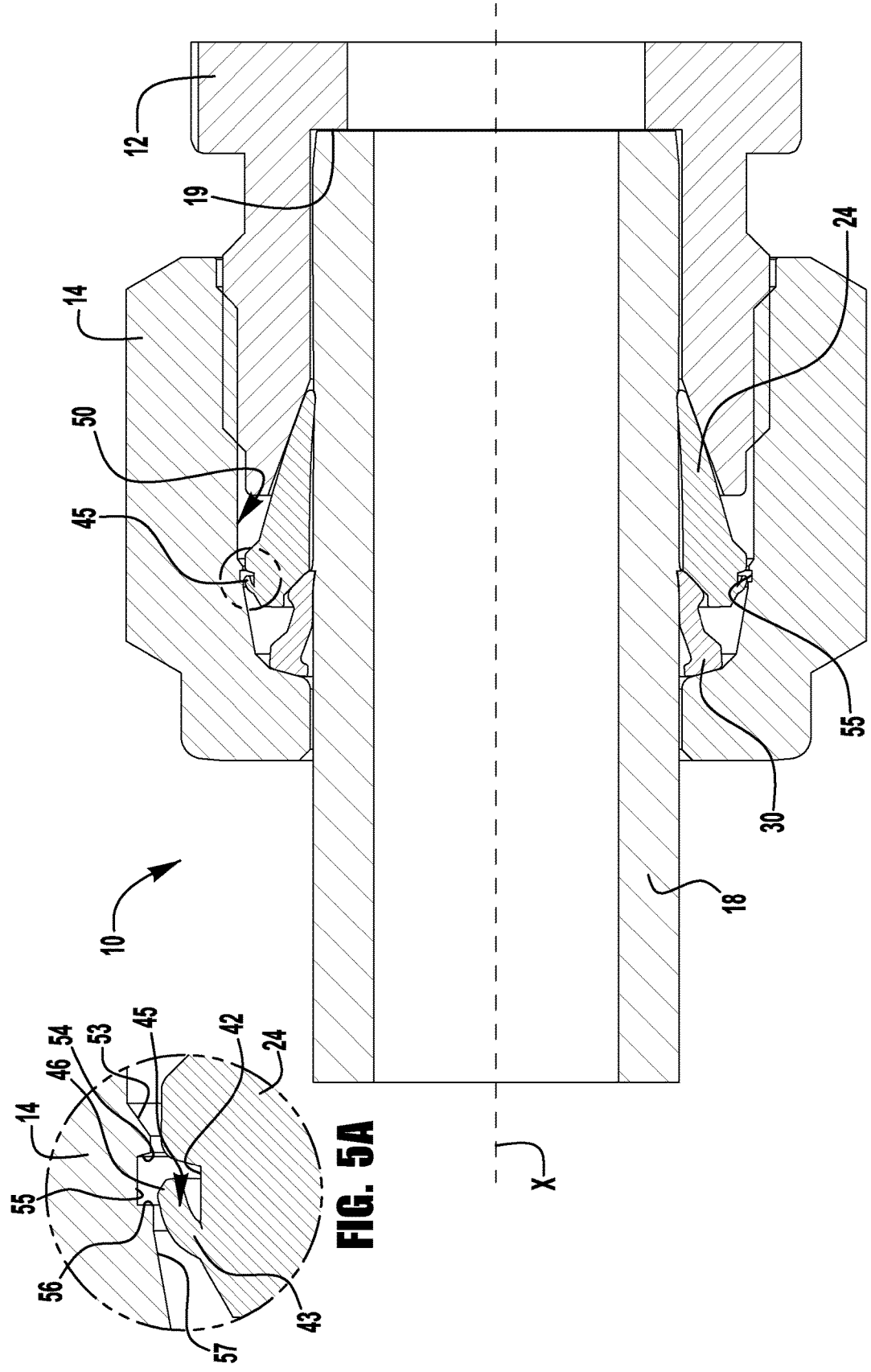

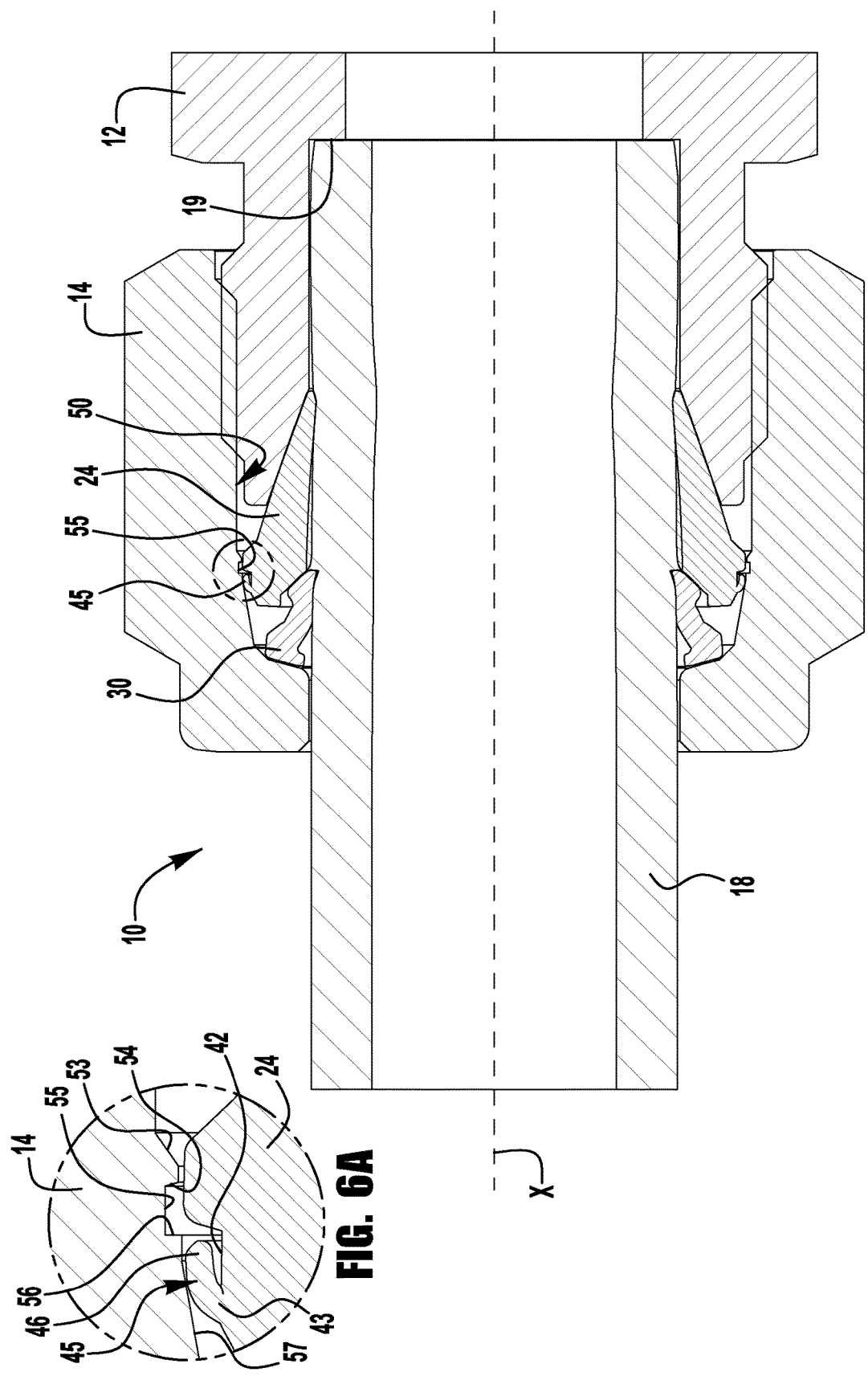

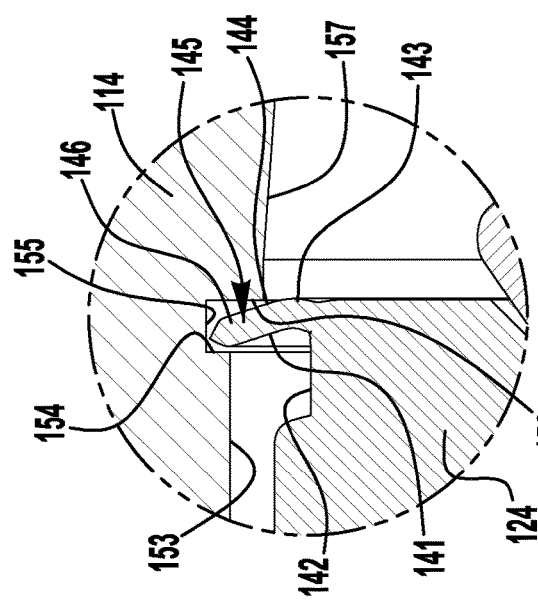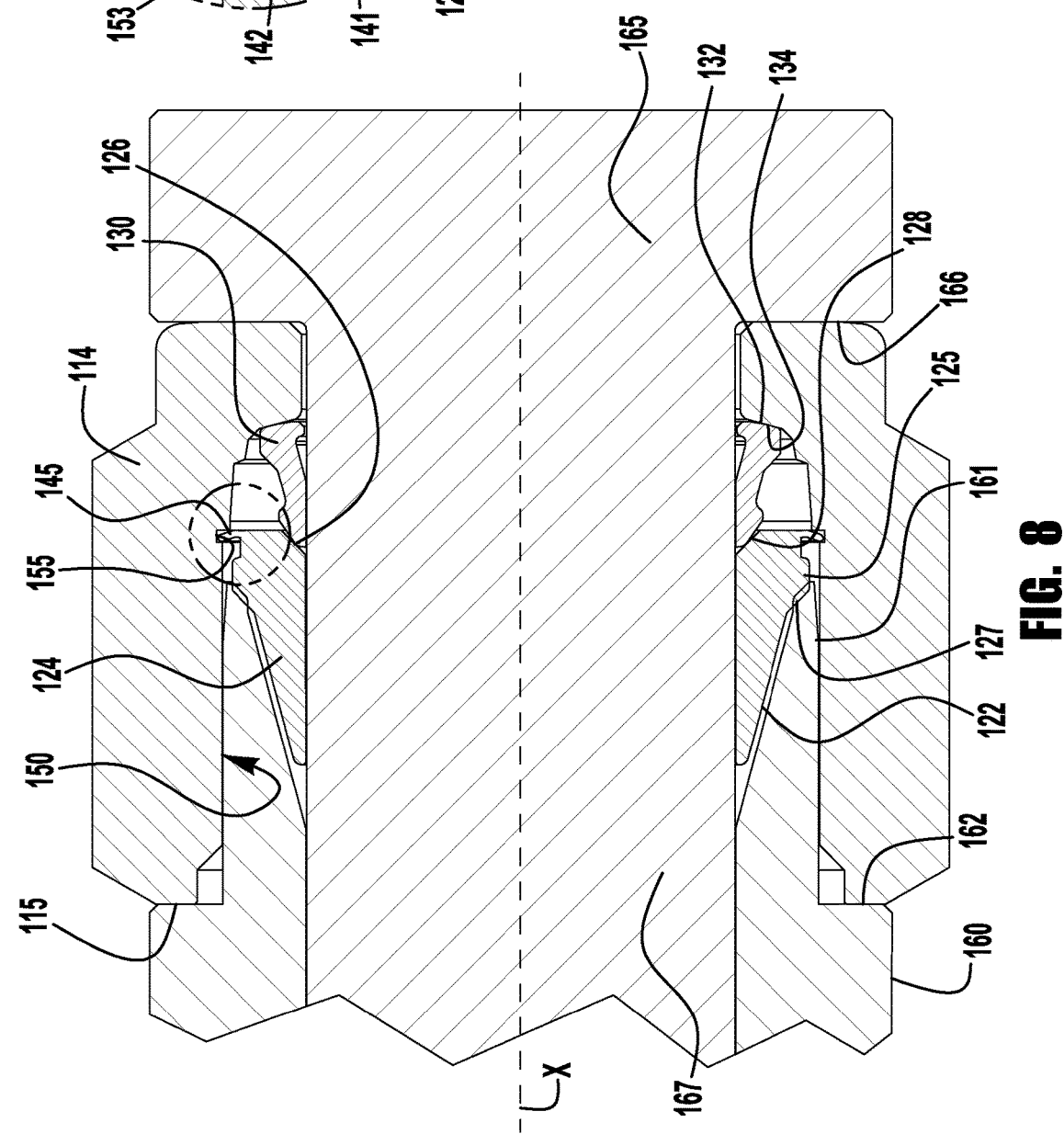

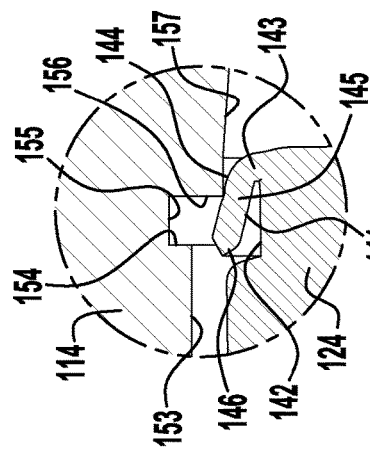
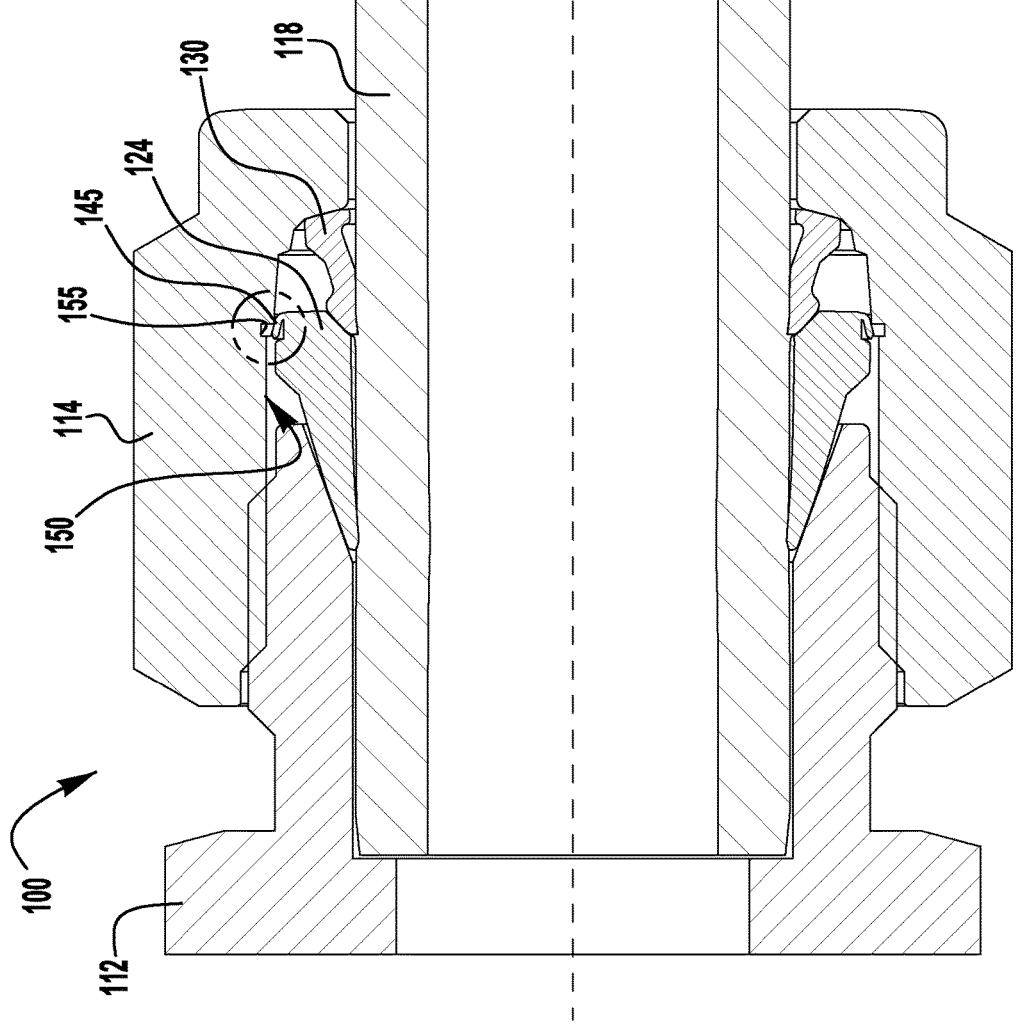

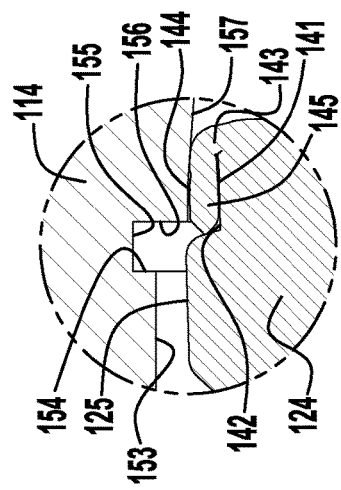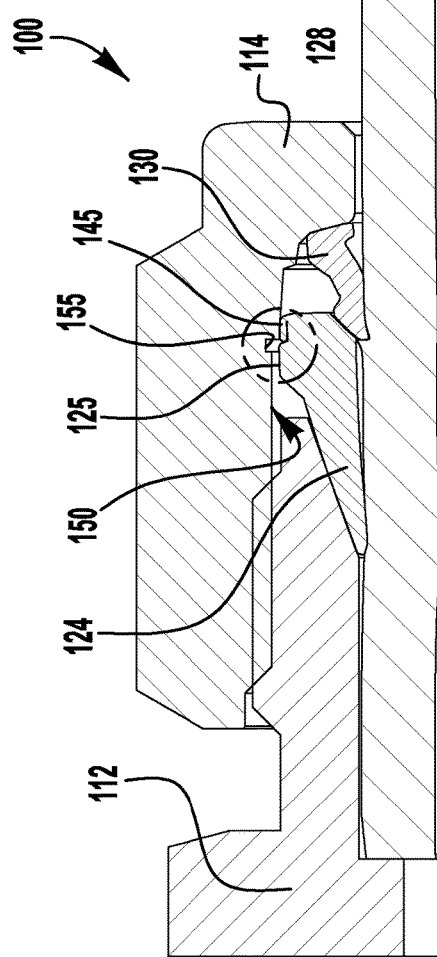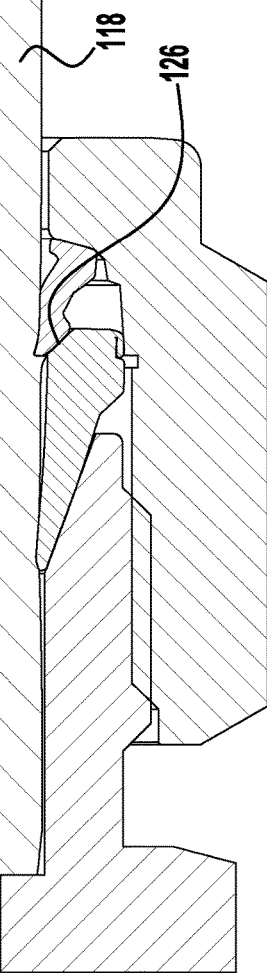

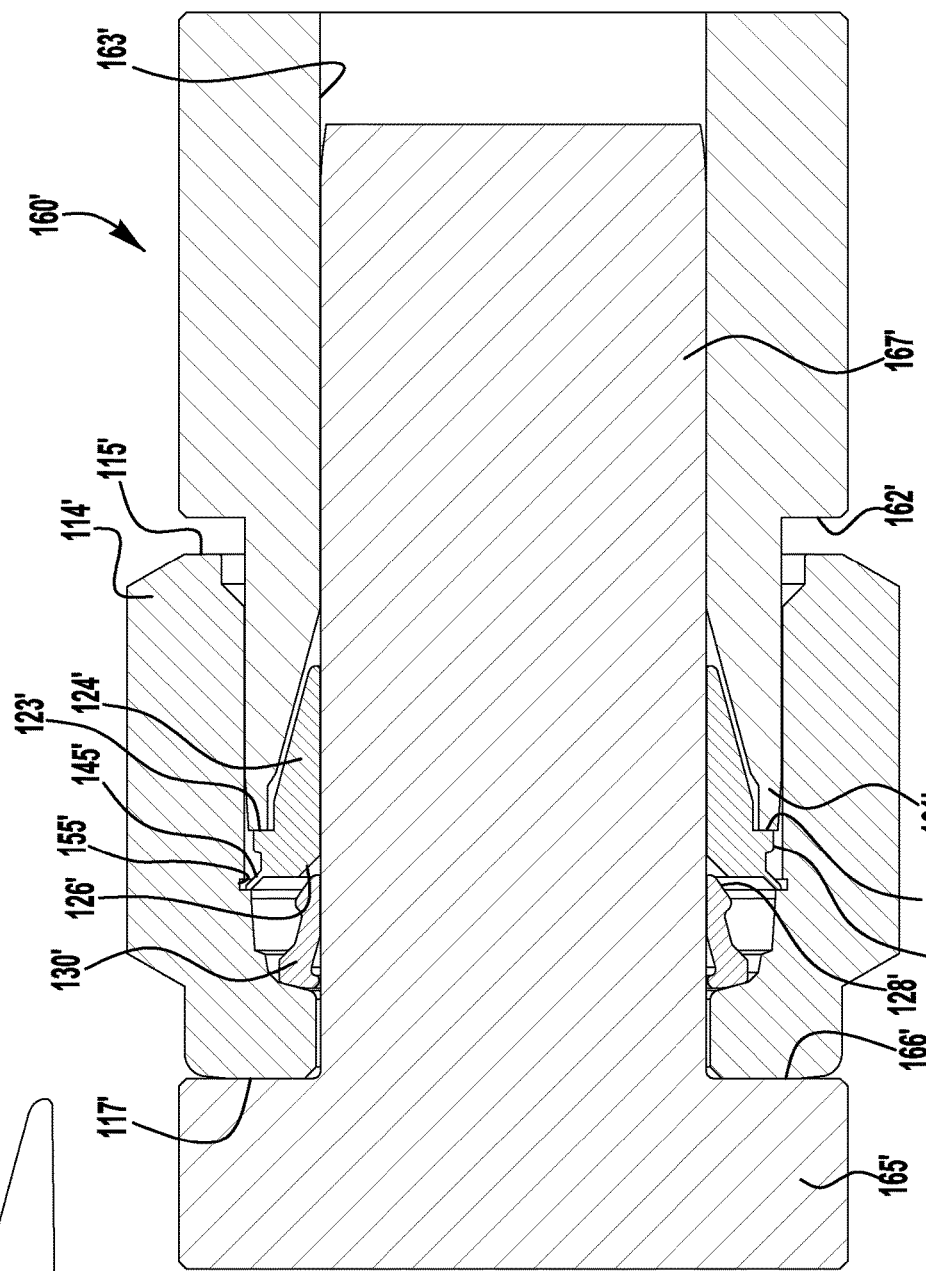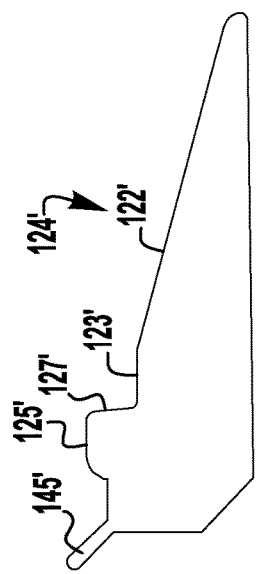

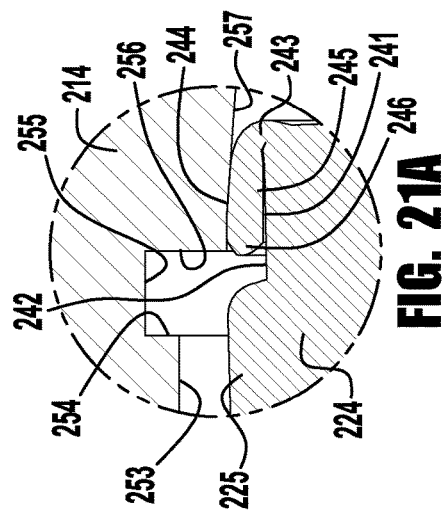
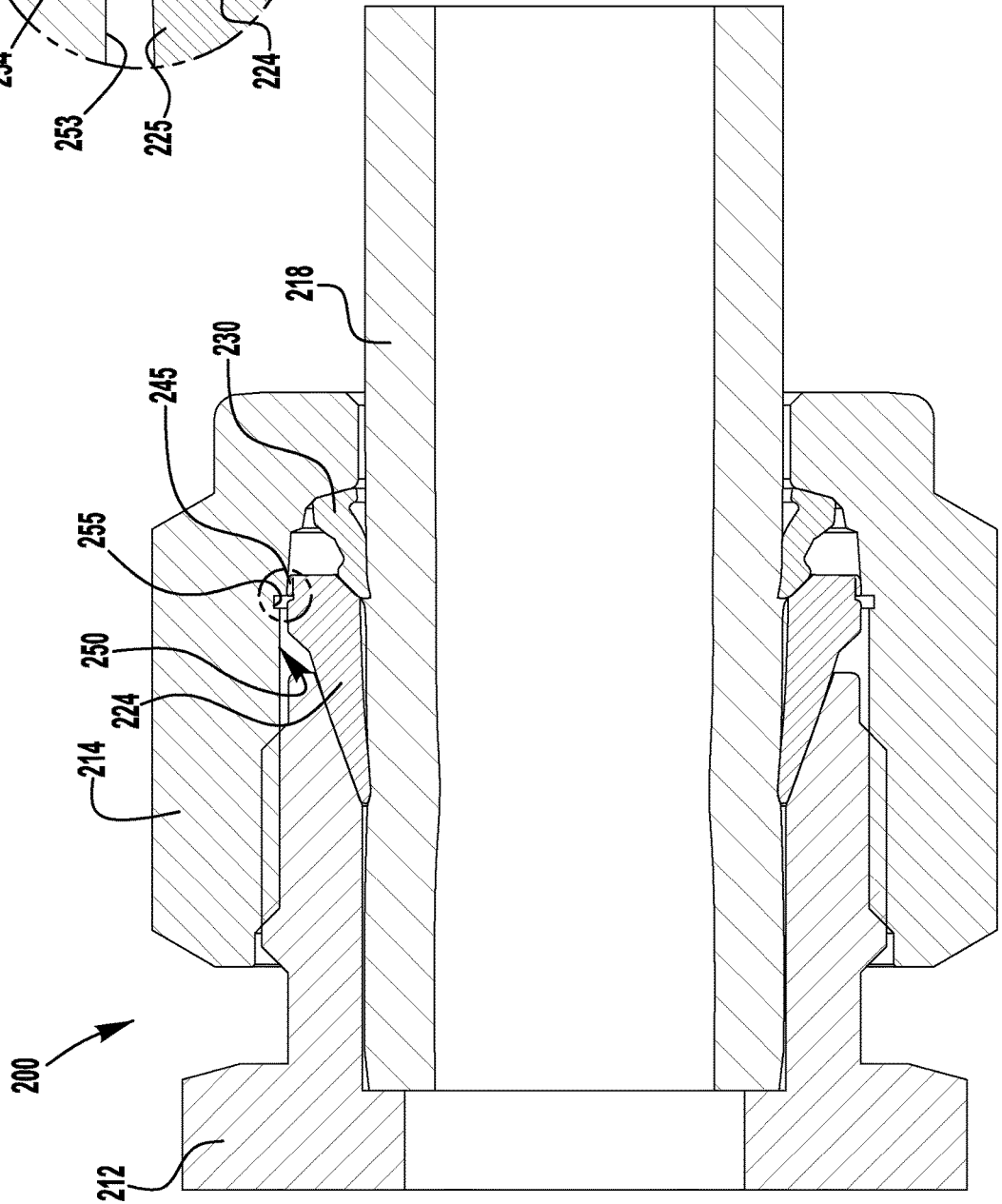
FIG. 21A
FIG. 21

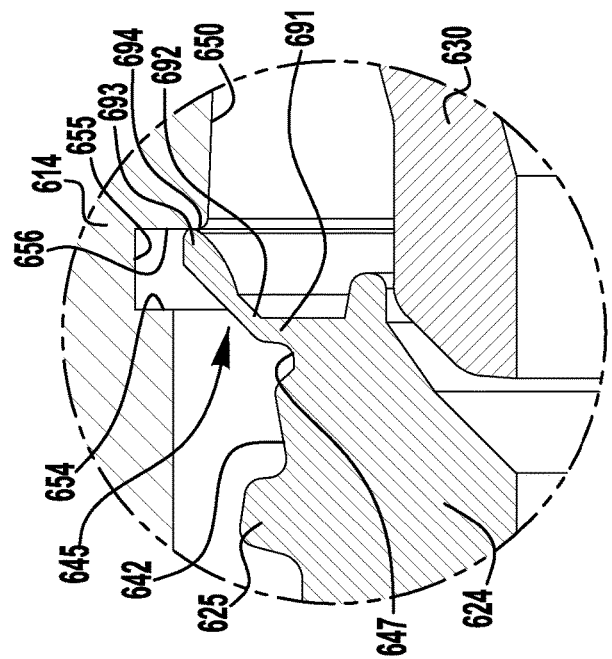
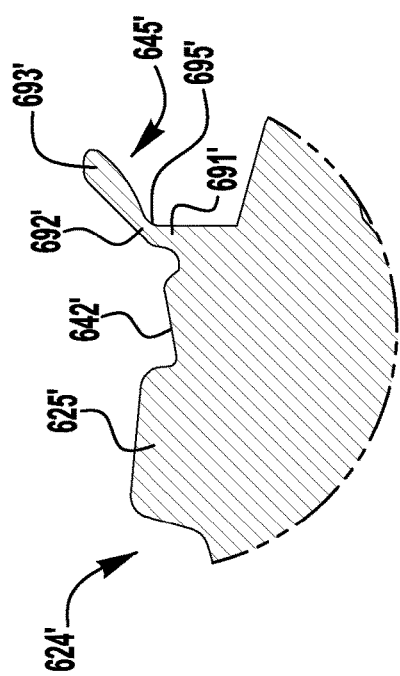
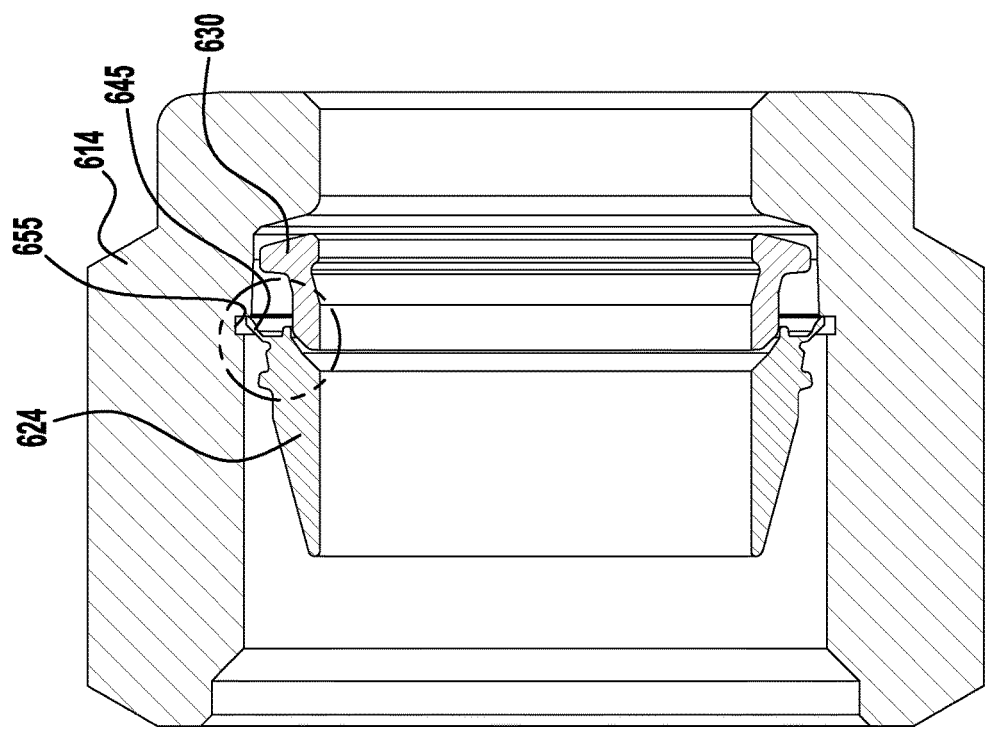

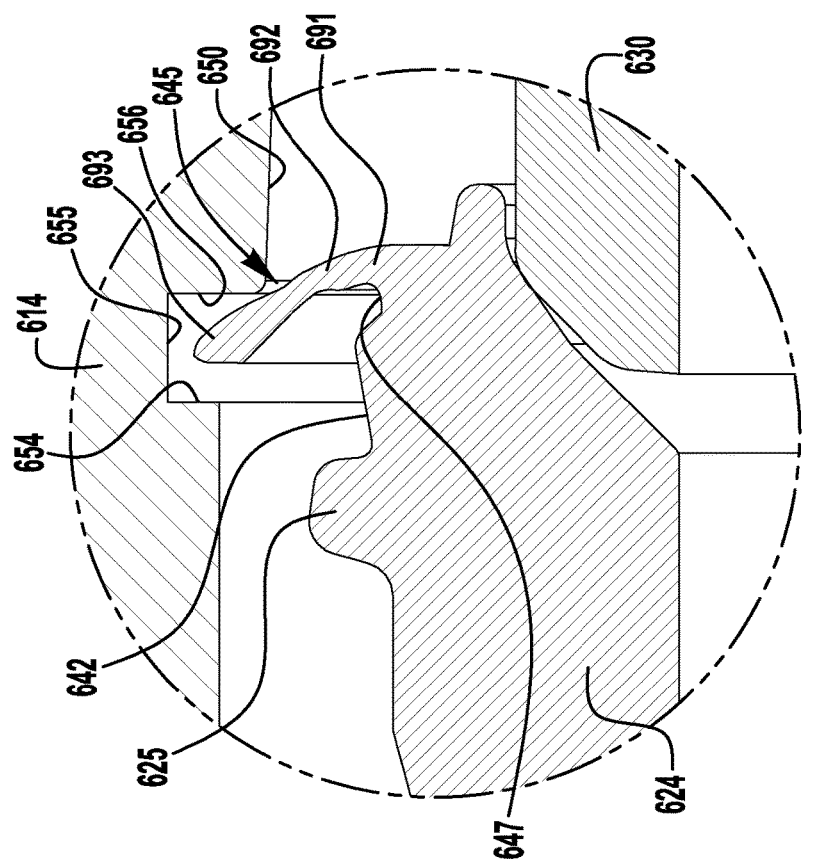
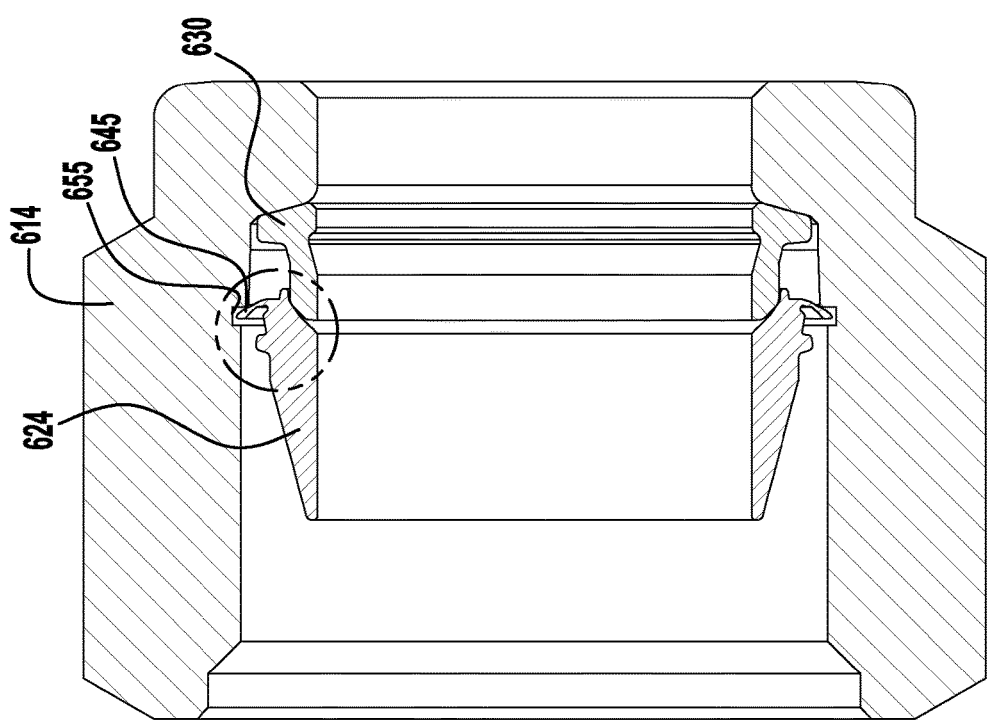

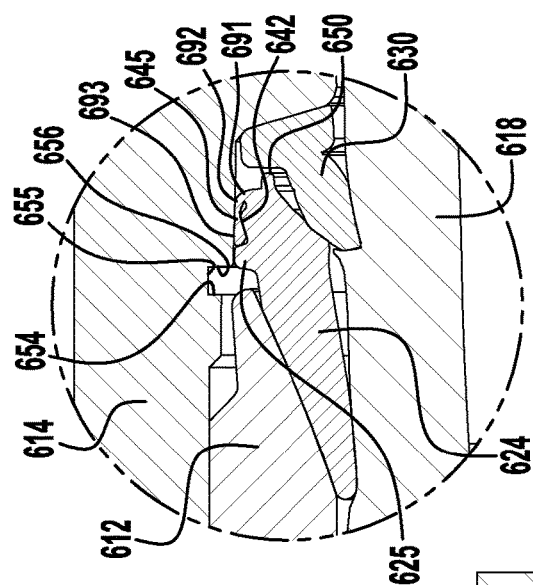
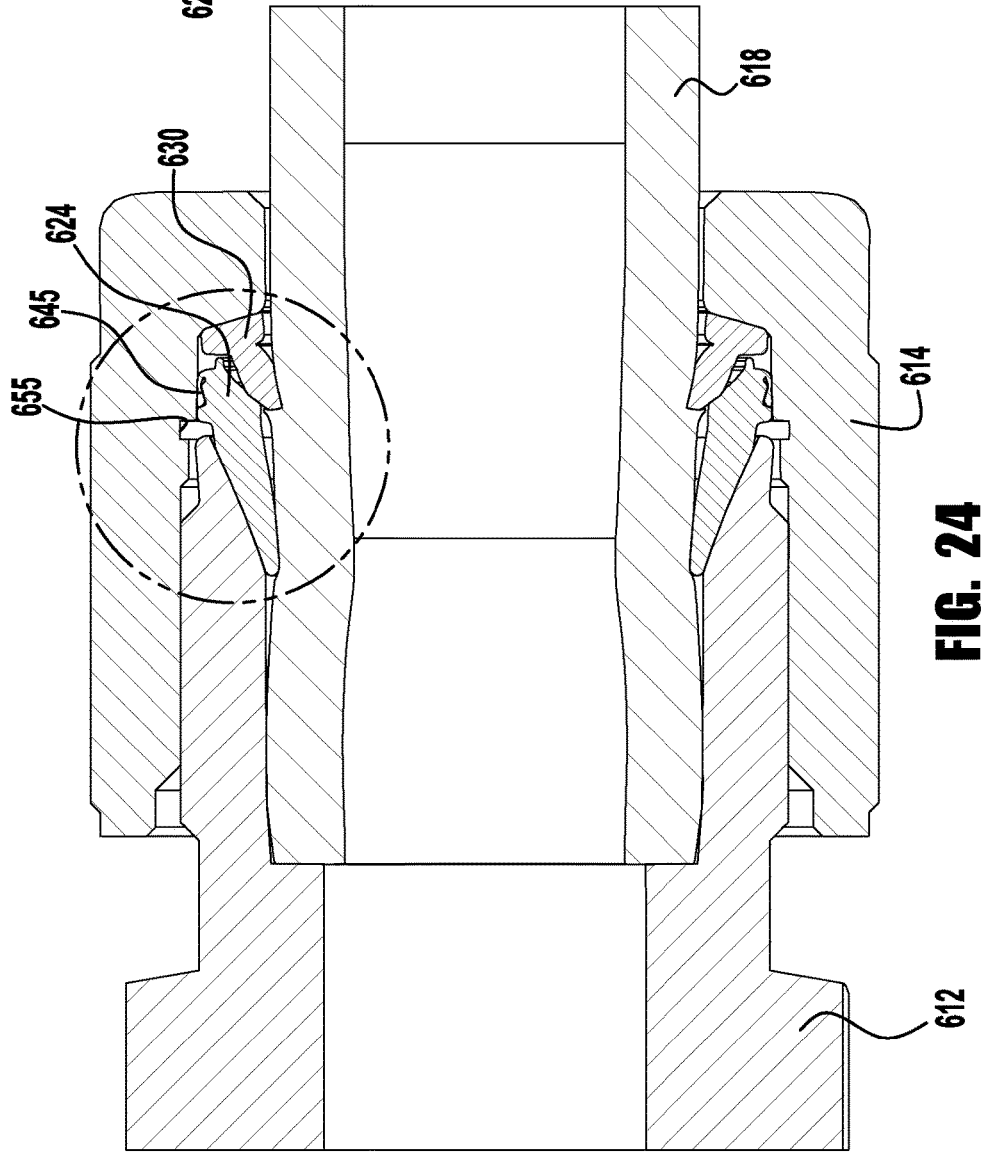

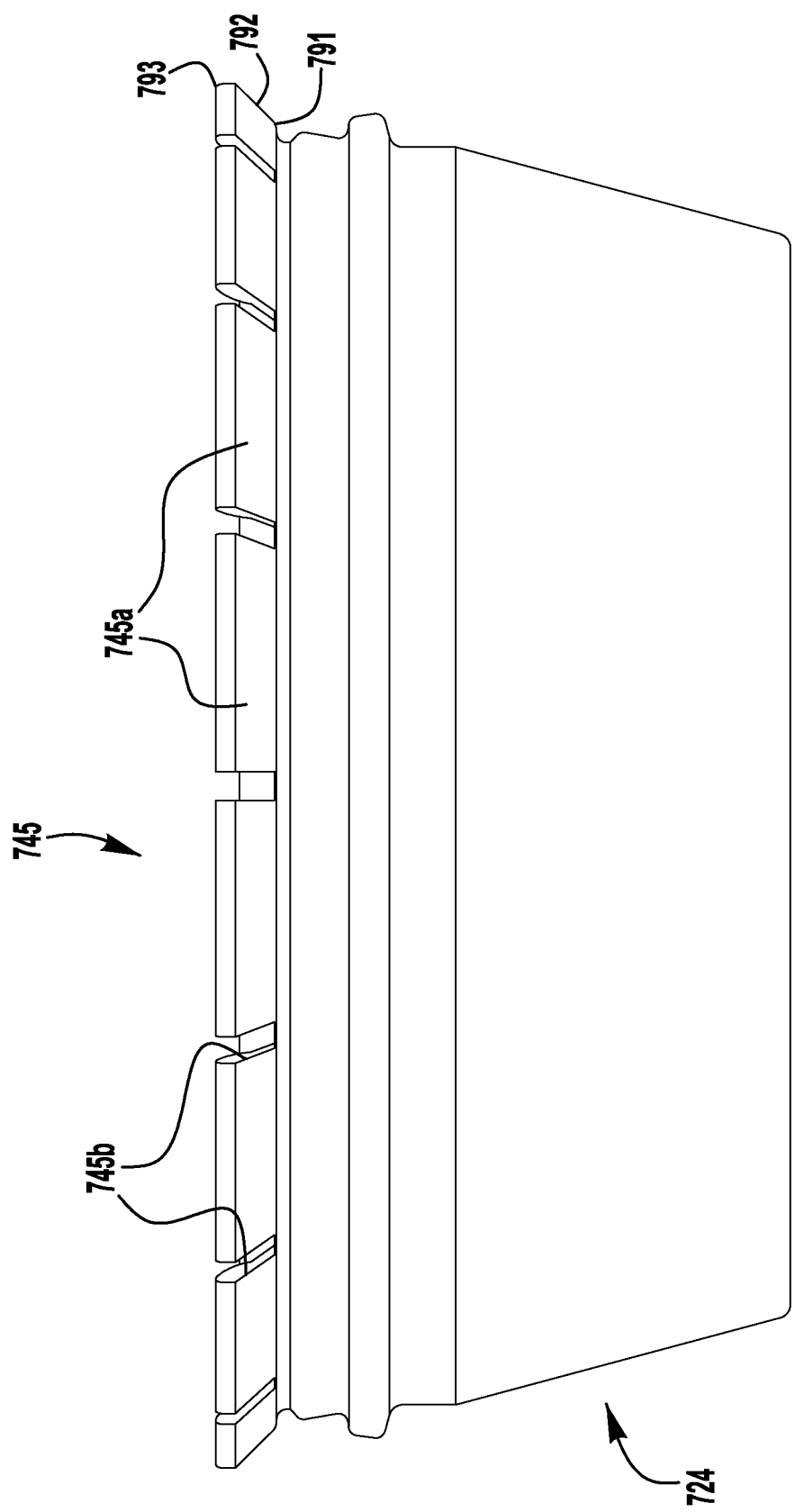

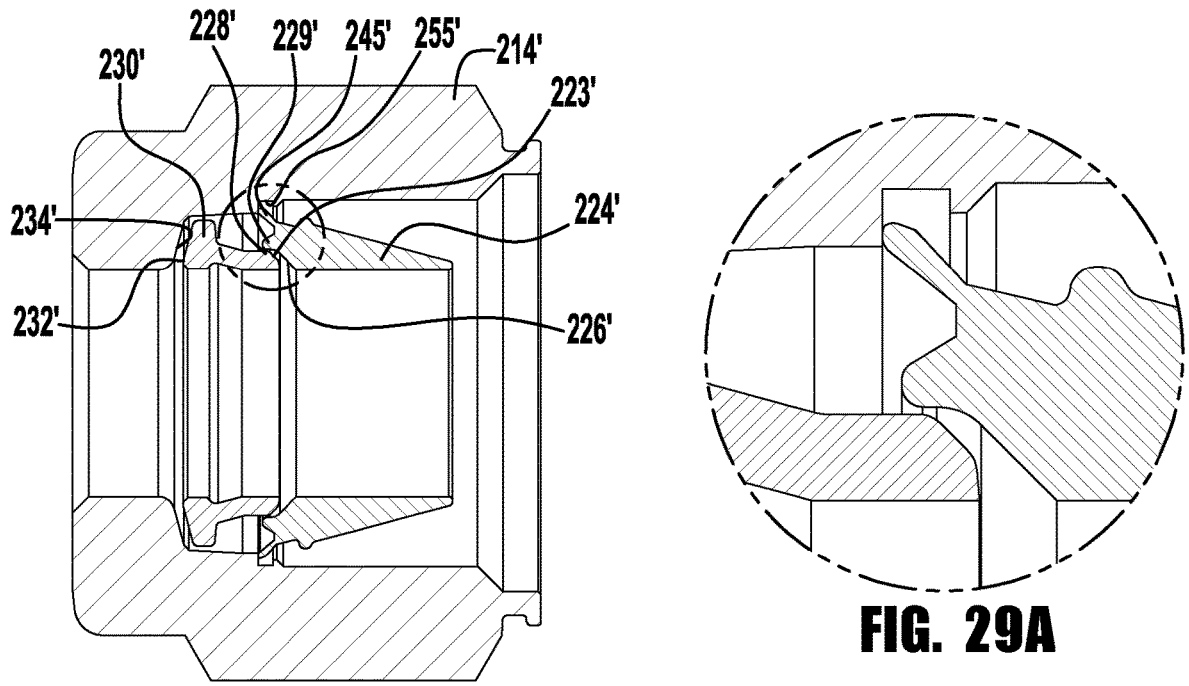
FIG. 29
FIG. 29A
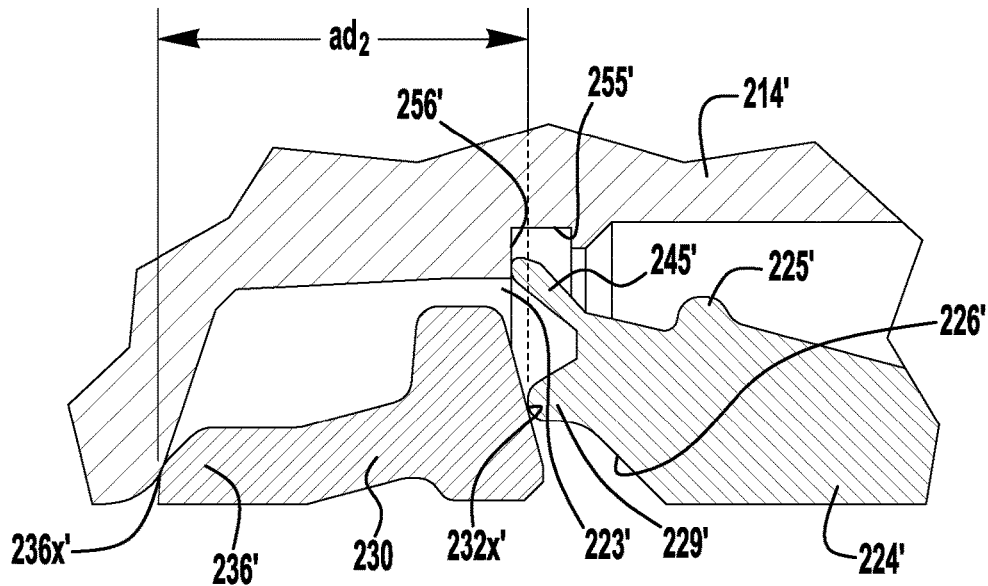
FIG. 29B

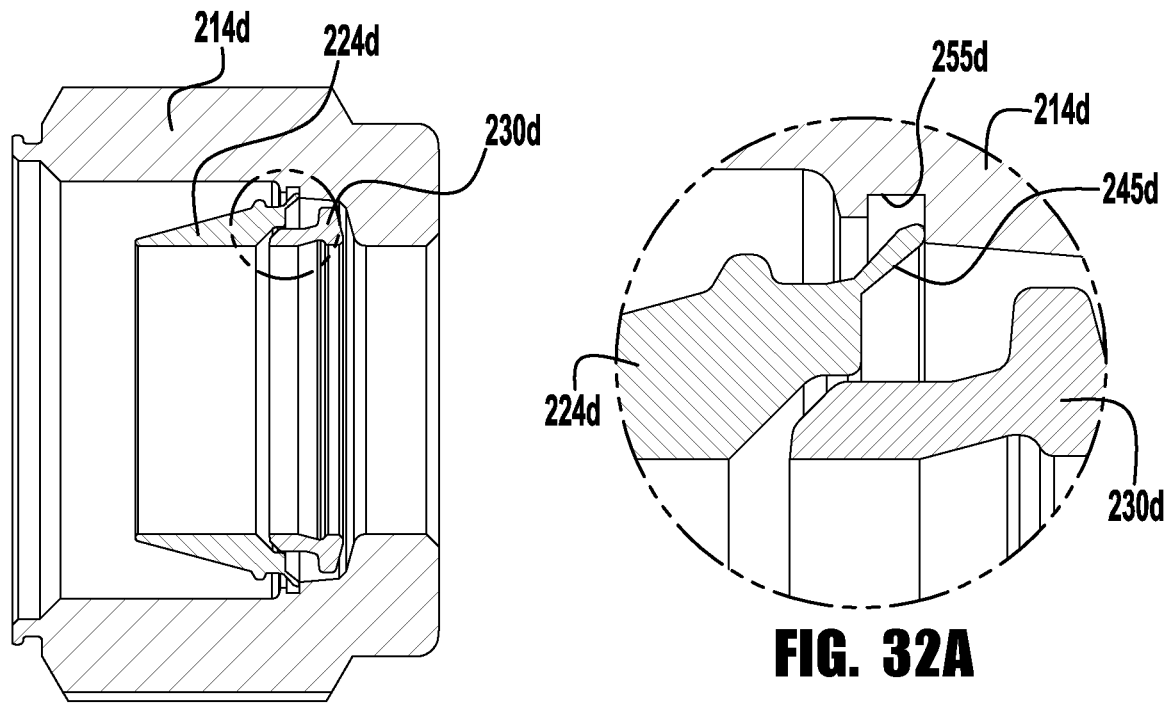
FIG. 32
FIG. 32A
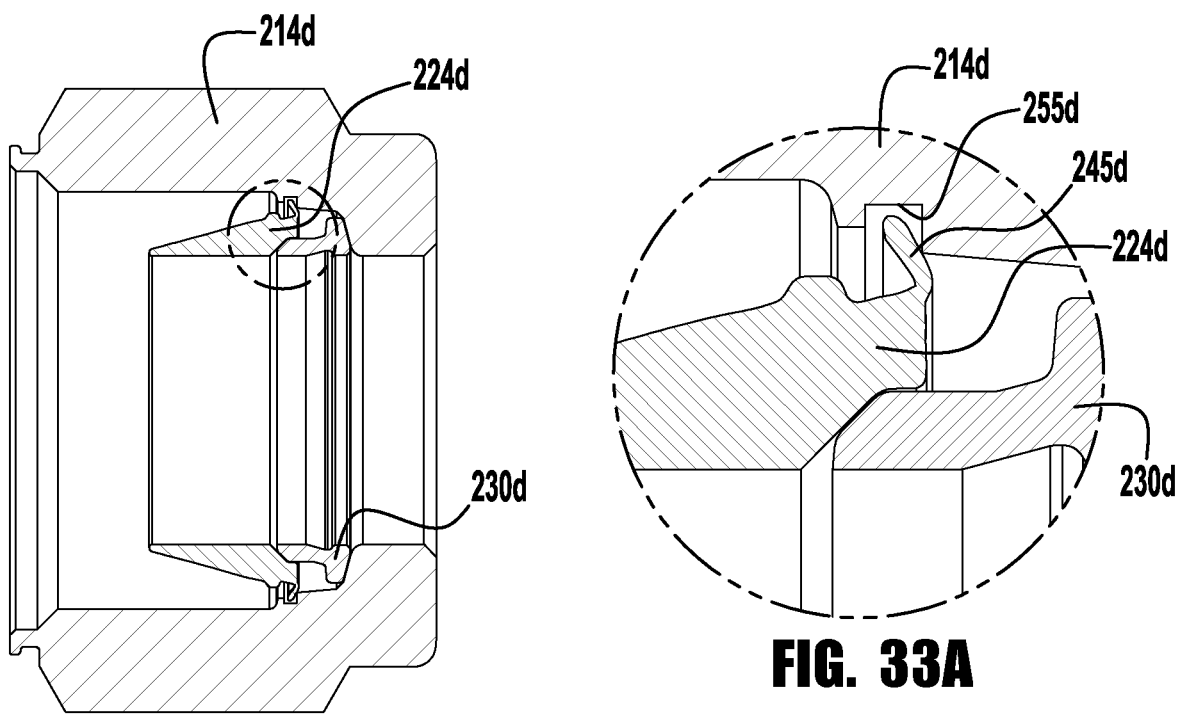
FIG. 33
FIG. 33A

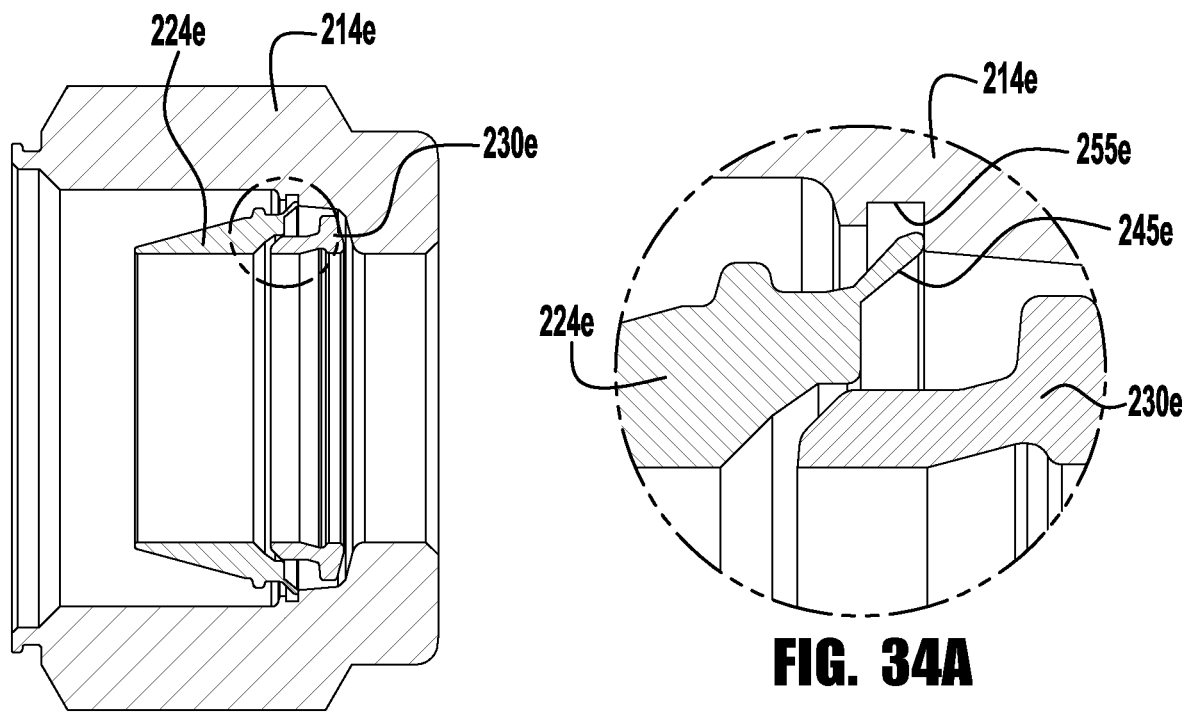
FIG. 34
FIG. 34A
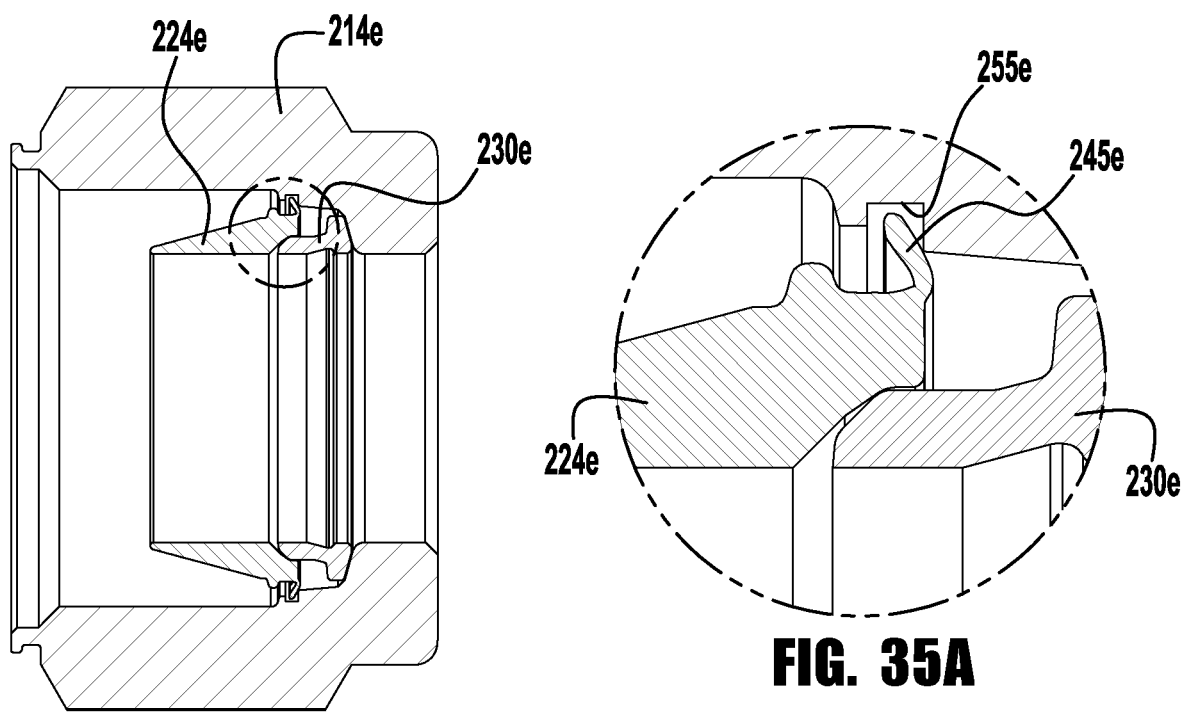
FIG. 35
FIG. 35A

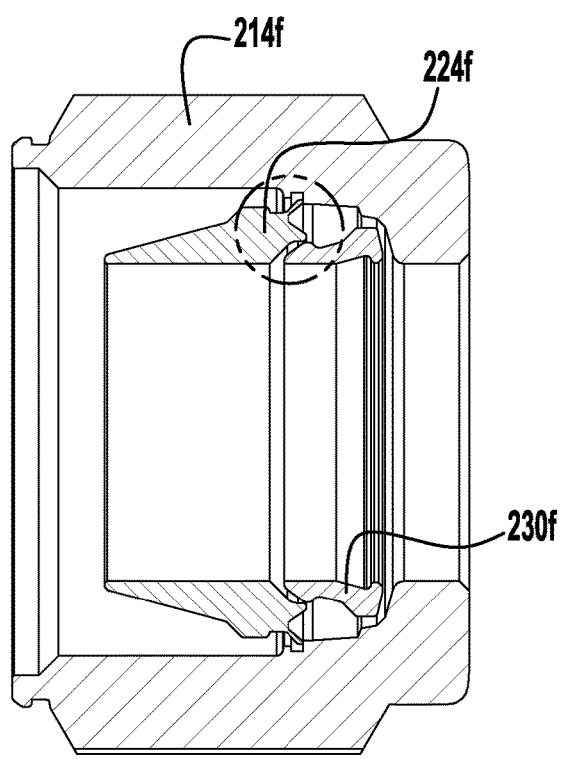
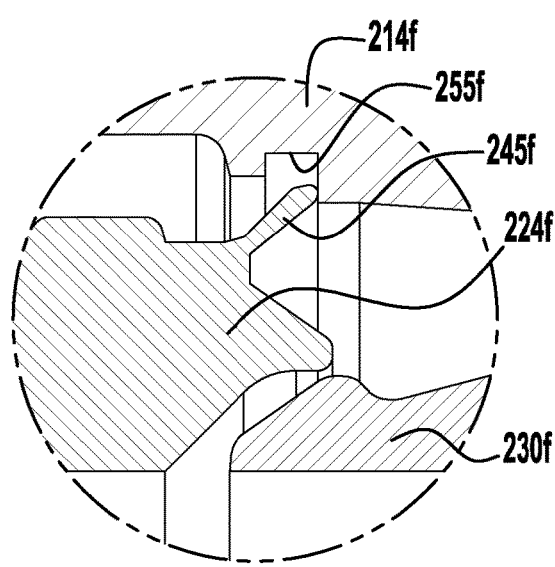
FIG. 36
FIG. 36A

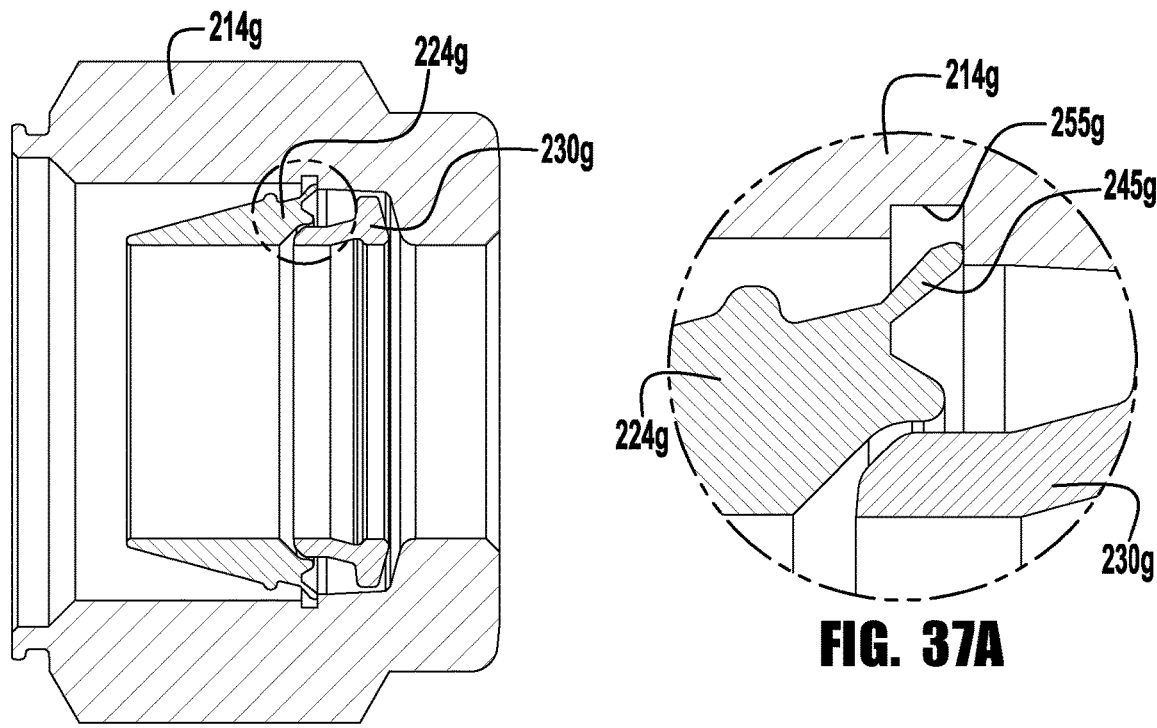
FIG. 37
FIG. 37A
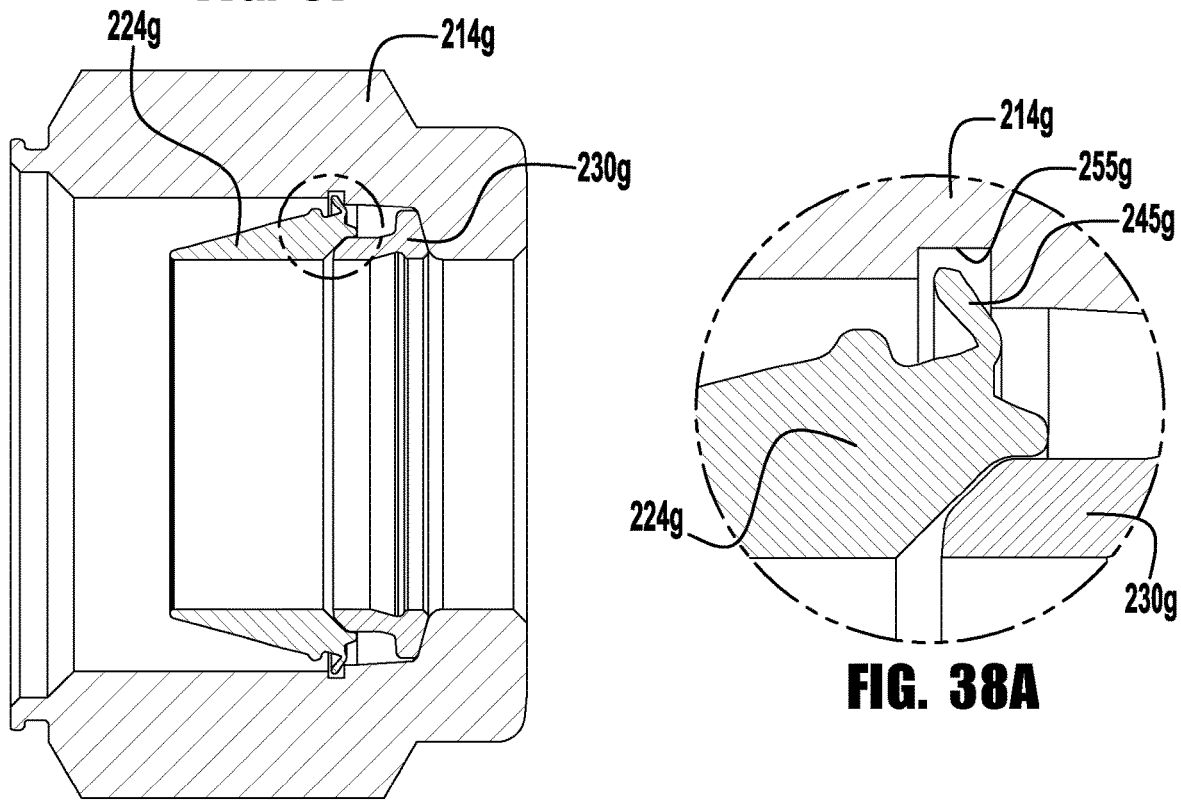
FIG. 38
FIG. 38A

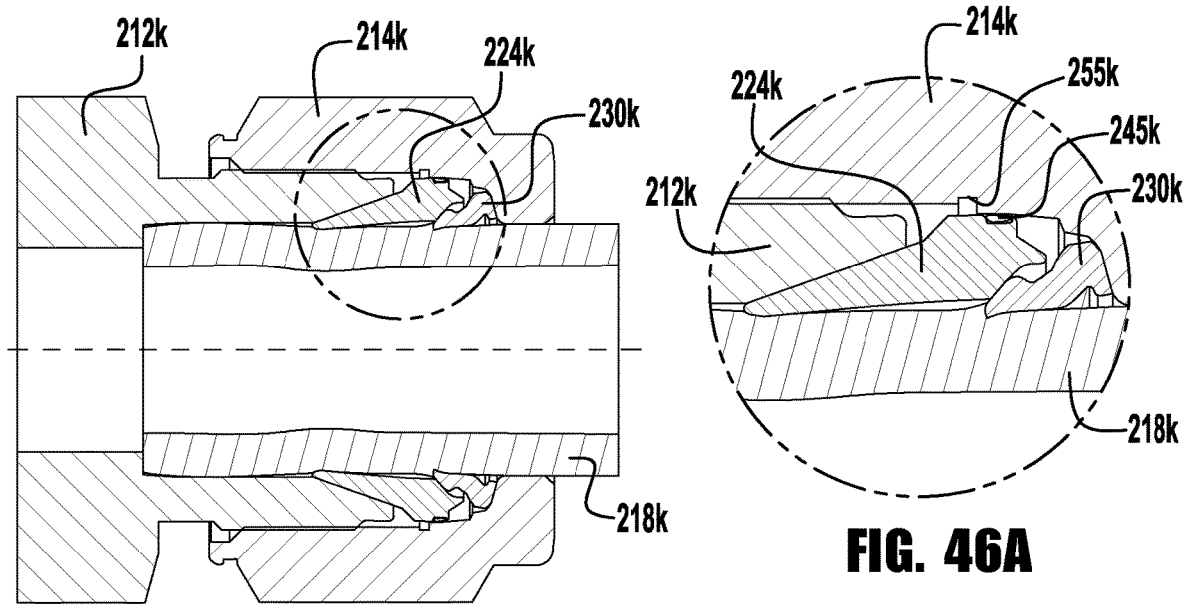
FIG. 46
FIG. 46A
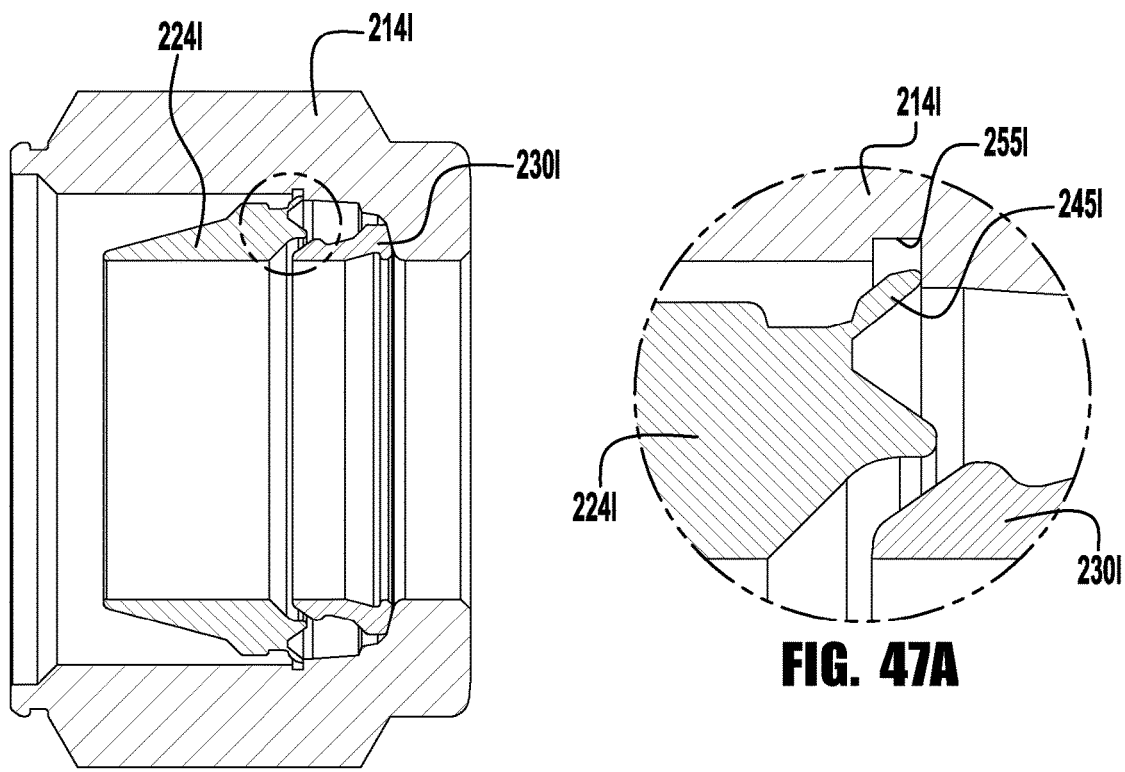
FIG. 47
FIG. 47A

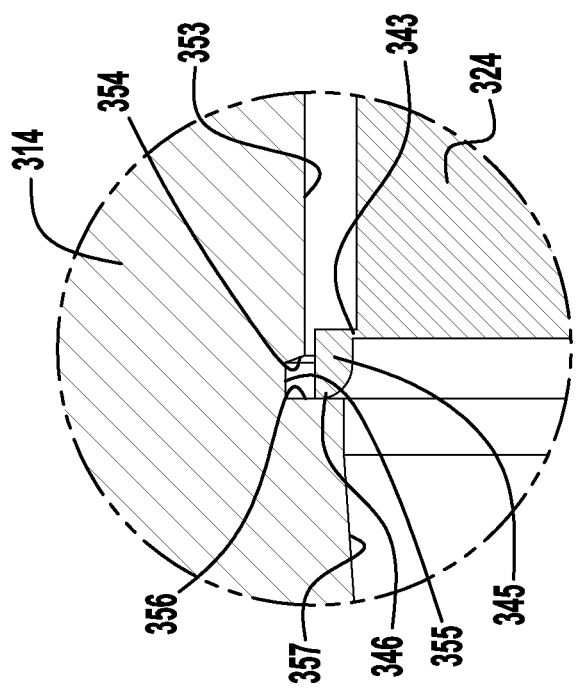
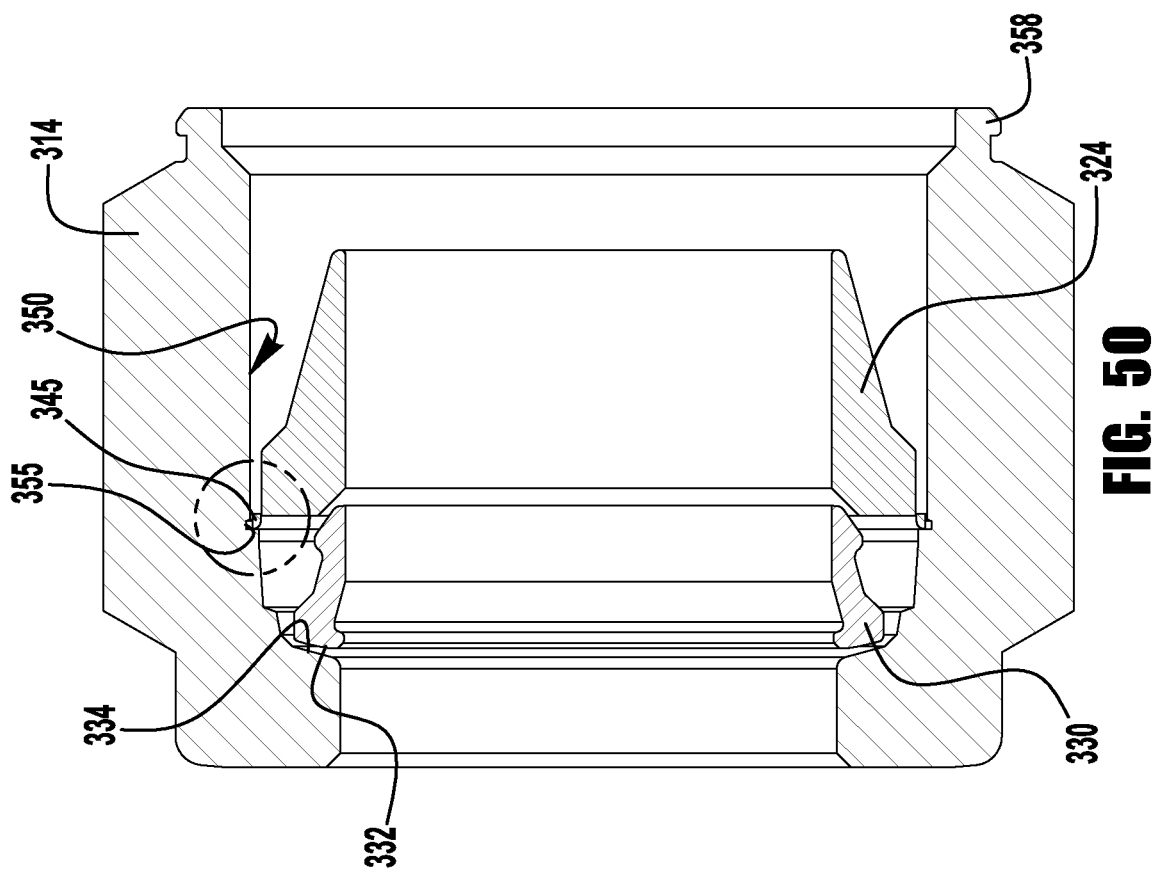

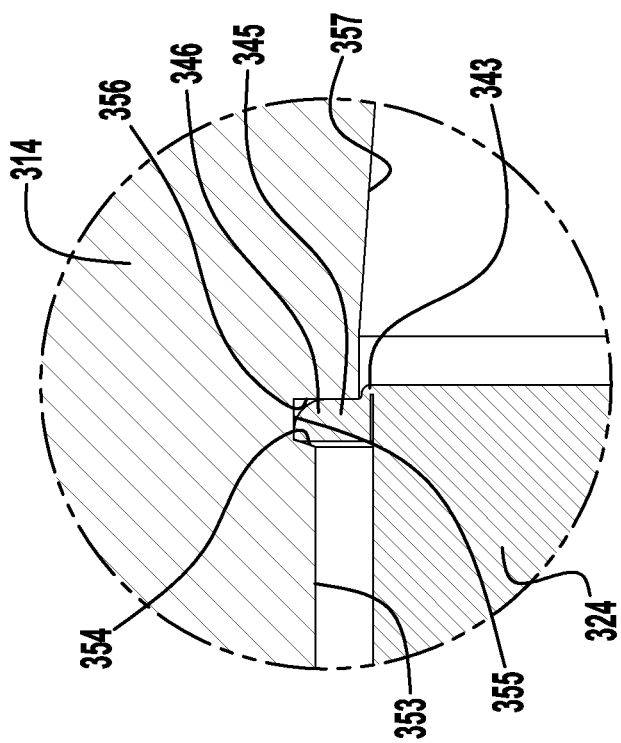
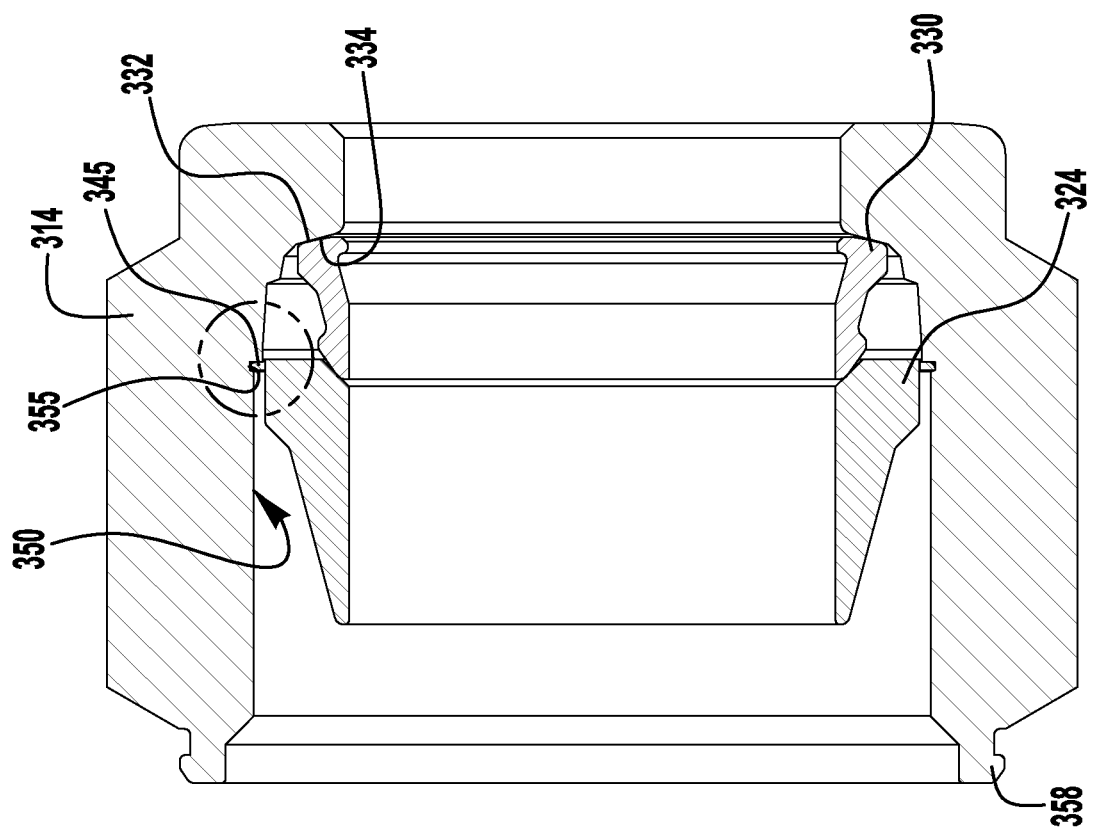

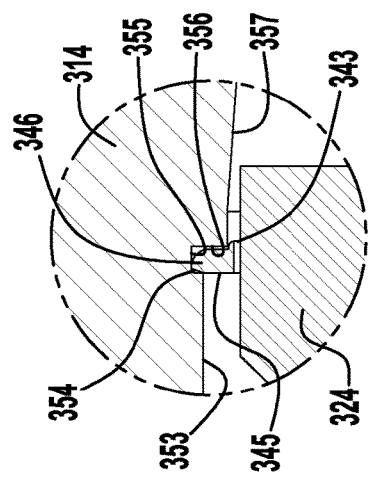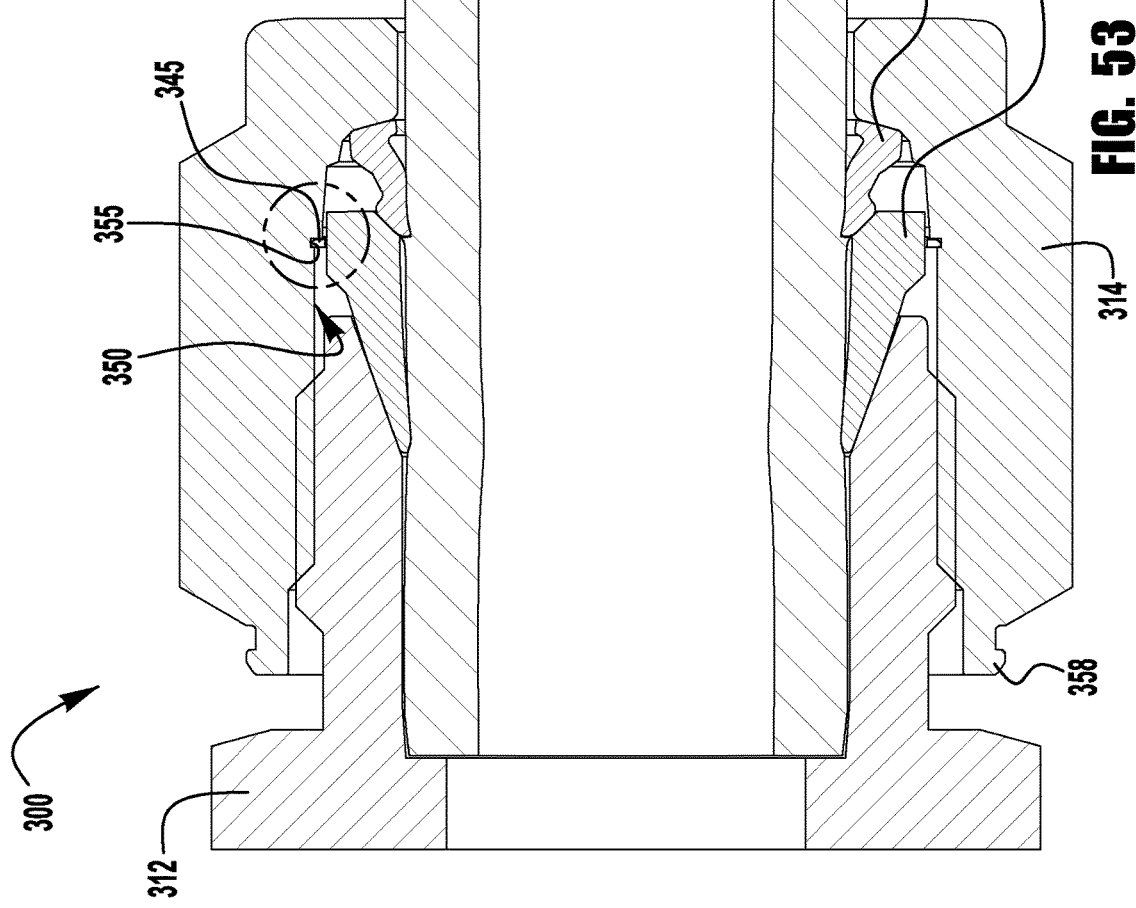

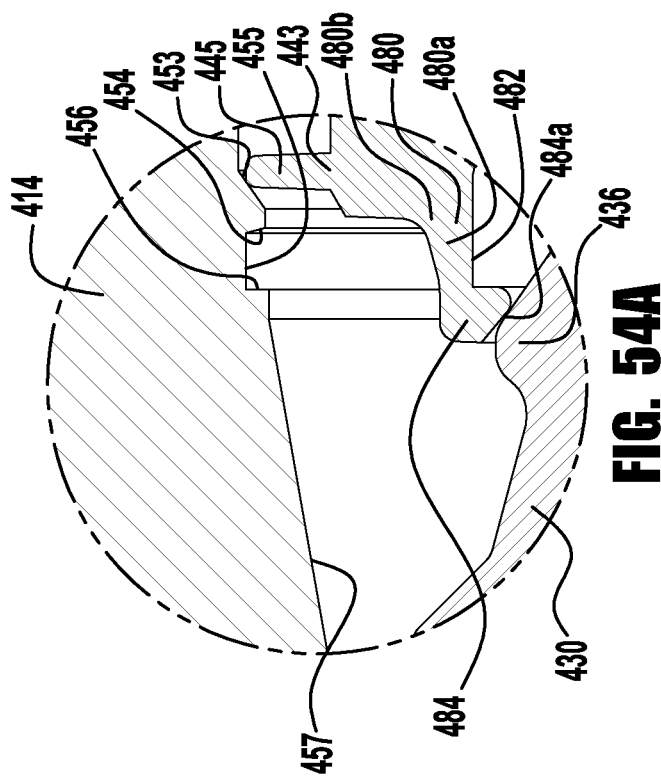
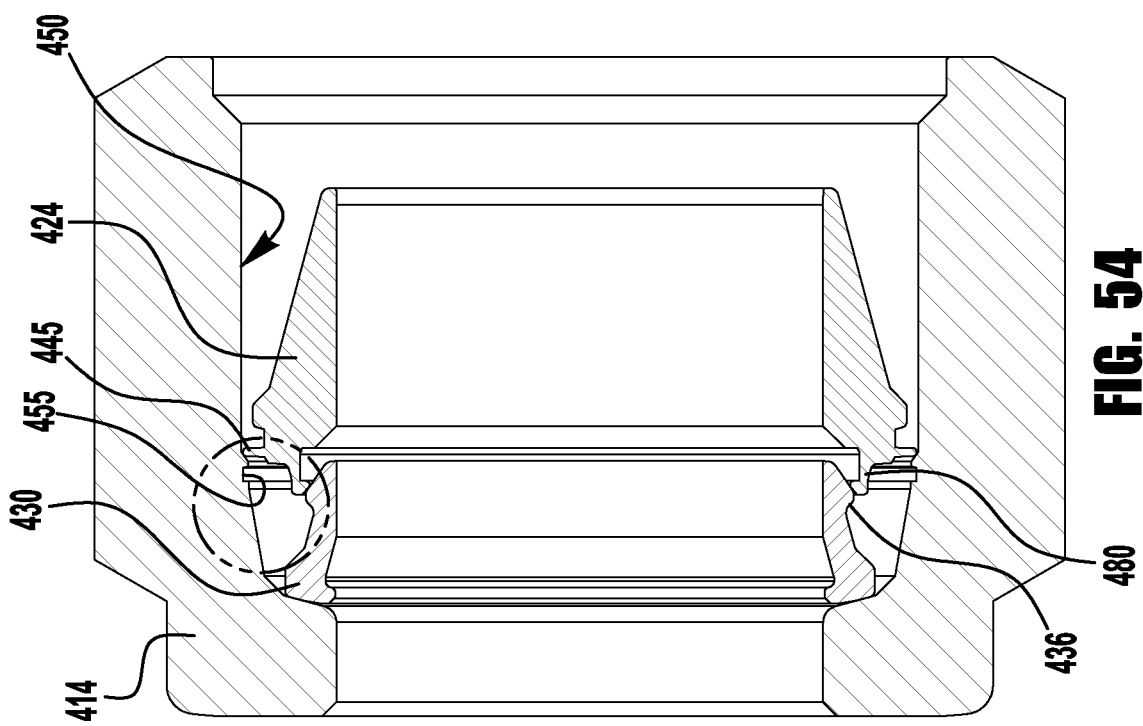

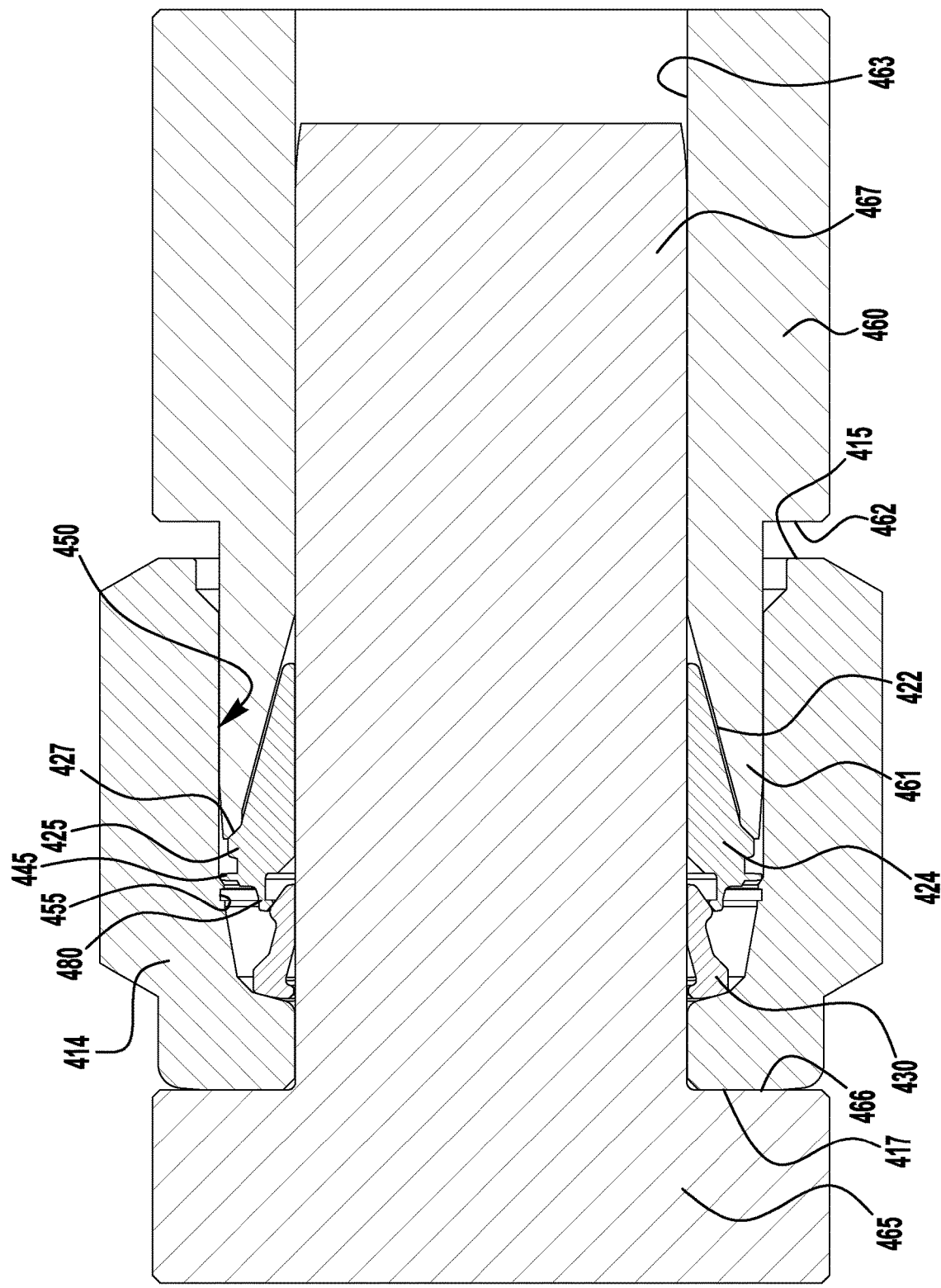

COMPONENT RETAINING STRUCTURE FOR CONDUIT FITTING

CROSS-REFERENCE TO RELATED APPLICATIONS

This application is a continuation application of U.S. Ser. No. 15/416,048, filed on Jan. 26, 2017 which claims priority to and all benefits of U.S. Provisional Patent Application Ser. No. 62/291,098, filed on Feb. 4, 2016, for COMPONENT RETAINING STRUCTURE FOR CONDUIT FITTING, and U.S. Provisional Patent Application Ser. No. 62/417,457, filed on Nov. 4, 2016, for COMPONENT RETAINING STRUCTURE FOR CONDUIT FITTING, the entire disclosures of both of which are fully incorporated herein by reference.

TECHNICAL FIELD OF THE INVENTIONS

The present disclosure relates to fittings for making mechanically attached connections between a conduit and another fluid component, for containing liquid or gas fluids. More particularly, the disclosure relates to fittings for tube and pipe conduits that use one or more conduit gripping devices, such as for example, one or more ferrules.

SUMMARY OF THE DISCLOSURE

In accordance with an embodiment of one or more of the inventions presented in this disclosure, a preassembly for a conduit fitting includes an annular fitting component and at least a first conduit gripping device retained within the annular fitting component. The annular fitting component has an interior wall extending along a central axis from an inboard end to an outboard end. The interior wall includes an inboard surface having a first diameter, an outboard surface having a second diameter smaller than the first diameter, and an intermediate surface recessed from the inboard surface by an outward facing inboard radial wall and recessed from the outboard surface by an inward facing outboard radial wall. The first conduit gripping device includes a projection extending radially outward of an outer circumferential surface of the first conduit gripping device, and axially toward an inboard end of the first conduit gripping device, with an end portion of the projection being axially captured between the inboard radial wall and the outboard radial wall.

In accordance with another embodiment of one or more of the inventions presented in this disclosure, a preassembly for a conduit fitting includes an annular fitting component and at least a first conduit gripping device retained within the annular fitting component. The annular fitting component has an interior wall extending along a central axis from an inboard end to an outboard end. The interior wall includes an inboard surface having a first diameter, an outboard surface having a second diameter smaller than the first diameter, and an intermediate surface recessed from the inboard surface by an outward facing inboard radial wall and recessed from the outboard surface by an inward facing outboard radial wall. The first conduit gripping device includes a projection extending radially outward of an outer surface of the first conduit gripping device to an end portion, with the projection being plastically deformable about a radially inward hinge portion of the projection. When the projection extends at a first angle between about 30° and about 70° with respect to the central axis, the end portion of the projection is positioned radially outward of the outboard surface and radially inward of the inboard surface for insertion of the first conduit gripping device into the annular fitting component and abutment of the end portion of the projection with the outboard radial wall. When the projection extends at a second angle between about 70° and about 130° with respect to the central axis, the end portion of the projection is positioned radially outward of each of the inboard surface and the outboard surface for capture of the projection between the inboard radial wall and the outboard radial wall. When the projection extends at a third angle between about 145° and about 180° with respect to the central axis, the end portion of the projection is positioned radially inward of the inboard surface for removal of the first conduit gripping device from the annular fitting component.

In accordance with another embodiment of one or more of the inventions presented in this disclosure, a preassembly for a conduit fitting includes an annular fitting component and at least a first conduit gripping device retained within the annular fitting component. The annular fitting component has an interior wall extending along a central axis from an inboard end to an outboard end. The interior wall includes an inboard surface, an outboard surface, and an intermediate surface recessed from the inboard surface by an outward facing inboard radial wall and recessed from the outboard surface by an inward facing outboard radial wall. The first conduit gripping device includes a projection extending radially outward of an outer surface of the first conduit gripping device to an end portion at a first angle between about 70° and about 130° with respect to the central axis, with the end portion being axially captured between the inboard radial wall and the outboard radial wall. The projection is plastically deformable about a radially inward hinge portion, such that an axial force applied to the first conduit gripping device sufficient to bend the projection to extend at a second angle between about 145° and about 180° with respect to the central axis positions the end portion of the projection radially inward of the inboard surface for removal of the first conduit gripping device from the annular fitting component.

In accordance with another embodiment of one or more of the inventions presented in this disclosure, a preassembly for a conduit fitting includes an annular fitting component and at least a first conduit gripping device retained within the annular fitting component. The annular fitting component has an interior wall extending along a central axis from an inboard end to an outboard end. The interior wall includes an inboard surface having a first diameter, an outboard surface having a second diameter smaller than the first diameter, and an intermediate surface recessed from the inboard surface by an outward facing inboard radial wall and recessed from the outboard surface by an inward facing outboard radial wall. The first conduit gripping device includes a projection extending radially outward of an outer surface of the first conduit gripping device to an end portion axially captured between the inboard radial wall and the outboard radial wall. The projection is attached to an outer circumferential surface of the first conduit gripping device by a radially inward frangible portion, such that when an axial outward force is applied to the first conduit gripping device to move the frangible portion axially outward of the outboard radial wall, the projection separates from the first conduit gripping device, permitting removal of the first conduit gripping device from the annular fitting component.

In accordance with another embodiment of one or more of the inventions presented in this disclosure, a fitting assembly includes annular first and second fitting components and at least a first conduit gripping device. The first fitting component has an interior wall extending along a central axis from an inboard end to an outboard end. The interior wall includes an inboard surface, an outboard surface, and an intermediate surface recessed from the inboard surface by an outward facing inboard radial wall and recessed from the outboard surface by an inward facing outboard radial wall. The second fitting component is assembled with the first fitting component to define an interior volume surrounded by the interior wall of the first fitting component. The first conduit gripping device is disposed within the interior volume, and includes a projection extending radially outward of an outer surface of the first conduit gripping device to an end portion at a first angle between about 70° and about 130° with respect to the central axis, with the end portion being axially captured between the inboard radial wall and the outboard radial wall. When the fitting is at least partially pulled up on a conduit end, the end portion of the projection engages the outboard radial wall and the projection hinges to a second angle between about 145° and about 180° with respect to the central axis, to position the end portion of the projection radially inward of the inboard surface to permit removal of the first conduit gripping device from the first fitting component when the first fitting component is disassembled from the second fitting component.

In accordance with another embodiment of one or more of the inventions presented in this disclosure, a fitting assembly includes annular first and second fitting components and at least a first conduit gripping device. The first fitting component has an interior wall extending along a central axis from an inboard end to an outboard end. The interior wall includes an inboard surface having a first diameter, an outboard surface having a second diameter smaller than the first diameter, and an intermediate surface recessed from the inboard surface by an outward facing inboard radial wall and recessed from the outboard surface by an inward facing outboard radial wall. The second fitting component is assembled with the first fitting component to define an interior volume surrounded by the interior wall of the first fitting component. The first conduit gripping device is retained within the first fitting component and including a projection extending radially outward of a frangible portion attached to an outer surface of the first conduit gripping device, to an end portion axially captured between the inboard radial wall and the outboard radial wall. When the fitting is at least partially pulled up on a conduit end, the frangible portion of the first conduit gripping device is moved axially outward of the outboard radial wall, such that the projection separates from the first conduit gripping device, permitting removal of the first conduit gripping device from the first fitting component when the first fitting component is disassembled from the second fitting component.

In accordance with another embodiment of one or more of the inventions presented in this disclosure, a method of assembling an annular fitting component with at least a first conduit gripping device is contemplated. In the exemplary method, the first conduit gripping device is inserted into an inboard end of the annular fitting component, such that a projection extending radially outward of the first conduit gripping device to a first diameter is loosely received through an inboard surface of an interior wall of the annular fitting component along a central axis. The projection axially aligns with an annular recess of the interior wall, the annular recess being disposed between an outward facing inboard radial wall extending radially inward to the inboard surface of the interior wall at a second diameter larger than the first diameter, and an inward facing outboard radial wall extending radially inward to an outboard surface of the interior wall at a third diameter smaller than the first diameter. An outward axial force is applied to the first conduit gripping device to force an end portion of the projection against the outboard radial wall, such that the projection is bent to position the end portion of the projection at a fourth diameter greater than the second diameter, to axially capture the projection between the inboard radial wall and the outboard radial wall.

In accordance with another embodiment of one or more of the inventions presented in this disclosure, a method of assembling an annular fitting component with first and second conduit gripping devices is contemplated. In the exemplary method, the first conduit gripping device is inserted into an inboard end of the annular fitting component. The second conduit gripping device is inserted into the inboard end of the annular fitting component, such that the first conduit gripping device is axially captured between the second conduit gripping device and an outboard end of the annular fitting component. An outward axial force is applied to the second conduit gripping device, such that a first retaining structure of the second conduit gripping device engages a portion of the first conduit gripping device to hold the first and second conduit gripping devices together as a first subassembly, and a second retaining structure of the second conduit gripping device engages a portion of the annular fitting component to hold the second conduit gripping device and the annular fitting component together as a second subassembly.

In accordance with another embodiment of one or more of the inventions presented in this disclosure, a preassembly for a conduit fitting includes an annular fitting component and at least a first conduit gripping device retained within the annular fitting component. The annular fitting component includes an interior wall extending along a central axis from an inboard end to an outboard end, the interior wall including an inboard surface having a first diameter, an outboard surface having a second diameter smaller than the first diameter, and an intermediate surface recessed from the inboard surface by an outward facing inboard radial wall and recessed from the outboard surface. The first conduit gripping device includes a projection extending radially outward of an outer circumferential surface of the first conduit gripping device, the projection including an end portion axially captured between the inboard radial wall and the outboard surface, a first hinge portion adjacent to the outer circumferential surface, and a second hinge portion disposed radially between the first hinge portion and the end portion.

In accordance with another embodiment of one or more of the inventions presented in this disclosure, a ferrule includes a body portion defining a tapered outer surface, a cylindrical interior wall, and a tapered interior camming mouth extending outward and rearward from the cylindrical interior wall, and a retaining projection extending radially outward of an outer circumferential surface of the first conduit gripping device, the projection including an end portion, a first hinge portion adjacent to the outer circumferential surface, and a second hinge portion disposed radially between the first hinge portion and the end portion.

In accordance with another embodiment of one or more of the inventions presented in this disclosure, a fitting assembly includes a fitting nut, a fitting body assembled with the fitting nut to define an interior volume surrounded by an interior wall of the fitting nut, and front and rear ferrules disposed within the interior volume. The front ferrule includes a front camming surface and a rear camming mouth, the rear camming mouth including an inner tapered portion extending at a first angle and an outer tapered portion extending at a second angle smaller than the first angle. When the fitting assembly is pulled up on a conduit end, a front end portion of the rear ferrule initially engages the outer tapered portion of the front ferrule camming mouth during a first portion of the pull-up, and subsequently engages the inner tapered portion of the front ferrule camming mouth during a second portion of the pull-up, such that the rear ferrule axially advances with respect to the front ferrule more rapidly during the first portion of the pull-up, as compared to the second portion of the pull-up.

These and other aspects and advantages of the inventions described herein will be readily appreciated and understood by those skilled in the art in view of the accompanying drawings.

BRIEF DESCRIPTION OF THE DRAWINGS

Further features and advantages of the inventions will become apparent from the following detailed description made with reference to the accompanying drawings, which are not necessarily (but may be) drawn to scale, wherein:

FIG. 1 is a longitudinal cross-sectional view of an exemplary fitting nut and ferrules, shown with the ferrules loosely inserted in the fitting nut;

FIG. 1A is an enlarged view of the circled region of FIG. 1;

FIG. 1C is an enlarged partial cross-sectional view of the nut and ferrules of FIG. 1, shown with the rear ferrule installed in a backwards orientation;

FIG. 2 is a longitudinal cross-sectional view of the fitting nut and ferrules of FIG. 1, shown assembled as a cartridged subassembly with the installation tool of FIG. 1B;

FIG. 2A is an enlarged view of the circled region of FIG. 2;

FIG. 4A is a partial enlarged cross-sectional view of the nut and ferrules of the subassembly of FIG. 2;

FIG. 5 is a longitudinal cross-sectional view of the conduit fitting assembly of FIG. 4, shown in a first pull-up condition;

FIG. 5A is an enlarged view of the circled region of FIG. 5;

FIG. 6 is a longitudinal cross-sectional view of the conduit fitting assembly of FIG. 4, shown in a second, further pulled-up condition;

FIG. 6A is an enlarged view of the circled region of FIG. 6;

FIG. 8 is a longitudinal cross-sectional view of the fitting nut and ferrules of FIG. 8, shown assembled as a cartridged preassembly with the installation tool of FIG. 8;

FIG. 8A is an enlarged view of the circled region of FIG. 8;

FIG. 11 is a longitudinal cross-sectional view of the conduit fitting assembly of FIG. 10, shown in a first pulled-up condition;

FIG. 11A is an enlarged view of the circled region of FIG. 11;

FIG. 12 is a longitudinal cross-sectional view of the conduit fitting assembly of FIG. 10, shown in a second, further pulled-up condition;

FIG. 12A is an enlarged view of the circled region of FIG. 12;

FIG. 13 is a partial longitudinal cross-sectional view of an exemplary front ferrule having a cartridging projection;

FIG. 14 is a longitudinal cross-sectional view of the ferrule of FIG. 13 loosely assembled with a fitting nut and a second ferrule, shown with an exemplary installation tool;

FIG. 21 is a longitudinal cross-sectional view of the conduit fitting assembly of FIG. 19, shown in a second, further pulled-up condition;

FIG. 21A is an enlarged view of the circled region of FIG. 21;

FIG. 22 is a longitudinal cross-sectional view of an exemplary fitting nut and ferrules, shown with the ferrules loosely inserted in the fitting nut;

FIG. 22A is an enlarged view of the circled region of FIG. 22;

FIG. 22B is an enlarged partial cross-sectional view of a cartridging portion of another exemplary ferrule;

FIG. 23 is a longitudinal cross-sectional view of the fitting nut and ferrules of FIG. 22, shown assembled as a cartridged preassembly;

FIG. 23A is an enlarged view of the circled region of FIG. 23;

FIG. 24 is a longitudinal cross-sectional view of a conduit fitting assembly using the subassembly of FIG. 22, shown in a pulled-up condition;

FIG. 24A is an enlarged view of the circled region of FIG. 24;

FIG. 25 is a perspective view of an exemplary ferrule;

FIG. 29 is a longitudinal cross-sectional view of an exemplary fitting nut and ferrules, shown with the ferrules loosely inserted in the fitting nut;

FIG. 29A is an enlarged view of the circled region of FIG. 29;

FIG. 29B is an enlarged partial cross-sectional view of the nut and ferrules of FIG. 29, shown with the rear ferrule installed in a backwards orientation;

FIG. 32 is a longitudinal cross-sectional view of an exemplary fitting nut and ferrules, shown with the ferrules loosely inserted in the fitting nut;

FIG. 32A is an enlarged view of the circled region of FIG. 32;

FIG. 33 is a longitudinal cross-sectional view of the fitting nut and ferrules of FIG. 32, shown assembled as a cartridged preassembly;

FIG. 33A is an enlarged view of the circled region of FIG. 33;

FIG. 34 is a longitudinal cross-sectional view of an exemplary fitting nut and ferrules, shown with the ferrules loosely inserted in the fitting nut;

FIG. 34A is an enlarged view of the circled region of FIG. 34;

FIG. 35 is a longitudinal cross-sectional view of the fitting nut and ferrules of FIG. 34, shown assembled as a cartridged preassembly;

FIG. 35A is an enlarged view of the circled region of FIG. 35;

FIG. 36 is a longitudinal cross-sectional view of an exemplary fitting nut and ferrules, shown with the ferrules loosely inserted in the fitting nut;

FIG. 36A is an enlarged view of the circled region of FIG. 36;

FIG. 37 is a longitudinal cross-sectional view of an exemplary fitting nut and ferrules, shown with the ferrules loosely inserted in the fitting nut;

FIG. 37A is an enlarged view of the circled region of FIG. 37;

FIG. 38 is a longitudinal cross-sectional view of the fitting nut and ferrules of FIG. 37, shown assembled as a cartridged preassembly;

FIG. 38A is an enlarged view of the circled region of FIG. 38;

FIG. 46 is a longitudinal cross-sectional view of the fitting nut and ferrules of FIG. 44, shown assembled with a fitting body and pulled up on a conduit end;

FIG. 46A is an enlarged view of the circled region of FIG. 46;

FIG. 47 is a longitudinal cross-sectional view of an exemplary fitting nut and ferrules, shown with the ferrules loosely inserted in the fitting nut;

FIG. 47A is an enlarged view of the circled region of FIG. 47;

FIG. 50 is a longitudinal cross-sectional view of an exemplary fitting nut and ferrules, shown with the ferrules loosely inserted in the fitting nut;

FIG. 50A is an enlarged view of the circled region of FIG. 50;

FIG. 51 is a longitudinal cross-sectional view of the fitting nut and ferrules of FIG. 50, shown assembled as a cartridged preassembly;

FIG. 51A is an enlarged view of the circled region of FIG. 51;

FIG. 53 is a longitudinal cross-sectional view of the conduit fitting assembly of FIG. 52, shown in a partially pulled-up condition;

FIG. 53A is an enlarged view of the circled region of FIG. 53;

FIG. 54 is a longitudinal cross-sectional view of an exemplary fitting nut and ferrules, shown with the ferrules loosely inserted in the fitting nut;

FIG. 54A is an enlarged view of the circled region of FIG. 54;

FIG. 54B is a longitudinal cross-sectional view of the fitting nut and loosely inserted ferrules of FIG. 54, shown with an exemplary installation tool;

FIG. 55 is a longitudinal cross-sectional view of the fitting nut and loosely inserted ferrules of FIG. 54, shown assembled as a cartridged preassembly with the installation tool of FIG. 54B;

FIG. 55A is an enlarged view of the circled region of FIG. 55;

FIG. 56 is a longitudinal cross-sectional view of the fitting nut and ferrules of FIG. 54, shown assembled as a cartridged preassembly with another exemplary tool; and FIG. 57 is a longitudinal cross-sectional view of another conduit fitting assembly, shown in a finger tight condition.

DESCRIPTION OF THE EXEMPLARY EMBODIMENTS

Figure 1B:
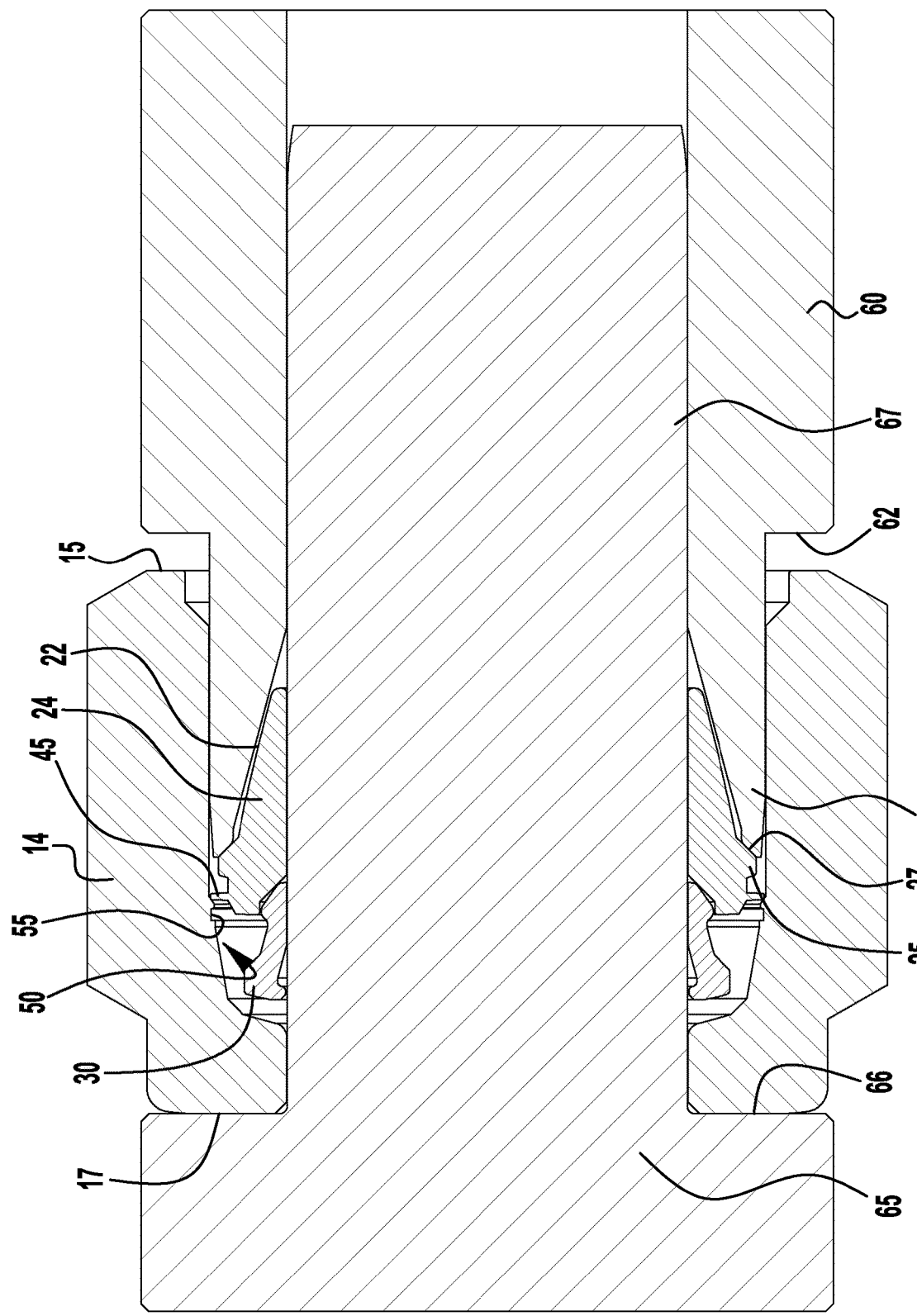
FIG. 1B is a longitudinal cross-sectional view of the fitting nut and loosely inserted ferrules of FIG. 1, shown with an exemplary installation tool.

Although the exemplary embodiments herein are presented in the context of a stainless steel tube fitting, the inventions herein are not limited to such applications, and will find use with many different conduits such as tube and pipe as well as different materials other than 316 stainless steel, including metals and non-metals for either the conduit, the gripping devices or the fitting components or any combination thereof. The inventions may also be used for liquid or gas fluid systems. While the inventions herein are illustrated with respect to particular designs of the conduit gripping devices and fitting components, the inventions are not limited to use with such designs, and will find application in many different fitting designs that use one or more conduit gripping devices. We use the term "conventional" to refer to commercially available or later developed parts or parts that are otherwise commonly known, used or that those of ordinary skill in the art would be familiar with in general, as distinguished from parts that may be modified in accordance with teachings herein. We use the term "ferrule set" to refer to a combination of conduit gripping devices with or without other parts that form the means by which conduit grip and seal are achieved. Although not necessary with all fitting designs, it is common that a ferrule set comprises two ferrules that are purposely matched to each other and to the fitting components, for example, based on material, manufacturer, interrelated design and geometry features and so on. In some fittings, in addition to the conduit gripping devices there may be one or more additional parts, for example seals. Therefore, the term "ferrule set" may also include in some embodiments the combination of one or more conduit gripping devices with one or more other parts by which the ferrule set effects conduit grip and seal after a complete pull-up. The inventions may be used with tube or pipe, so we use the term "conduit" to include tube or pipe or both. We generally use the term "fitting assembly" or "fitting" interchangeably as a shorthand reference to an assembly of typically first and second fitting components along with one or more conduit gripping devices. The concept of a "fitting assembly" thus may include assembly of the parts onto a conduit, either in a finger-tight position, a partial pull-up position or complete pull-up position; but the term "fitting assembly" is also intended to include an assembly of parts together without a conduit, for example for shipping or handling, as well as the constituent parts themselves even if not assembled together.

The term "complete pull-up" and derivative forms as used herein refers to joining the fitting components together so as to cause the one or more conduit gripping devices to deform, usually but not necessarily plastically deform, to create a fluid tight seal and grip of the fitting assembly on the conduit. A "partial pull-up" and derivative terms as used herein refers to a partial but sufficient tightening of the male and female fitting components together so as to cause the conduit gripping device or devices to deform so as to be radially compressed against and thus attached to the conduit, but not necessarily having created a fluid tight connection or the required conduit grip that is achieved after a complete pull-up. The term "partial pull-up" thus may also be understood to include what is often referred to in the art as pre-swaging wherein a swaging tool is used to deform the ferrules onto the conduit sufficiently so that the ferrules and the nut are retained on the conduit prior to being mated with the second fitting component to form a complete fitting assembly. A finger tight position or condition refers to the fitting components and conduit gripping devices being loosely assembled onto the conduit but without any significant tightening of the male and female fitting components together, usually typified by the conduit gripping device or devices not undergoing plastic deformation.

Fittings typically include two fitting components that are joined together, and one or more gripping devices, however, the inventions herein may be used with fittings that include additional pieces and parts. For example, a union fitting may include a body and two nuts. We also use the term "fitting remake" and derivative terms herein to refer to a fitting assembly that has been at least once tightened or completely pulled-up, loosened, and then re-tightened to another completely pulled-up position. Remakes may be done with the same fitting assembly parts (e.g. nut, body, ferrules), for example, or may involve the replacement of one or more of the parts of the fitting assembly. Reference herein to "outboard," "axially outward," "inboard," and "axially inward" are for convenience and simply refer to whether a direction is towards the center of a fitting (inboard or axially inward) or away from the center (outboard or axially outward). In the drawings, various gaps and spaces between parts (for example, gaps between the ferrules and the conduit in a finger-tight position) may be somewhat exaggerated for clarity or due to scale of the drawings.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

A significant feature of some of the inventions herein is the provision of a retaining structure by which one or more conduit gripping devices are retained with a fitting component, also referred to herein as a retaining fitting component, prior to assembly of the fitting component with a mating fitting component. By "cartridge" we mean a group of parts retained together as a discontinuous unit, subassembly or preassembly. We therefore use the terms cartridge, unit, subassembly and preassembly synonymously herein in the context of a discontinuous structure. We also use the term "cartridge nut" or "conduit fitting cartridge" herein to refer to such a cartridge, unit or subassembly in which one or more conduit gripping devices are retained with a fitting component such as a female nut, for example. We also use the term "ferrule cartridge" or "conduit gripping device cartridge" to refer to a unit or subassembly made up of at least one ferrule or conduit gripping device with at least one other part held together as a discrete unit. In particular, a "ferrule cartridge" includes two or more ferrules held together as a discrete unit or subassembly, and may include additional parts, for example, seals. In the exemplary embodiments herein, the cartridge includes one or more ferrules retained with a fitting component, such as a female threaded nut. Therefore, the exemplary embodiments herein may be referred to as a cartridge nut design, however in alternative embodiments, a "cartridge nut" may include a male threaded cartridge nut design or a cartridge body design.

We use the term "discontinuous" to describe the conjoined nature of the cartridge or preassembly in the sense that the one or more conduit gripping devices and the retaining fitting component, for example a female threaded nut in illustrated embodiments described herein, are manufactured as separate and discrete components and remain separate and discrete components, although in accordance with the inventions herein these components may be retained together as a discrete cartridge, subassembly or preassembly, and further wherein after final assembly or even a complete pull-up the parts remain discrete and may be disassembled into their constituent discrete parts if so desired. The terms "discontinuous" or "conjoined" are used herein to distinguish from fitting designs in which a conduit gripping device is attached to or made integral with a fitting component, wherein the conduit gripping device may remain integral or may in some designs break off or detach from the fitting component during complete or partial pull-up. In a discontinuous type structure, as that terminology is used in this disclosure, the one or more conduit gripping devices may optionally release or become separable from the retaining fitting component during either partial or complete pull-up without requiring a fracture, shear or other separation of the retaining fitting component material or adhesive. The terms "discontinuous" or "conjoined" are further intended to include broadly the idea that the one or more conduit gripping devices may be loosely or alternatively snugly retained with the retaining fitting component.

As one aspect of the present application, use of a discontinuous fitting component cartridge may facilitate providing ferrule sets to the end user in which the ferrules and nuts are properly oriented, matched, and assembled at the manufacturer. This can significantly simplify inventory control and reduce final assembly time. The embodiments herein also allow for a cartridge design in which the retaining fitting component may be used for fitting assemblies that do not need or have the retaining member. In other words, the cartridge designs herein use a nut or retaining fitting component that is backwards compatible with fitting assemblies that the end user may not require with a retaining structure. The cartridge design also may be realized using ferrule sets that do not require modification. Therefore, the cartridge concepts herein may be optionally provided for an end user without having to manufacture nuts or ferrules with different geometry and operation or performance. This allows the convenience of manufacturing and selling fitting components and ferrules as separate parts regardless of the end use of such individual parts, either for a cartridge use or a non-cartridge use.

As another aspect of the present application, a cartridge design with a female fitting component may include a ferrule or ferrules that are retained within the machined socket of the female fitting component (e.g., female nut), with the inboard fitting component end extending preferably but not necessarily axially past the front end of the front ferrule. The ferrule or ferrules thus are somewhat shrouded and protected from possible damaging impacts against the ferrule surfaces.

Exemplary cartridge nut arrangements are described in co-owned U.S. Pat. No. 8,931,810 (THE '810 Patent") and U.S. patent Non-provisional application Ser. No. 15/248, 288, filed on Aug. 26, 2016 and titled COMPONENT RETAINING STRUCTURE FOR CONDUIT FITTING (the '288 Application"), the entire disclosures of both of which are incorporated herein by reference. In some embodiments of the '810 Patent and the '288 Application (see, e.g., the embodiments of FIGS. 23-42 of the '810 Patent and the embodiments of FIGS. 1A-6B of the '288 Application), a component retaining or cartridging structure includes a separate retaining ring that is moveable within a retaining fitting component (e.g., fitting nut) between a first position that retains or captures a portion of the conduit gripping device within the retaining fitting component, and a second position radially spaced apart from the portion of the conduit gripping device to permit withdrawal or removal of the conduit gripping device from the retaining fitting component. In other embodiments of the '810 Patent and the '288 Application (see, e.g., the embodiments of FIGS. 1-22 of the '810 Patent and the embodiments of FIGS. 7-17 of the '288 Application), a radially outer portion of the conduit gripping device or ferrule engages a radially inner portion of the retaining fitting component or nut during installation or cartridging, with either or both of the radially outer ferrule portion and the radially inner nut portion elastically deforming to allow the radially outer ferrule portion to move axially outward of the radially inner nut portion, and then snap back into radial alignment to retain the radially outer ferrule portion between the radially inner nut portion and an outboard annular shoulder of the nut.

According to an exemplary aspect of the present application, a retaining arrangement for a conduit gripping device may rely at least in part on a plastic deformation of a radially outer ferrule portion during cartridging to facilitate retention of the conduit gripping device with the retaining fitting component. For example, a conduit gripping device (e.g., single ferrule or front ferrule of a two ferrule fitting assembly) may be provided with a projection (e.g., skirt, tab, or flange) extending radially outward of an outer circumferential surface of the conduit gripping device. The retaining fitting component (e.g., fitting nut) may include an interior wall having a narrowed or smaller diameter inboard portion sized to bend the projection radially and axially inward to allow the projection to advance axially outward of the narrowed inboard portion into a stepped recess portion of the interior wall. Once the projection is advanced axially past the narrowed inboard portion, the projection snaps radially and axially back outward (i.e., due to an elastic component of the bending deformation) while remaining in an axially inward angled orientation (i.e., due to a plastic component of the bending deformation). This inward angled orientation of the projection on the cartridged conduit gripping device and the steep radial surface between the narrowed inboard portion and the recessed portion provide resistance to axially outward bending of the projection when the conduit gripping device is moved axially inward (i.e., toward withdrawal from the retaining fitting component).

With reference to FIGS. 1-6, an exemplary embodiment of one or more of the inventions is presented. Note that in the drawings herein, including FIGS. 1-6, the fittings or fitting components are illustrated in longitudinal or half-longitudinal cross-section, it being understood by those skilled in the art that the fitting components are in practice annular parts about a longitudinal centerline axis or central axis X, and may, but need not, be circumferentially continuous. All references herein to "radial" and "axial" are referenced to this central axis except as otherwise noted. Also, all references herein to angles "with respect to the central axis" are referenced to the central axis X in the outward direction (i.e., with 0° representing a direction along the central axis toward the outboard end of the fitting, and with 180° representing a direction along the central axis toward the inboard end of the fitting), except as may be otherwise noted.

In this disclosure unless otherwise noted, a fitting assembly 10 may include a first coupling or fitting component 12 and a second coupling or fitting component 14 (as shown in FIG. 6). These parts are commonly known in the art as a body and nut respectively, wherein the fitting body 12 receives a conduit end 18, and the fitting nut 14 may be joined to the body 12 during make up of the fitting. Although we use the common terms of body and nut herein as a convenience, those skilled in the art will appreciate that the inventions are not limited to applications wherein such terminology may be used to describe the parts. The body 12 may be a stand-alone component as illustrated or may be integral with or integrated or assembled into another component or assembly such as, for example, a valve, a tank or other flow device or fluid containment device. The body 12 may have many different configurations, for example, a union, a tee, or an elbow, to name a few that are well known in the art. Although the body 12 and nut 14 are generally described herein as being threadably joined together by a threaded connection 16, threaded connections are not required in all uses. For example, some fittings have parts that are clamped together. Fittings are also commonly referred to in the art as male fittings or female fittings, with the distinction being that for a male fitting (FIGS. 1-5), the male body 12 includes an externally threaded portion 16a and the female nut 14 includes an internally threaded portion 16b. For a female fitting (not shown), the male nut includes an externally threaded portion and the female body includes an internally threaded portion. Many of the exemplary embodiments herein illustrate a male fitting assembly embodiment, for example, but the inventions herein also may be conveniently adapted for use with a female fitting assembly. When the fitting components, such as a body and nut for example, are joined they form a generally enclosed interior space or volume for the conduit gripping devices or other optional seal components.

Figure 4:
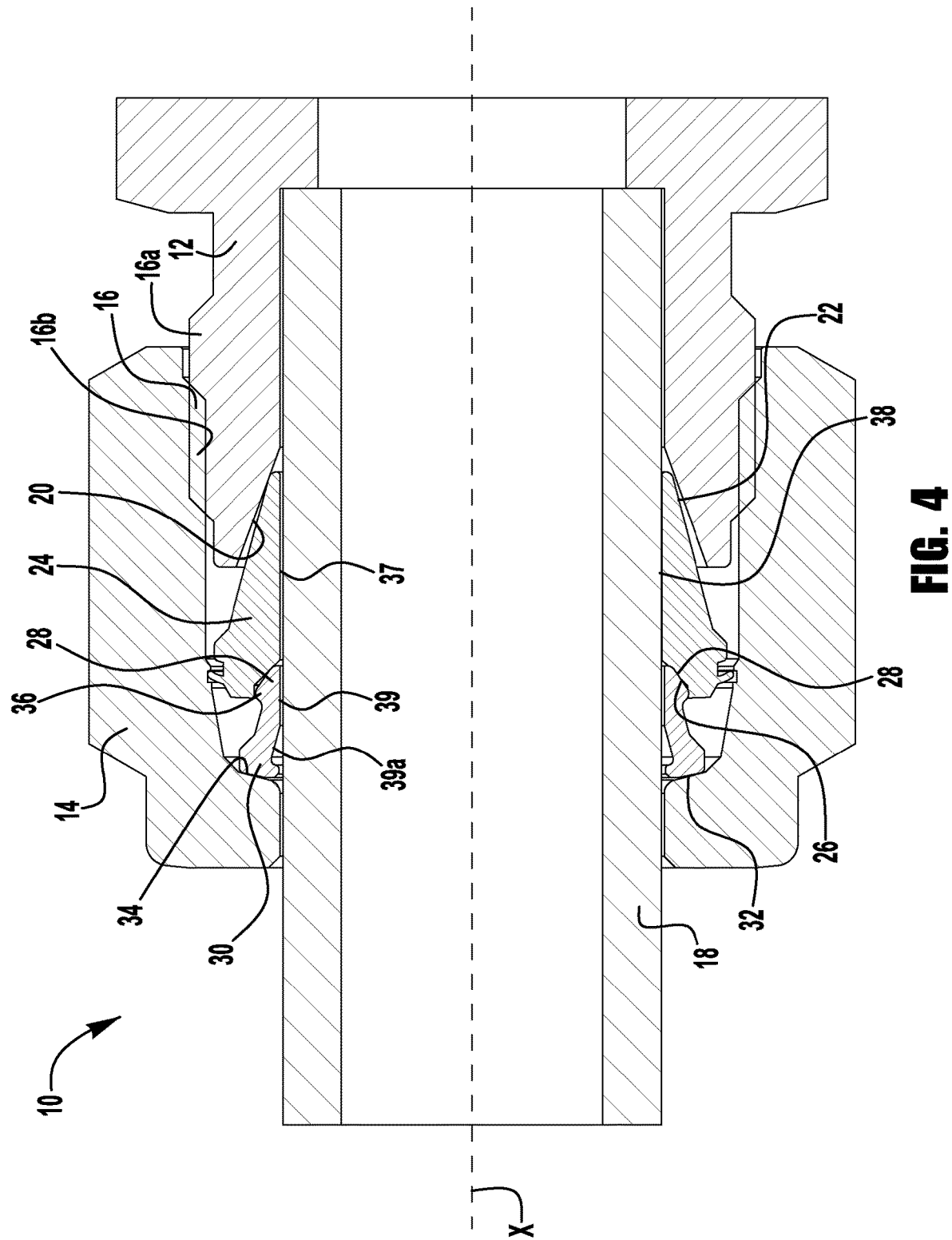
FIG. 4 is a longitudinal cross-sectional view of a conduit fitting assembly using the subassembly of FIG. 2, with the fitting assembly illustrated in a finger tight condition.

The fitting assembly 10 may be used to form a fluid tight connection between an end portion 18 of a conduit and the body 12 using one or more conduit gripping devices, which in the exemplary embodiments herein may be realized in the form of one or more ferrules. However, conduit gripping devices other than those that may be understood in the art as 'ferrules' may also be used with the inventions herein. The conduit end 18 typically bottoms against a radial shoulder 19 that is part of the body 12, as is well known. The body 12 includes a tapered (e.g., circumferentially continuous frustoconical) camming surface 20 that engages the front portion 22 of a first or front conduit gripping device or ferrule 24. The front ferrule 24 includes a tapered end surface or camming mouth 26 at its back end that engages a front portion or tapered (e.g., circumferentially continuous frustoconical) camming surface 28 of a second or rear conduit gripping device or ferrule 30. The rear ferrule 30 includes a driven surface 32 that engages a drive surface 34 of the female nut 14. The rear ferrule front portion 28 may optionally include a radially extending crown 36. As shown in FIG. 4, the front and rear ferrules include cylindrical interior walls 37, 39 that are closely received over the outer surface 38 of the conduit 18. The rear ferrule may optionally include one or more radial recesses 39a. Although the exemplary embodiments herein illustrate fitting assemblies that use a conduit gripping device or ferrule set having two conduit gripping devices or ferrules, the inventions will readily find application to fittings that may use only a single conduit gripping device, as well as fittings that may use ferrule sets having more than two conduit gripping devices, or additional parts other than just ferrules or conduit gripping devices, for example, additional seals.

It is important to note that the exemplary geometric shapes, configurations and designs of the body and nut 12, 14, and the front and rear ferrules 24, 30 of all of the embodiments described herein are a matter of design choice and will depend in great measure on the materials used, and the design and performance criteria expected of the fitting. Many different coupling components and conduit gripping device designs are known in the art and may be designed in the future. The present disclosure and the inventions described herein and illustrated in the context of exemplary embodiments are directed to structure and method of retaining at least one conduit gripping device with one or a first of the fitting components as a discontinuous subassembly or cartridge which can thereafter be joined with another or second fitting component to form a fitting assembly.

The ferrule retaining structure of the embodiment of FIGS. 1-6 includes a radially outward extending projection 45 on the front ferrule 24 that is axially captured in a circumferential recess 55 formed in an interior wall 50 of the nut 14 when the ferrule is cartridged with the nut, as described below. While exemplary embodiments described herein include continuous circumferential projections having a uniform cross section around the entire circumference of the ferrule, in other embodiments (not shown), ferrules (or other conduit gripping devices) may be provided with non-uniform, discontinuous, or multiple discrete projections, such as, for example, a series of tabs or flanges.

The circumferential projection may extend in a wide variety of orientations to accommodate different fitting geometries, such as, for example, at any suitable angle between about 70° and about 175° with respect to the central axis. In the illustrated embodiment, the circumferential projection 45 extends generally laterally outward (e.g., at an angle between about 70° and about 120° with respect to the central axis X) prior to cartridging the ferrule 24 in the nut 14, or at least slightly axially inward (e.g., between about 90° and about 120° with respect to the central axis X). The circumferential recess 55 is defined by, and disposed between, an outward facing inboard radial wall 54 extending radially outward from an outwardly narrowing tapered inboard surface 53 of the nut interior wall 50, and an inward facing outboard radial wall 56, extending radially outward from an outwardly narrowing tapered outboard surface 57 of the nut interior wall 50. As shown, the outboard radial wall 56 extends radially inward to a smaller diameter than the inboard radial wall 54. In other embodiments (not shown), the inboard radial wall may extend radially inward to the same diameter or to a smaller diameter than the outboard radial wall.

FIGS. 1, 1A, and 1B illustrate the fitting nut 14 and ferrules 24, 30 in a loose or pre-cartridged condition, with the rear ferrule 30 axially disposed between the front ferrule 24 and a radially extending shoulder or drive surface 34 of the fitting nut 14. Prior to cartridging, the projection 40 extends radially outward such that an end portion 46 of the projection 45 is at a diameter that is larger than a minimum diameter of the inboard surface 53 of the interior wall 50. An axial force applied to the front ferrule 24 against the tapered inboard surface causes the projection to bend or pivot (or be axially and radially deformed) about a radially inner hinge portion 43 to receive the projection past the narrowed portion of the inboard surface 53, and to axially align the projection 45 with the circumferential recess 55 in the nut 14 (see FIGS. 2 and 2A). In this aligned position, the deformed projection 45 snaps back outward for radial overlap or alignment with the inboard radial wall 54, while maintaining an axially inward angled position (e.g., between about 90° and about 120° with respect to the central axis X) due to partial plastic deformation of the projection 45. The inward angle of the cartridged projection 45, combined with the generally lateral orientation of the inboard radial wall 54 (e.g., about 90° with respect to the central axis X, or tapered to between about 45° and about 90° with respect to the central axis X, for example, for ease of manufacturing) provides resistance to further bending of the projection 45 when the front ferrule 24 is bumped axially inward (e.g., when the cartridged fitting subassembly is bumped or dropped). The outward radial extent of the cartridged projection 45 may limit lateral movement of the cartridged ferrule 24 within the nut 14, to prevent or minimize any dislodging of the ferrule 24 from the nut 14.

As shown in FIG. 2A, the cartridged projection 45 may be positioned such that the end portion 46 contacts or nearly contacts the surface of the circumferential recess 55, to minimize or eliminate any radial gap between the projection and the recess. The elimination or minimization of any radial gap effectively reduces or eliminates lateral movement of the cartridged ferrule 24 within the nut 14, and results in more secure retention of the cartridged ferrule within the nut. In some embodiments, a very small radial gap (e.g., up to about 0.002 inches) may be desirable to provide free movement of the front ferrule for alignment when inserting the conduit end and to assure contact of the ferrules and nut drive surfaces in the finger tight condition of the fitting.

To preassemble or "cartridge" the ferrules 24, 30 into the nut 14, a controlled axial force may be applied to an axially inward facing portion of the front ferrule 24. The applied force may be an amount sufficient to bend the projection 45 enough to axially advance the projection past the tapered inboard surface 53 of the nut interior wall 50 and into alignment with the circumferential recess 55, without further inward plastic bending of the projection that would risk dislodging of the cartridged ferrule 24. This controlled axial displacement and projection deformation during cartridging may be facilitated by configuring the retaining arrangement such that when the projection 45 is axially advanced into cartridged alignment with the circumferential recess 55 (FIG. 4), the outboard end surface or camming mouth 26 of the front ferrule 24 abuts the inboard end or camming surface 28 of the rear ferrule 30, and an outboard end surface 32 of the rear ferrule 30 abuts the outboard annular shoulder or drive surface 34 of the nut 14. The increased resistance to axial advancement at this position of front ferrule 24, rear ferrule 30, and nut 14 abutment provides a positive indication that the ferrules 24, 30 have been cartridged with the nut 14.

According to another exemplary embodiment, as shown in FIGS. 1B and 2, an installation tool 60 may be used to apply a controlled axial force to the front ferrule 24 to cartridge the ferrules with the nut. As shown, the tool 60 may be provided with an annular nose portion 61 that is inserted into the nut 14 between the camming surface 22 of the front ferrule 24 and the interior wall 50 of the nut. The nose portion 61 centers the ferrules 24, 30 within the nut 14 and may engage an inward facing surface 27 of an outer flange or boss portion 25 of the front ferrule 24, such that the axial force is applied to the outer flange portion 25 and not the camming surface 22. As shown, an alignment pin tool 65 may (but need not) additionally be assembled with the nut 14, by insertion of a shaft portion 67 of the alignment pin tool 65 through the interior wall 50 of the nut and into a central bore 63 in the installation tool 60, and abutment of an inner shoulder portion 66 with an outboard end surface 17 of the nut 14. A rear shoulder portion 62 of the tool 60 may be configured to abut an inboard end surface 15 of the nut 14 when the nose portion 61 has advanced the front ferrule 24 to axially align the projection 45 with the circumferential recess 55 (as shown in FIG. 2), such that abutment of the tool shoulder portion 62 with the nut end surface 15 provides a positive stop indication that the ferrules 24, 30 have been cartridged in the nut 14, and may prevent excessive bending of the projection 45 beyond the cartridged position.

Other types of installation tools may be used to apply an axial cartridging force to the ferrules. As one example (not shown), a shaft or pin-shaped tool may be inserted into the inboard end of the nut to engage the nose portion of the front ferrule. As another example (not shown), a shaft or tubular installation tool may be inserted into the inboard end of the nut and manipulated to apply an uneven or eccentric axial load on the front ferrule, to provide for initial localized deformation of a portion of the projection and subsequent deformation of a remaining portion of the projection into the nut recess (e.g., with the front ferrule in an initial cocked condition), which may reduce the axial force needed to install the ferrules in the cartridged condition. As still another example (not shown), an axial force may be applied to the loosely inserted front ferrule by threading the fitting nut onto a mating fitting body or threaded installation tool, such that the incremental axial advancement of the threaded body/tool with respect to the nut causes the outboard end of the body/tool to axially advance the front ferrule into the cartridged position. When using a fitting body or threaded tool to cartridge the ferrules with the nut, a measurable torque rise corresponding to abutment of the outboard end surface of the front ferrule abuts an inboard end surface of the rear ferrule and abutment of the outboard end surface of the rear ferrule abuts the outboard annular shoulder or drive surface of the nut. Alternatively, a threaded tool may be provided with a shoulder or other structure configured to engage an inboard end surface of the nut when the tool end portion has advanced the front ferrule to axially align the projection with the circumferential recess 55, such that abutment of the tool shoulder with the nut end surface provides a positive stop indication that the ferrules have been cartridged in the nut.

Figure 3:
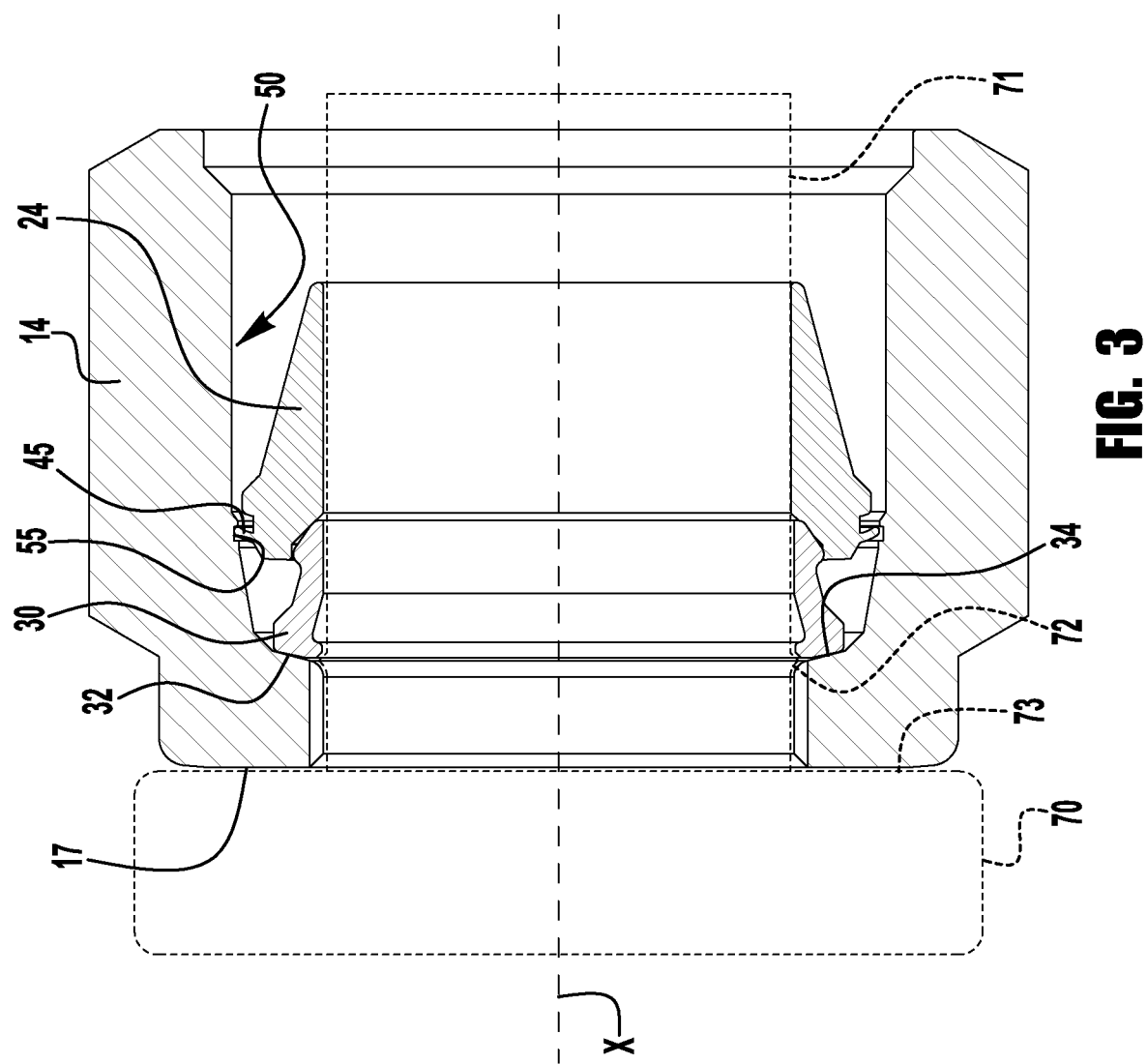
FIG. 3 is a longitudinal cross-sectional view of the fitting nut and ferrules of FIG. 1, shown assembled as a cartridged preassembly with another exemplary installation tool.

While the elastic spring-back or recovery of the projection 45 into the circumferential recess 55 may provide sufficient interference between the projection end portion 46 and the inboard radial wall 54 to axially capture the projection, in another embodiment, the cartridging process may further include a controlled inward axial force applied to the cartridged front ferrule 24, subsequent to application of the outward axial force, such that axial engagement between the projection end portion 46 and the inboard radial wall 54 bends the projection 45 axially and radially outward. This axial and radial outward bending (e.g., to an angle between 90° and 120° with respect to the central axis X) may provide greater radial interference between the projection end portion 46 and the inboard radial wall 54, and reduced radial clearance between the projection end portion and the circumferential recess, for example, to compensate for ferrule cartridging projections for which elastic spring-back may be insufficient to ensure secure cartridging. As shown in FIG. 3, a second installation tool (shown in phantom at 70) may be used to apply a controlled inward axial force through the rear ferrule 30 to the front ferrule 24, to radially expand the projection 45 into increased radial interengagement with the inboard radial surface 54. The exemplary second installation tool 70 includes a central shaft portion 71 that is inserted through the ferrules 24, 30 to center the ferrules within the nut 14, and a raised circumferential band 72 sized to be received through the outboard end of the nut for engagement with the outboard end surface 32 of the rear ferrule 30, such that the inward axial force is applied to the rear ferrule 30, and transmitted to the front ferrule 24. A rear shoulder portion 73 of the second installation tool 70 may be configured to abut an outboard end surface 17 of the nut 14 when the band 72 has axially retracted the front and rear ferrules 24, 30 an amount sufficient to engage the projection 45 with the inboard radial surface 54 for radial expansion of the projection within the recess 55, such that abutment of the shoulder portion 73 with the nut end surface 17 provides a positive stop indication that the front ferrule projection 45 has been sufficiently expanded. Other axially inward force applying tools may be utilized, including for example, a tool that grips or hooks onto the inner diameter of the outboard end surface 26 of the front ferrule or the outer diameter of the outer boss portion 25 of the front ferrule (not shown). Alternatively, a tool may be inserted through the inboard side of the nut to directly engage and axially bend the projection outward following the initial cartridge process (not shown).

According to another exemplary aspect of the present application, a tool applying an inward axial force to the ferrule or ferrules may be used to remove the cartridged ferrules from the nut, for example, to perform special cleaning or coating operations on the ferrules, to replace the previously installed ferrules with different ferrules (e.g., different materials, hardnesses, etc.), or for use of the nut on a different fitting arrangement (e.g., with an adapter that does not require ferrules, or with other ferrules that have already been compressed onto a conduit end). In such an embodiment, the tool (e.g., the tool 70 of FIG. 3) may include a rear shoulder portion 73 configured to abut the outboard end surface 17 of the nut 14 when a raised ferrule engaging band 72 of the tool has axially retracted the front and rear ferrules 24, 30 an amount sufficient to axially move the projection 45 inboard of the narrowed inboard surface 53 of the nut interior wall 50, such that abutment of the shoulder portion 73 with the nut end surface 17 provides a positive indication that the cartridged front ferrule 24 (and with it, the rear ferrule 30) have been released from the nut 14. Other axially inward force applying tools may be utilized, including for example, a tool that grips or hooks onto the inner diameter of the outboard end surface 26 of the front ferrule or the outer diameter of the outer boss portion 25 of the front ferrule (not shown), for pulling the front ferrule 24 in the axially inward direction. As another example, a shaft or tubular installation tool inserted into the inboard end of the nut and manipulated to apply an uneven or eccentric axial load on the front ferrule, to tilt or cock the front ferrule 24 within the nut 14, such that one side of front ferrule projection is forced axially inward for disengagement from the circumferential recess of the nut.

Figure 3A:
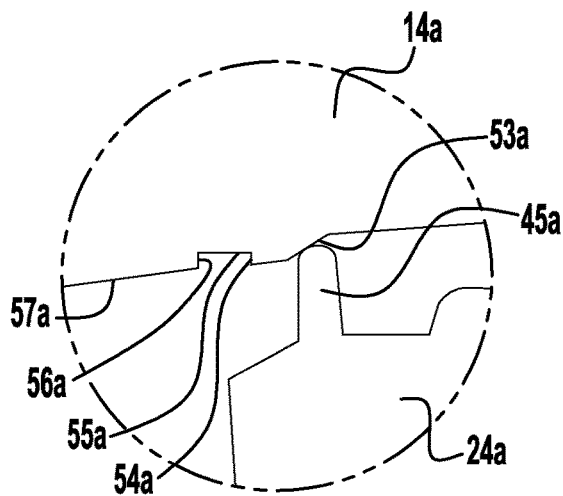
FIG. 3A is an enlarged partial view of another exemplary fitting nut and ferrule, shown with the ferrule loosely inserted in the fitting nut.
Figure 3B:
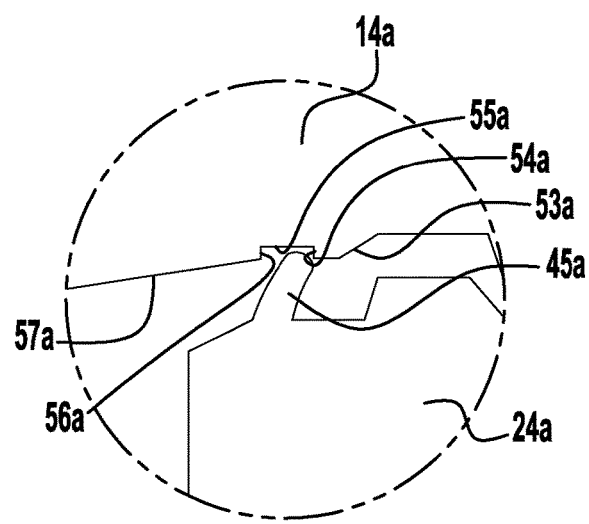
FIG. 3B is an enlarged partial view of the fitting nut and ferrule of FIG. 3A, shown assembled as a cartridged preassembly.

According to another aspect of the present application, in embodiment in which user removal of the cartridged ferrules from the cartridging nut is desirable, the cartridging features of either or both of the front ferrule and the nut may be configured to provide for a more easily releasable or "lightly cartridged" ferrule condition. For example, the portion of the cartridged projection end portion that radially overlaps with the inboard radial wall may be reduced (e.g., by providing a shallower circumferential recess in the nut, a radially shorter projection, or a cartridged projection with a steeper inward angle, for example, between about 120° and about 175°). FIGS. 3A and 3B illustrate retaining portions of an exemplary nut 14a and front ferrule 24a, with the nut including a shallower circumferential recess 55a and the ferrule including a radially shorter projection 45a. When the ferrule 24a has been cartridged with the nut 14a (e.g., using one or more of the tools and methods described above), as shown in FIG. 3B, the radial overlap of the projection 45a with the inboard radial wall 54a is reduced, thereby providing a cartridged condition that is more conducive to removal of the cartridged ferrules.

Figure 3C:
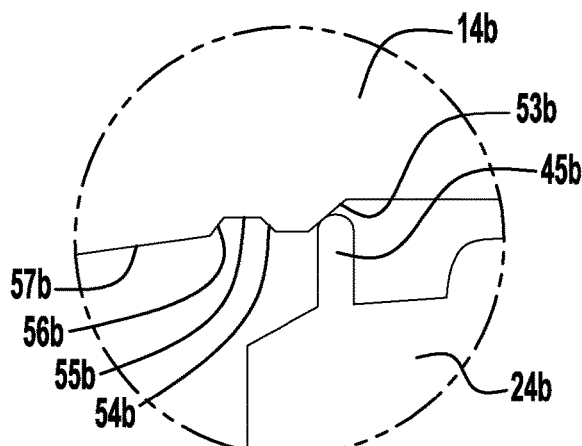
FIG. 3C is an enlarged partial view of another exemplary fitting nut and ferrule, shown with the ferrule loosely inserted in the fitting nut.
Figure 3D:
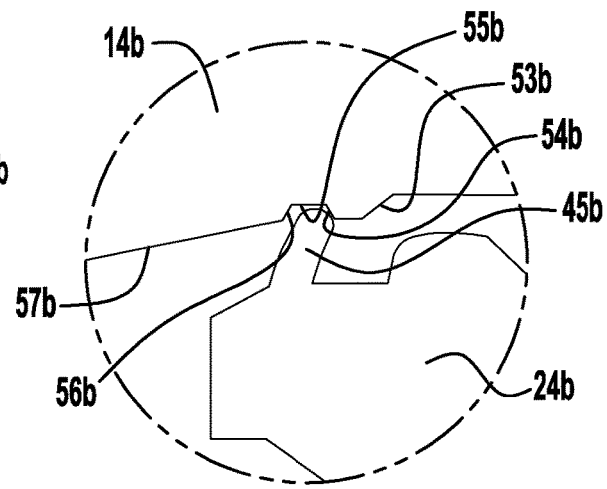
FIG. 3D is an enlarged partial view of the fitting nut and ferrule of FIG. 3C, shown assembled as a cartridged preassembly.

As another example, the inboard and/or outboard radial surfaces may be provided with a shallower taper angle (e.g., an inboard radial surface between about 30° and about 60° with respect to the central axis X, and/or an outboard radial surface between about 120° and about 150° with respect to the central axis). As a result, an inward axial force applied to the front ferrule (in the case of a shallower inboard radial wall) produces a larger radially inward force component against the projection, and a lateral, rocking force applied to the ferrule (in the case of a shallower outboard radial wall) allows for more pronounced cocking movement of the front ferrule to dislodge the ferrule. FIGS. 3C and 3D illustrate retaining portions of an exemplary nut 14b and front ferrule 24b, with the nut including a circumferential recess 55b having shallow tapered inboard and outboard radial walls 54b, 56b. When the ferrule 24b has been cartridged with the nut 14b (e.g., using one or more of the tools and methods described above), as shown in FIG. 3D, the projection 45b is axially captured between the shallow tapered inboard and outboard radial walls 54b, 56b, thereby providing a cartridged condition that is more conducive to removal of the cartridged ferrules.

Figure 3E:
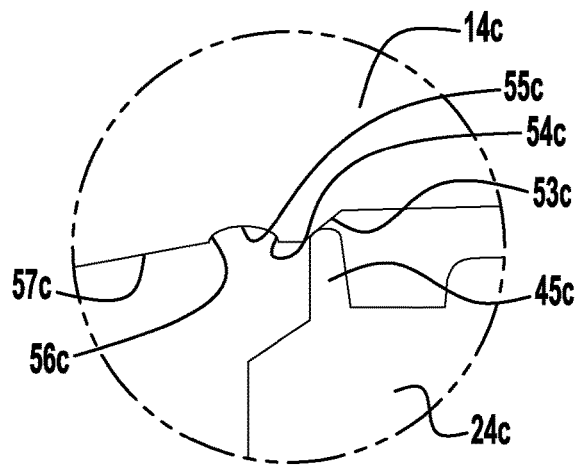
FIG. 3E is an enlarged partial view of another exemplary fitting nut and ferrule, shown with the ferrule loosely inserted in the fitting nut.
Figure 3F:
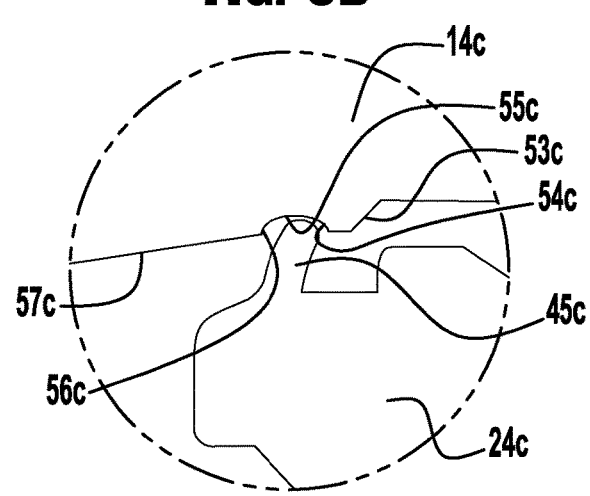
FIG. 3F is an enlarged partial view of the fitting nut and ferrule of FIG. 3E, shown assembled as a cartridged preassembly.

As another example, the inboard and outboard radial surfaces may be defined by contoured or radiused sides of a curved or scalloped circumferential recess, similarly providing shallow contoured sides of the recess to produce a larger radially inward force component against the projection, and to allow for more pronounced cocking movement of the front ferrule to dislodge the ferrule, as described above. FIGS. 3E and 3F illustrate retaining portions of an exemplary nut 14c and front ferrule 24c, with the nut including a contoured or scalloped circumferential recess 55c defining shallow contoured inboard and outboard radial walls 54c, 56c. When the ferrule 24c has been cartridged with the nut 14c (e.g., using one or more of the tools and methods described above), as shown in FIG. 3F, the projection 45c is axially captured between the shallow contoured inboard and outboard radial walls 54c, 56c, thereby providing a cartridged condition that is more conducive to removal of the cartridged ferrules.

As still another example, the projection may include a thinner or otherwise more flexible hinge portion, allowing for easier axially outward bending of the projection during a ferrule removal procedure (e.g., using one or more of the tools described above) to withdraw the projection from the circumferential recess. These same "lightly cartridged" cartridging features may also facilitate re-cartridging of the ferrules with the nut (or cartridging new ferrules with the de-cartridged nut, or a new nut with the de-cartridged ferrules), using one or more of the tools and/or methods described above, for example, by reducing the axial forces for cartridging.

When the ferrules (or other conduit gripping devices) of any of the embodiments described herein are cartridged in a fitting nut (or other retaining fitting component), the preassembly may be configured such that the ferrules are snugly held together and retained with the fitting component. In such an embodiment, the deformed projection may be snugly or even tightly received in the circumferential recess of the fitting nut. In other applications, it may be more desirable to have the ferrules somewhat loosely held together and retained with the fitting component, and may even have a slight rattle when the nut is gently shaken. This looseness may in some applications facilitate final assembly with the second or mating fitting component (in this example the body), especially in allowing the ferrules to center and align during pull-up of the fitting assembly without interfering with centering of the ferrules as the nut is initially rotated relative to the body, and without inhibiting tube insertion or providing a false indication of tube bottoming in the fitting.

As used herein, loose or loosely held cartridged components may be considered to include components that are axially moveable within the cartridging component such that they may be positioned at a location that is free of contact from surfaces defining the limits of axial movement, as discussed in greater detail below. This range of axial movement may be minimal (e.g., 0.002 inches). Loose or loosely held cartridged components may also be considered to include components that are radially movable within the cartridging component such that they may be positioned at a location that is free of contact from surfaces defining the limits of radial movement. This range of radial movement may be minimal (e.g., sufficient to permit rotation and/or resistance-free axial movement of the cartridged component). This loose or loosely held cartridged condition may permit or facilitate alignment of the ferrule bores with an inserted tube, or proper radial alignment of the ferrules with each other and with the body and nut. Snugly held cartridged components may be considered to include components that are not axially and/or radially moveable within the cartridging component, such that axial and/or rotational movement of the cartridged components is resisted by contact with surfaces restricting axial and/or radial movement. Tightly held cartridged components may be considered to include components that are forced into contact with surfaces restricting axial and/or radial movement, such that at least some deformation (e.g., plastic and/or elastic deformation) of these contacting surfaces has occurred.

To provide a desired axial and radial alignment of the front and rear ferrules in a cartridged nut and ferrule preassembly, the front ferrule may be provided with a rear counterbore into which a front end or nose portion of the rear ferrule may be received. This arrangement may facilitate suitable alignment of the front and rear ferrules within the cartridged subassembly, and may prevent misalignment of the ferrules within the subassembly (e.g., due to shock or vibration).

As one example, as shown in FIG. 4A, the front ferrule 24 may be provided with a rear portion 29 extending axially rearward of the camming mouth 26, and radially inward of the ferrule retaining projection 45 (or other such radially outer retaining feature on the ferrule). The rear portion 29 defines a rear bore 23, extending rearward from the rear camming mouth 26, into which a radially outer front portion 28 of the rear ferrule 30 may be received. As shown, the radially outer front portion 28 may, but need not, be radially enlarged relative to a central axial portion of the rear ferrule (e.g., a radially enlarged crown portion that additionally or alternatively facilitates ferrule cartridging, as described herein). This arrangement may facilitate suitable axial and radial alignment of the front and rear ferrules 24, 30 during cartridging of the ferrules with the nut 14, and within the cartridged subassembly. As one benefit, this alignment can ensure sufficient radial alignment of the front and rear ferrules with each other, for example, for substantial radial alignment of the axial bores of the front and rear ferrules for ease of tube installation, for substantial radial alignment of the front ferrule camming mouth 26 with the rear ferrule front portion 28, and to prevent misalignment of the ferrules within the cartridged assembly (e.g., due to impact or vibration). As another benefit, this alignment can provide for sufficient concentricity of the rear ferrule 30 within the nut 14, for example, for proper radial alignment of the rear ferrule driven surface 32 with the nut drive surface 34. As still another benefit, this alignment can provide for sufficient concentricity of the front ferrule 24 within the nut 14, for example, for proper radial alignment of the front ferrule retaining projection 45 and the nut retaining recess 55 to prevent misalignment and dislodging of the front ferrule from the nut of the cartridged assembly (e.g., due to impact or vibration).

To control radial and axial alignment of the ferrules 24, 30, with each other and with the cartridging nut 14, the nut and ferrules may be dimensioned such that the radial gaps between the nut and ferrule interengaging surfaces, when centered on a longitudinal axis X (as shown, for example, in FIG. 4), are minimized, including, for example, as shown in FIG. 4A: a radial gap g1 between the outer diameter of the front ferrule retaining projection 45 and the retaining recess 55 of the nut 14 (e.g., in the front ferrule's forward-most cartridged position); a radial gap g2 between the outer radial surface 25 of the front ferrule 24 and the aligned portion of the nut interior wall (e.g., in the front ferrule's rearward-most cartridged position); a radial gap g3 between the rear ferrule's radially outer front portion 36 and the aligned front ferrule rear bore 23 (e.g., in the front ferrule's forward-most cartridged position and the rear ferrule's rearward most cartridged position), and a radial gap g4 between the radially outer edge of the rear ferrule driven surface 32 and the aligned tapered end portion of the nut tapered wall surface 35 (e.g., in the rear ferrule's forward-most cartridged position). These gaps may be sized to be large enough to avoid a press fit or interference fit between the interengaging surfaces of the nut and ferrules, while reducing or minimizing radial movement radial movement as discussed about. For example, one or more of the radial gaps g1, g2, g3, g4 may be sized between about 0.00005 inches and about 0.015 inches, or between about 0.00005 inches and about 0.006 inches, or between about 0.00005 inches and about 0.003 inches, or between about 0.0005 inches and about 0.001 inches. In one embodiment, either or both of the rear ferrule radial gaps g3, g4 may be smaller than either or both of the front ferrule-nut radial gaps g1, g2, and may be reduced or minimized to further limit radial movement of the front ferrule 24, beyond the limits to radial movement of the front ferrule caused by the front ferrule-nut radial gaps g1, g2, for example, to prevent or impede misalignment of the retaining projection 45 and recess 55 and unintended disengagement of the front ferrule from the nut and ferrule subassembly. For example, the sum of the rear ferrule radial gaps g3, g4 may be smaller than either or both of the front ferrule-nut radial gaps g1, g2.

As another example, the front ferrule may be provided with an extended rear end section that defines a counterbore overhanging the rear ferrule front end or nose portion, which may prevent backwards installation of the rear ferrule, as a backwards installed rear ferrule would prevent cartridged installation of the front ferrule into the nut.

Further, the rear portion 29 of the front ferrule 24 may prevent backwards installation of the rear ferrule 30, by sizing the rear portion such that a backwards installed rear ferrule would prevent snap-fit cartridging installation of the front ferrule 24 into the nut 14. To provide for this misassembly prevention, the rear portion 29 may be sized such that when the front ferrule 24 is in the rearward most un-cartridged or non-retained position (i.e., with the rear surface of the ferrule retaining projection 45 engaging the inboard surface 53 of the nut interior wall, as shown in FIG. 1), the axial distance $ad_1$ between the backwards rear ferrule engaging portion 34x of the nut drive surface 34 and the backwards rear ferrule engaging portion 29x of the outboard axial projection 29 is smaller than the axial distance $ad_2$ between the backwards rear ferrule engaged portion 36x of the rear ferrule front portion 36 and the backwards rear ferrule engaged portion 32x of the rear ferrule driven surface 32 (as shown in FIG. 1C). Further, the total end-to-end length of the stacked front and rear ferrule may be significantly greater when the rear ferrule is in a backwards orientation, such that a visual or measurement-based inspection of the ferrules prior to installation may confirm the improper orientation of the rear ferrule. Additionally or alternatively, the outboard axial projection may be sized such that engagement between the outboard axial projection of the front ferrule and the driven surface of the backwards installed rear ferrule prevents the threads of the fitting nut from engaging the threads of the fitting body.

As discussed above, to avoid an additional cartridging step, and/or to avoid any resistance between the front and rear ferrules during assembly, the rear bore 23 of the front ferrule 24 may be sized and shaped to provide for slip fit receipt of the radially outer front portion 36 of the rear ferrule 30, or sized to permit insertion of the front end portion of the rear ferrule without the front end portion of the rear ferrule contacting an internal surface of the rear bore. As such, the bore 23 may be substantially cylindrical or outwardly tapered (or otherwise outwardly or rearwardly non-reducing) to eliminate any resistance to insertion or withdrawal of the rear ferrule radially outer front portion 36 in the rear bore 23. In an exemplary embodiment, the bore 23 may be provided with an outward taper selected to facilitate assembly over the front end nose portion of the rear ferrule 30. In another embodiment (not shown), a rear bore defining outboard axial projection on a front ferrule, sized for loose or slip fit insertion of a radially outer front (e.g., crown) portion of a rear ferrule, may be configured to be inwardly tapered or optionally crimped, rolled, peened, or otherwise radially compressed after insertion of the rear ferrule crown portion, for cartridged retention of the rear ferrule with the front ferrule, at least prior to installation of the ferrules onto a tube end as part of a fitting assembly.

FIG. 4 illustrates the fitting assembly 10 in a finger-tight condition, meaning that the various parts 12, 14, 24 and 30 have been assembled onto the conduit 18 but are loosely assembled or slightly tightened or snugged up by manually joining the nut 14 and body 12 together. Fittings are commonly pulled-up to a complete pulled-up position by counting complete and partial turns of the nut 14 relative to the body 12 from the finger-tight position. The present inventions, however, may be used with fitting designs that alternatively may be pulled-up by torque.

In many applications, it may be desirable after a partial or complete pull-up to be able to remove the retaining fitting component without disturbing the one or more conduit gripping devices. For example, after a fitting assembly 10 has been completely pulled up onto a conduit, the conduit gripping devices typically although not necessarily have been plastically deformed into a gripping engagement against the conduit 18 outer surface. It is not uncommon for assembled fittings to be later disassembled in order to allow maintenance and repair of one or more fluid components in a fluid system. After the repair or maintenance is completed the fitting is reassembled and retightened. This process is commonly referred to in the art as disassembly and remake. But in order to perform many repair and maintenance activities, the nut 14 often must be removed, or at least be slid axially back or away from the body 12 in order to allow the conduit to be withdrawn from the body 12. Typically, it will be desired to leave the one or more conduit gripping devices attached to the conduit 18, and even if that is not a desired outcome, it may often be desired to allow the nut to be pulled axially back away from the ferrules, which may not be possible unless the nut and ferrules have become released or separable from each other during pull-up. Therefore, it may be a desirable option that in such cases the nut and conduit gripping devices become separable during a partial or complete pull-up, at least to the extent that the ferrules and the retaining structure do not interfere with backing the retaining fitting component away from the mating fitting component and conduit gripping devices. The present inventions contemplate that the retained conduit gripping devices and the retaining fitting component, and particularly the retaining structure, initially assembled in the form of the discontinuous cartridge, can be separated or disengaged even after the conduit gripping devices have been fully installed on the conduit. In other words, the retaining structure may be designed so as to decouple the one or more conduit gripping devices from the nut (or other such retaining fitting component) after a partial or complete pull up of the fitting assembly onto the conduit. Examples of a variety of retaining structures that are releasable upon pull-up are described in the above incorporated '810 Patent and '288 Application.

According to an exemplary aspect of the present application, the outboard radial wall and outboard surface of the nut interior wall may be configured to bend or pivot the projection further axially and radially inward during complete or partial pull-up of the fitting on a conduit end, such that the end portion of the projection is positioned radially inward of the inboard surface of the nut interior wall, to allow withdrawal of the ferrules from the nut when the nut is disassembled from the body. In an exemplary embodiment, as shown in FIGS. 5 and 5A, when the fitting assembly 10 is tightened to an exemplary pulled-up condition (e.g., partial pull-up, initial complete pull-up, or remake), relative inward axial movement of the nut 14 with respect to the front ferrule 24 causes the front ferrule projection 45 to be bent axially and radially inward by the outboard surface 57 and the outboard radial wall 56 (which extends generally laterally, e.g., at about 90° with respect to the central axis X, or tapered to between about 90° and about 135° with respect to the central axis X). When the front ferrule projection 45 is bent to an angle (e.g., between 130° and 160° with respect to the central axis X) sufficient to position the projection end portion 46 radially inward of the narrowed inboard surface 53 of the nut interior wall 50, the front ferrule is axially disengageable from the nut, and the ferrules released from, or are no longer cartridged in the nut. This release condition may be selected to coincide with a partial pull-up that is sufficient to cause the ferrules 24, 30 to begin plastically deforming the conduit 18, such that subsequent loosening or separation of the nut 14 from the body 12 permits the released ferrule 24 to maintain gripping engagement with the deformed conduit surfaces. Alternatively, this release condition may coincide with a different pulled-up condition (e.g., initial complete pull-up or remake). The released ferrules 24, 30, retained on the conduit 18, may be reassembled with a fitting body and nut (either the fitting body and nut from the previous assembly, or a new body and nut) for remake of a fitting connection on the conduit.

As the exemplary fitting 10 is tightened (e.g., to an initial complete pull-up position), as shown in FIGS. 6 and 6A, the projection 45 is bent further axially and radially inward (e.g., to an angle between 150° and 180° with respect to the central axis X), to receive the bent projection entirely axially outward of the circumferential recess 55. Engagement of the bent projection 45 with the tapered outboard surface 57 of the nut interior wall 50 may provide additional plastic deformation of the projection 45 up to about 170° to about 180° relative to the central axis while the tapered outboard surface 57 provides for release of the ferrules upon release of the axial nut load. The benefits of such a tapered nut surface are further described in co-owned U.S. Pat. No. 8,007,013, the entire disclosure of which is incorporated herein by reference. The front ferrule 24 may also be provided with an outer circumferential annular recess or groove 42 that may be positioned adjacent to and axially inward from the projection 45 to provide clearance for this further inward bending of the projection 45.

According to another aspect of the present application, a fitting assembly adapted for more easily releasable or light cartridging, as described above, may also maintain a plastically deformed inward bent condition of the ferrule projection upon at least partial pull-up, as shown in FIGS. 5, 5A, 6, and 6A, for complete release of the ferrules from the nut upon pull-up.

According to another aspect of the present application, a retaining projection on a conduit gripping device (e.g., a single ferrule or a front ferrule of a two ferrule arrangement) may initially (i.e., prior to cartridging) extend in an axially outward angled orientation (e.g., between 30° and 70° with respect to the central axis, or between about 35° and about 55° with respect to the central axis) to form a skirt portion, such that an end portion of the projection is disposed radially inward of interior surfaces that are inboard of a retaining recess in a retaining fitting component (e.g., fitting nut). In such an embodiment, the projection may be loosely received in axial alignment with the retaining recess, without elastic deformation and snap-in engagement of the projection with the recess. To cartridge the conduit gripping device with the retaining fitting component, the retaining fitting component includes an inward facing, outboard radial wall that defines an outer end of the recess and extends radially inward into alignment with the end portion of the projection. When an axial outward force is applied to the conduit gripping device to engage the projection end portion with the outboard radial wall, the projection is bent or pivoted axially forward and radially outward to a position in which the projection end portion radially aligns with an inboard radial wall defining an inner end of the recess, such that the outward bent projection is axially captured in the recess between the inboard radial wall and the outboard radial wall.

Figure 9:
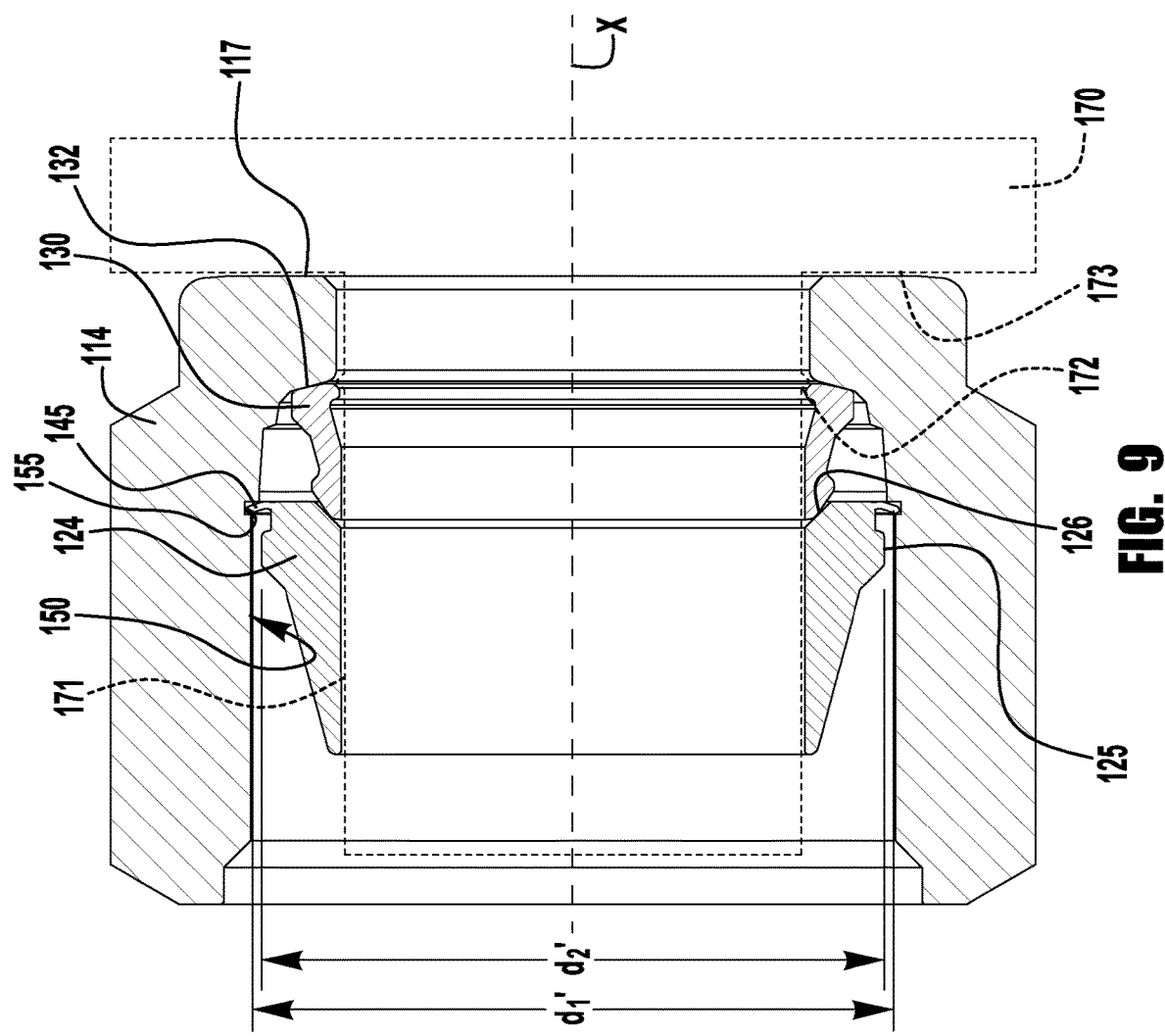
FIG. 9 is a longitudinal cross-sectional view of the fitting nut and ferrules of FIG. 7, shown assembled as a cartridged preassembly with another exemplary tool.
Figure 10:
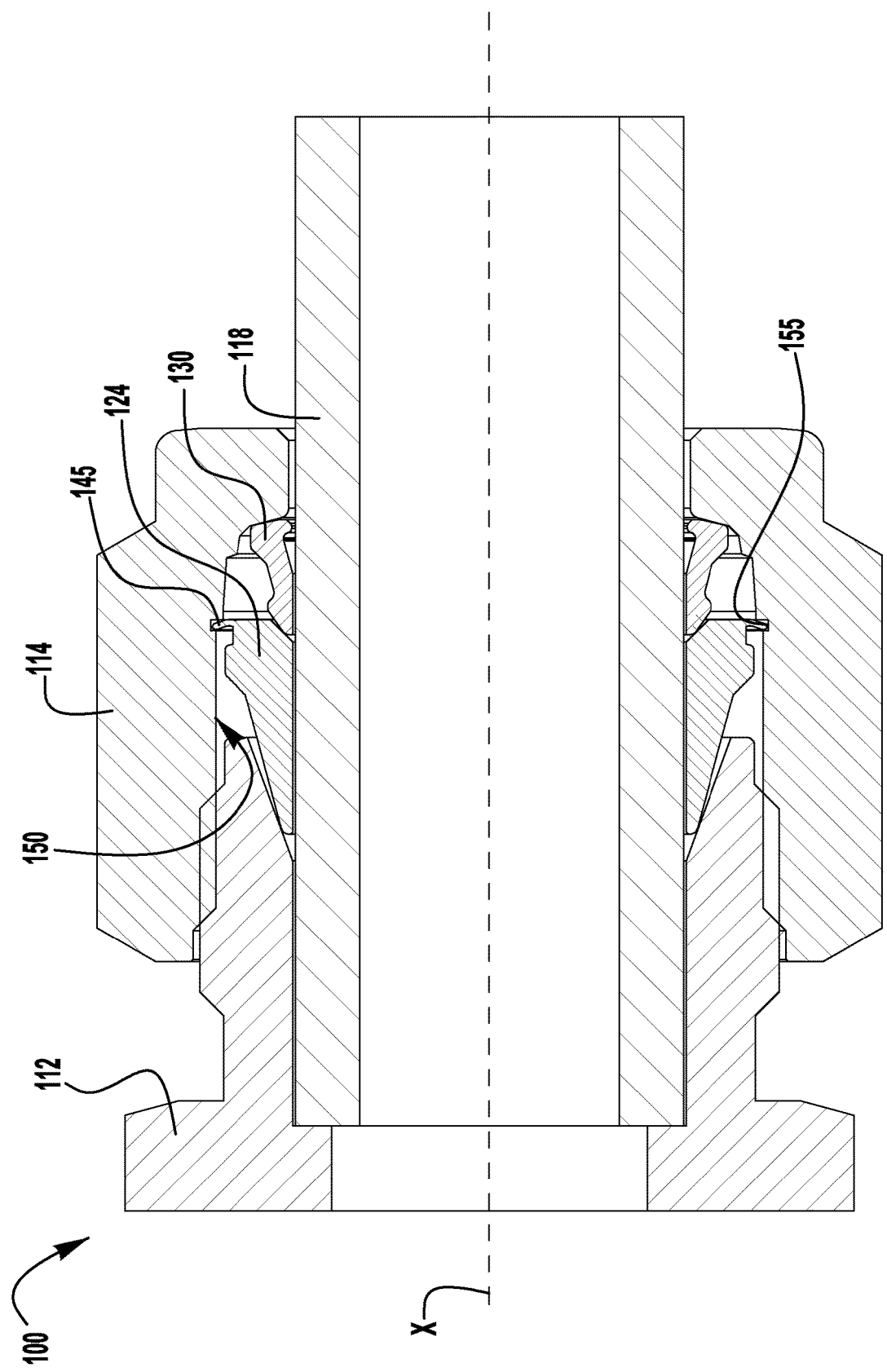
FIG. 10 is a longitudinal cross-sectional view of a conduit fitting assembly using the subassembly of FIG. 8, with the fitting assembly illustrated in a finger tight condition.

With reference to FIGS. 7-12, an exemplary embodiment of one or more of the inventions is presented, including a fitting body 112, nut 114, and front and rear ferrules 124, 130 (as shown in FIG. 10) duplicating many of the features of the fitting components 12, 14, 24, 30 of the embodiment of FIGS. 1-6, as described in greater detail above. The ferrule retaining structure of the embodiment of FIGS. 7-12 includes a radially outward extending projection 145 on the front ferrule 124 that is axially captured in a circumferential recess 155 formed in an interior wall 150 of the nut 114 when the front ferrule is cartridged with the nut, as described below. In the illustrated embodiment, the projection 145 includes substantially parallel inboard and outboard wall surfaces 141, 144, defining a wall thickness therebetween, with the wall thickness being small enough to allow for bending around a radially inner hinge portion 143 of the projection 145.

Figure 7A:
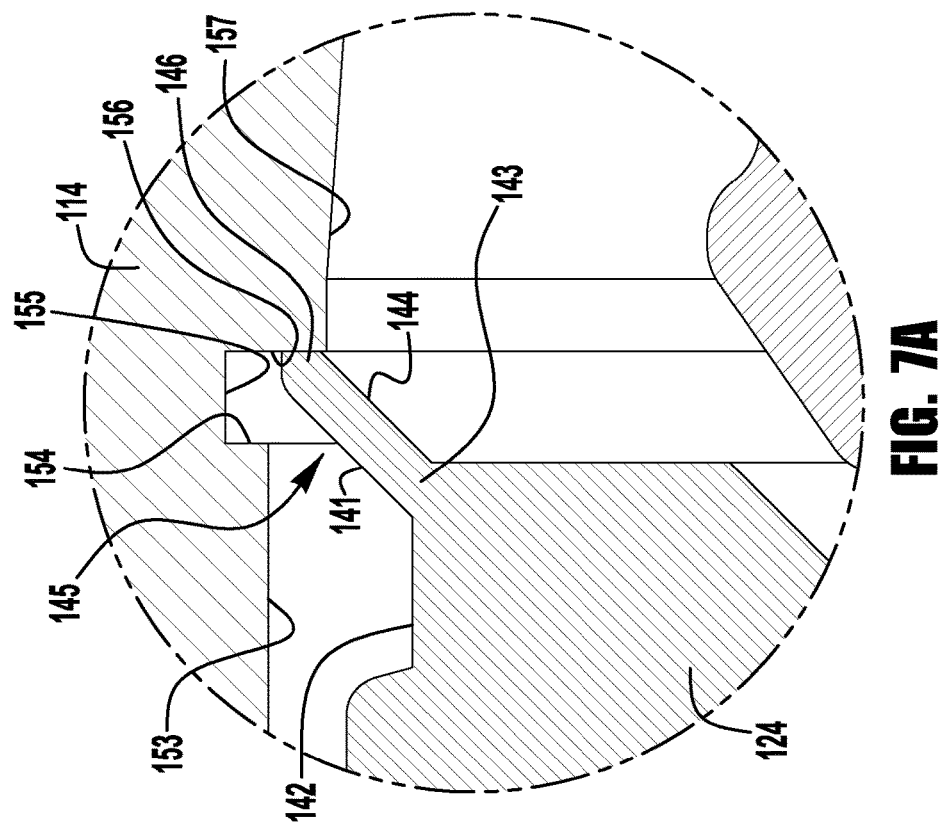
FIG. 7A is an enlarged view of the circled region of FIG. 7.
Figure 7:
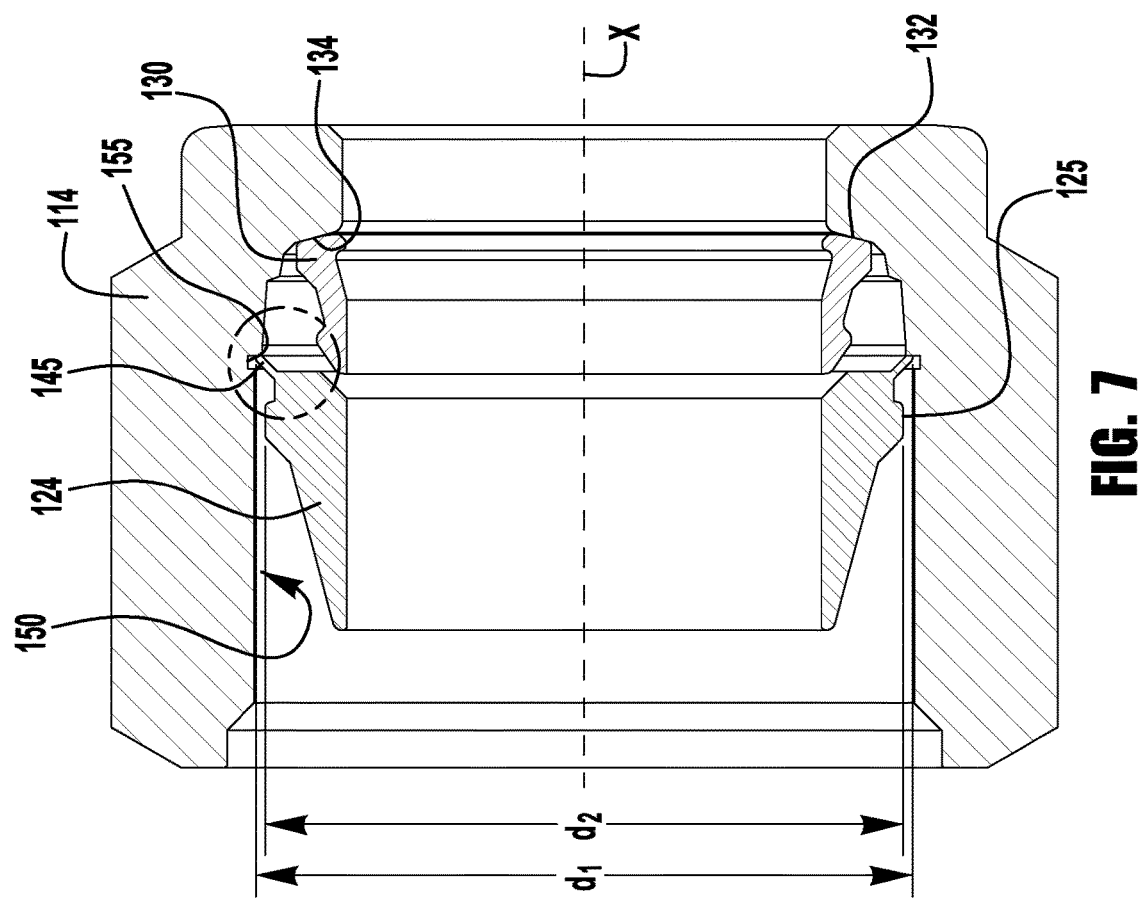
FIG. 7 is a longitudinal cross-sectional view of an exemplary fitting nut and ferrules, shown with the ferrules loosely inserted in the fitting nut.
Figure 7B:
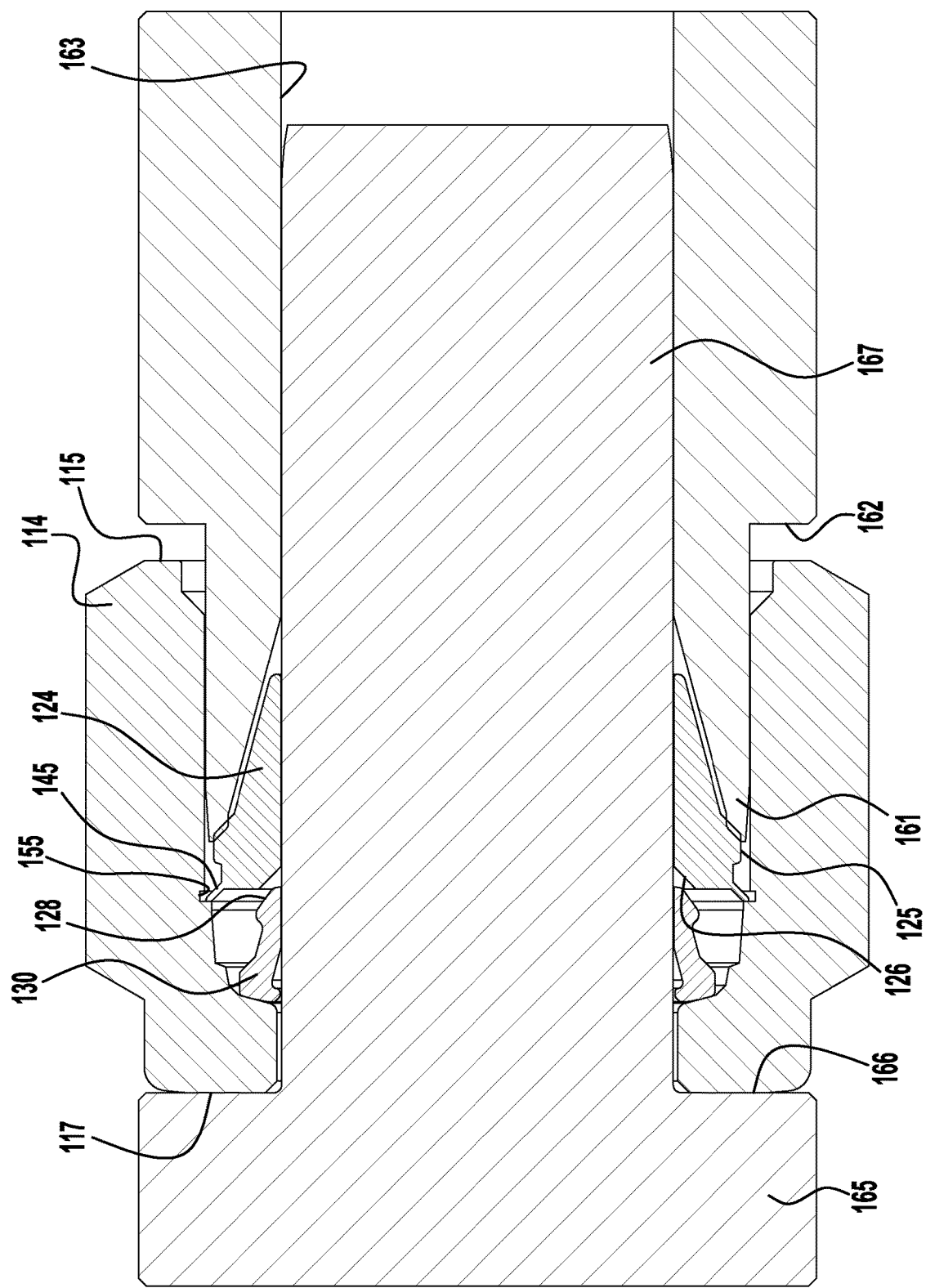
FIG. 7B is a longitudinal cross-sectional view of the fitting nut and loosely inserted ferrules of FIG. 7, shown with an exemplary installation tool.

FIGS. 7, 7A, and 7B illustrate the fitting nut 114 and ferrules 124, 130 in a loose or pre-cartridged condition, with the rear ferrule 130 axially disposed between the front ferrule 124 and a radially extending annular shoulder or drive surface 134 of the fitting nut 114. Prior to cartridging, the circumferential projection or skirt portion 145 extends axially and radially outward, for example, at an angle between 30° and 70° with respect to the central axis X, at an angle between about 35° and about 55° with respect to the central axis X, or at an angle of about 45° with respect to the central axis X. The circumferential recess 155 is defined by, and disposed between, an outward facing inboard radial wall 154 extending radially outward from an inboard surface 153 of the nut interior wall 150, and an inward facing outboard radial wall 156, extending radially outward from an outboard surface 157 of the nut interior wall 150. As shown, the outboard radial wall 156 extends radially inward to a smaller diameter than the inboard radial wall 154. Prior to cartridging, the end portion 146 of the projection 145 is positioned radially inward of the inboard surface 153 of the nut interior wall 150, and radially outward of the outboard surface 157 of the nut interior wall, such that the projection end portion 146 of the front ferrule 124 may be loosely received into axial alignment with the circumferential recess 155 and into abutment with the outboard radial wall 156.

An axial force applied to the front ferrule 124 with the projection end portion 146 engaging the outboard radial wall 156 causes the projection 145 to bend or pivot (or be axially and radially deformed) about a radially inner hinge portion 143 in an axially inward and radially outward direction, such that the projection end portion 146 is radially expanded into radial alignment with the inboard radial wall 154, as shown in FIGS. 8 and 8A. In this aligned position, the plastically deformed projection 145 is axially captured between the inboard radial wall 154 and the outboard radial wall 156. As shown, the projection 145 may be disposed in a generally laterally extending orientation (e.g., between 85° and 95° with respect to the central axis X) to maximize radial overlap between the projection 145 and the inboard radial wall 154, and to minimize lateral movement of the cartridged ferrule 124, for more secure retention of the cartridged ferrule. In one such exemplary embodiment, the deformed cartridged projection 145 may be disposed at at least a slight inward angle (e.g., between 90° and 130° with respect to the central axis X). The inward angle of the cartridged projection 145, combined with the generally lateral orientation of the inboard radial wall 154 may provide resistance to outward bending of the projection 145 when the front ferrule 24 is bumped axially inward (e.g., when the cartridged fitting subassembly is bumped or dropped).

By deforming the ferrule projection 145 radially outward during cartridging, the cartridged nut and ferrule assembly does not rely on elastic or snap-back deformation of the projection as the projection is installed in the nut recess 155, in contrast with the embodiment of FIGS. 1-6. As such, the radially outwardly deformed projection 145 may provide more rigid interlocking engagement with the nut recess, and greater radial overlap with the inboard radial wall 154. Additionally, the use of a pre-cartridged ferrule having a shallow angled cartridging projection may allow for machining of the ferrule from a smaller barstock, as compared to a pre-cartridged ferrule having a substantially laterally extending projection, while still providing for a cartridged ferrule having a radially outwardly deformed projection with substantial radial overlap with a cartridging nut recess. In an exemplary embodiment, as shown in FIGS. 7 and 7A, a pre-cartridged ferrule 124 having an outer radial ferrule boss surface 125 (which may, but need not, define an outermost radial surface of the front ferrule upon complete pull-up) and a cartridging projection 145 extending axially and radially outward from a rear end 148 of the ferrule is configured such that a ratio of the outer diameter d1 of the projection 145 to the outer diameter d2 of the outer radial surface 125 (FIG. 7) is less than about 1.06, or between about 1.02 and 1.06, or about 1.04. When the ferrule 124 has been cartridged with a fitting nut 114 such that the projection 145 extends substantially radially (and/or slightly axially inward), as shown in FIGS. 8, 8A, and 9, a ratio of the outer diameter d1' of the expanded projection 145 to the outer diameter d2' of the outer radial surface 125 (FIG. 9) is greater than about 1.03, or greater than about 1.04, or between about 1.02 and about 1.12, or between about 1.05 and about 1.10, or about 1.07.

To preassemble or "cartridge" the ferrules 124, 130 into the nut 114, a controlled axial force may be applied to an axially inward facing portion of the front ferrule 124. The applied force may be an amount sufficient to bend the projection 145 at least enough to radially expand the projection end portion 146 into radial alignment with the inboard radial wall 154; to radially expand the projection end portion 146 into a laterally outward extending orientation to minimize lateral movement of the cartridged ferrule; and/or to bend the projection into an inward angled orientation (e.g., to provide resistance to outward bending of the projection 145). This controlled axial displacement and projection deformation during cartridging may be facilitated by configuring the retaining arrangement such that when the projection end portion 146 is radially expanded as specified above, an outboard end surface or camming mouth 126 of the front ferrule 124 abuts an inboard end contact surface 128 of the rear ferrule 130, and an outboard end surface 132 of the rear ferrule 130 abuts the outboard annular shoulder 134 of the nut 114. The increased resistance to axial advancement at this position of front ferrule, rear ferrule, and nut abutment provides a positive indication that the ferrules 124, 130 have been cartridged with the nut 114.

According to another exemplary embodiment, as shown in FIGS. 7B and 8, an installation tool 160 may be used to apply a controlled axial force to the front ferrule 124 to cartridge the ferrules with the nut. As shown, the tool 160 may be provided with an annular nose portion 161 that is inserted into the nut 114 between the camming surface 122 of the front ferrule 124 and the interior wall 150 of the nut 114. The nose portion 161 centers the ferrules 124, 130 within the nut 114 and may engage an inward facing surface 127 of an outer flange or boss portion 125 of the front ferrule 124, such that the axial force is applied to the outer portion 125 and not the camming surface 122 (e.g., to prevent marring of the camming surface). As shown in the alternate embodiment of FIG. 13, the ferrule 124' may include an inward facing surface 127' that is more substantially (but not necessarily entirely) radially extending, and recessed or separated from the camming surface 122' by a notch-forming axially extending surface 123', for example, to allow for greater radial contact between the tool nose portion 161' and the inward facing surface 127', as shown in FIG. 14, and to maximize axial forces (and minimize radial compressive forces) applied by the tool 160', while minimizing tool contact with the camming surface 122'. Additional embodiments including a similar stepped or notched outer boss portion on the front ferrule are illustrated in FIGS. 31, 32, 43, 44, 46, and 47.

As shown in FIGS. 7B and 14, an alignment pin tool 165, 165' may (but need not) additionally be assembled with the nut 114, 114', by insertion of a shaft portion 167, 167' of the alignment pin tool 165, 165' through the interior wall of the nut and into a central bore 163, 163' in the installation tool 160, 160', and abutment of an inner shoulder portion 166, 166' with an outboard end surface 117, 117' of the nut 114, 114'. A rear shoulder portion 162, 162' of the tool 160, 160' may be configured to abut an inboard end surface 115, 115' of the nut 114, 114' when the nose portion 161, 161' has advanced the front ferrule 124, 124' to bend the projection 145, 145' of the front ferrule 124, 124' into the radially expanded orientation, such that abutment of the shoulder portion 162, 162' with the nut end surface 115, 115' provides a positive stop indication that the ferrules 124, 124', 130, 130' have been cartridged in the nut 114, 114', and may prevent excessive bending of the projection 145, 145' beyond the cartridged position. Other types of installation tools may be used to apply an axial cartridging force to the ferrules, including, for example, a front ferrule nose-engaging tool, a ferrule tilting or cocking tool, or a threaded installation tool, as described in greater detail above.

As shown in FIG. 9, a second installation tool (shown in phantom at 170) may be used to apply a controlled inward axial force through the rear ferrule 130 to the front ferrule 124, to radially expand the projection 145 into increased radial interengagement with the inboard radial surface 154. The exemplary second installation tool 170 includes a central shaft portion 171 that is inserted through the ferrules 124, 130 to center the ferrules within the nut 114, and a raised circumferential band 172 sized to be received through the outboard end of the nut 114 for engagement with the outboard end surface 132 of the rear ferrule 130, such that the inward axial force is applied to the rear ferrule 130, and transmitted to the front ferrule 124. A rear shoulder portion 173 of the second installation tool 170 may be configured to abut an outboard end surface 117 of the nut 114 when the band 172 has axially retracted the front and rear ferrules 124, 130 an amount sufficient to engage the projection 145 with the inboard radial surface 154 for radial expansion of the projection within the recess 155, such that abutment of the shoulder portion 173 with the nut end surface 117 provides a positive stop indication that the front ferrule projection 145 has been sufficiently expanded. Other axially inward force applying tools may be utilized, including for example, a tool that grips or hooks onto the inner diameter of the outboard end surface 126 of the front ferrule or the outer diameter of the outer boss portion 125 of the front ferrule (not shown). Alternatively, a tool may be inserted through the inboard side of the nut to directly engage and axially bend the projection outward following the initial cartridge process (not shown).

According to another exemplary aspect of the present application, a tool applying an inward axial force to the ferrule or ferrules may be used to remove the cartridged ferrules from the nut, for example, to perform special cleaning or coating operations on the ferrules, to replace the previously installed ferrules with different ferrules, or for use of the nut on a different fitting arrangement. In such an embodiment, the tool 170 may include a rear shoulder portion configured to abut the outboard end surface 117 of the nut 114 when a ferrule engaging rib or band 172 of the tool has axially retracted the front and rear ferrules 124, 130 an amount sufficient to axially move the projection 145 inboard of the narrowed inboard surface 153 of the nut interior wall 150, such that abutment of the shoulder portion 173 with the nut end surface 117 provides a positive indication that the cartridged front ferrule 124 (and with it, the rear ferrule 130) have been released from the nut 114. Other axially inward force applying tools may be utilized, including for example, a tool that grips or hooks onto the inner diameter of the outboard end surface or camming mouth 126 of the front ferrule or the outer diameter of the outer boss portion 125 of the front ferrule (not shown), for pulling the front ferrule 124 in the axially inward direction. Other types of ferrule removal tools may additionally or alternatively be used, including, for example, a ferrule gripping/pulling tool, or a ferrule tilting/cocking tool, as described in greater detail above. Further, the cartridging features of either or both of the front ferrule and the nut may be configured to provide for a more easily releasable or "lightly cartridged" ferrule condition, as described in greater detail above.

FIG. 10 illustrates the fitting assembly 100 in a finger-tight condition, meaning that the various parts 112, 114, 124, and 130 have been assembled onto the conduit 118 but are loosely assembled or slightly tightened or snugged up by manually joining the nut 114 and body 112 together.

According to another exemplary aspect of the present application, the outboard radial wall and outboard surface of the nut interior wall may be configured to bend or pivot the projection axially and radially inward from the laterally outward cartridged condition during complete or partial pull-up of the fitting on a conduit end, such that the end portion of the projection is positioned radially inward of the inboard surface of the nut interior wall, to allow withdrawal of the ferrules from the nut when the nut is disassembled from the body. In an exemplary embodiment, as shown in FIGS. 11 and 11A, when the fitting assembly 100 is tightened to an exemplary pulled-up condition (e.g., partial pull-up, initial complete pull-up, or remake), the front ferrule projection 145 is bent axially and radially inward by the outboard radial wall 156 and the outboard surface 157 to an angle (e.g., between 145° and 165° with respect to the central axis X) sufficient to position the projection end portion 146 radially inward of the inboard surface 153 of the nut interior wall 150. This release condition may be selected to coincide with a partial pull-up that is sufficient to cause the ferrules 124, 130 to begin plastically deforming the conduit 118, such that subsequent loosening or separation of the nut 114 from the body 112 permits the released ferrule 124 to maintain gripping engagement with the deformed conduit surfaces. Alternatively, this release condition may coincide with a different pulled-up condition (e.g., initial complete pull-up, remake). The released ferrules 124, 130, retained on the conduit 118, may be reassembled with a fitting body and nut (either the fitting body and nut from the previous assembly, or a new body and nut) for remake of a fitting connection on the conduit.

As the exemplary fitting 100 is further tightened (e.g., to a complete pull-up position), as shown in FIG. 12, the projection 145 is bent further axially and radially inward (e.g., to an angle between 160° and 180° with respect to the central axis X), to receive the bent projection axially outward of the circumferential recess 155. Engagement of the bent projection 145 with the tapered outboard surface 157 of the nut interior wall 150 may provide additional plastic deformation of the projection 145 up to about 170° to about 180° relative to the central axis while the tapered outboard surface 157 provides for release of the ferrules upon release of the axial nut load. The front ferrule 124 may also be provided with an outer circumferential recess or groove 142 that may be positioned adjacent to and axially inward from the projection 145 to provide clearance for this further inward bending of the projection 145. The depth and shape of the outer circumferential recess 142 can be configured or dimensioned in combination with the thickness and shape of the projection 145 to define a substantially flush or blended outer diameter of the front ferrule 124 at the fully deformed or bent state of the projection 145. This final diameter may be selected to be equal to or exceed the diameter of the ferrule boss 125 to reduce or eliminate the contact between the ferrule boss and the retaining component recess outboard radial wall 156 and tapered interior wall 157 with further nut advancement in order to minimize assembly torque. It is further preferable to define the axial length of the recess to provide minimal or confined clearance for the inward bending of projection 145 such to support the projection in reaction to axial tensile and compressive loads which may result during potential contact with the interior tapered wall 157 of the nut 114 during further inward axial movement resulting from further pull-up of the nut, thereby limiting or inhibiting elongation and/or fracture of the projection 145 during fitting assembly or remake, as a result of relative inward axial movement of the nut with respect to the front ferrule 124. As shown, the outboard radial surface of the front ferrule boss portion 125, defining an inboard edge of the recess 142, may be tapered or otherwise contoured to substantially match an inboard end surface of the projection 145.

As another example of a feature affecting release of the ferrules during pull-up, a cartridging projection of a ferrule may be adapted to bend or hinge at a smaller or more focused hinging location, such that the outer radial portion of the projection is radially compressed or contracted more rapidly during pull-up. This smaller, more focused hinging location may be defined, for example, by a narrower or necked down portion at or near the radially innermost portion of the projection. In an exemplary embodiment, inboard and outboard wall surfaces of a ferrule retaining projection may be contoured such that an inner radial hinge portion of the projection has a smaller thickness than an outer radial portion of the projection, for example, with the inboard and outboard wall surfaces diverging from each other in a radially outward direction. The narrower hinge portion may focus the bending at a more discrete hinge portion (as compared to a bend extending along a greater longitudinal portion of the projection), providing for a more rapid change in the radial orientation of the projection end portion during bending. Additionally, the focused inner hinge portion helps to maintain a greater effective length of the cartridged projection (for example, for increased interference with the inboard radial wall and minimized lateral movement of the cartridged ferrule in the nut), may reduce the axial force required to bend the projection, for example, to facilitate both cartridging and fitting pull-up, and may reduce the potential for cracking at the hinge portion by reducing the equivalent plastic strain at this portion of the projection.

Figure 15A:
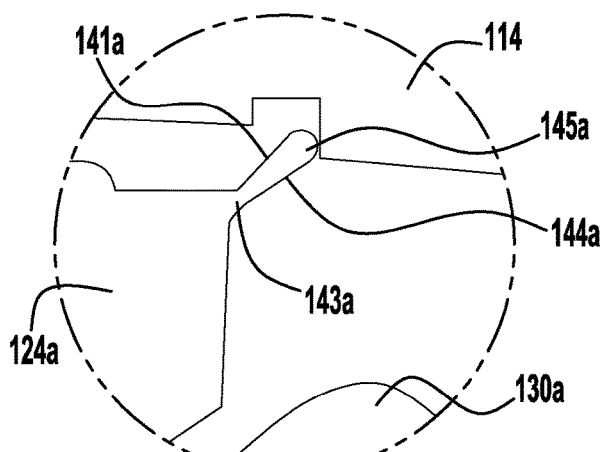
FIG. 15A is an enlarged partial cross-sectional view of an exemplary fitting nut and ferrules with a front ferrule having a retaining projection with a tapered hinge portion, shown with the ferrules loosely inserted in the fitting nut.

The ferrule projection may be provided with a variety of suitable surface contours to provide an inner radial hinge portion having a reduced thickness. FIGS. 15A, 15B, 15C, 15D, and 15E illustrate exemplary embodiments of a ferrule 124*a-e* including a cartridging projection 145*a-e* having a reduced wall thickness at an inner radial hinge portion 143*a-e* of the projection, to facilitate focused bending of the projection. In the embodiment of FIG. 15A, the inboard and outboard wall surfaces 141*a*, 144*a* of the projection 145*a* are flat, tapered surfaces forming a baseball bat-like shape in axial cross-section, forming a more focused hinge portion 143*a* at the narrow end. Additional embodiments including a front ferrule with a similar baseball bat-shaped retaining projection are illustrated in FIGS. 17-21, 25-51, 55, and 56.

Figure 15B:
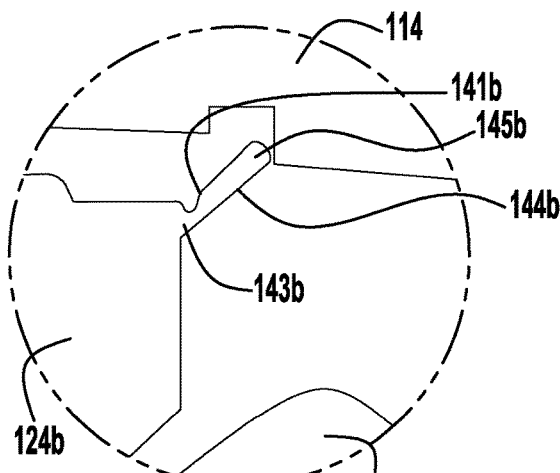
FIG. 15B is an enlarged partial cross-sectional view of another exemplary fitting nut and ferrules with a front ferrule having a retaining projection with a necked down hinge portion, shown with the ferrules loosely inserted in the fitting nut.
Figure 15C:
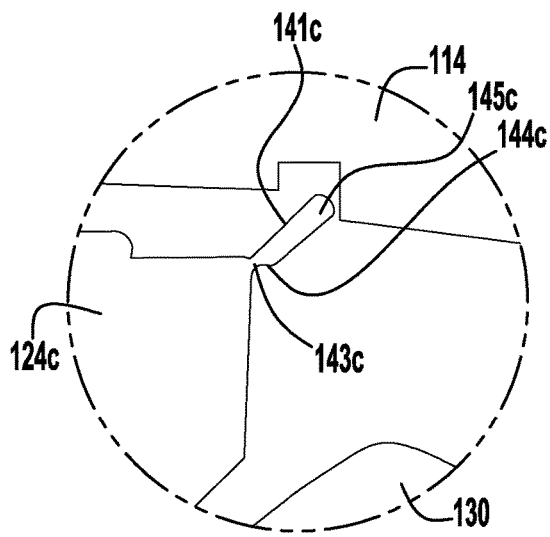
FIG. 15C is an enlarged partial cross-sectional view of another exemplary fitting nut and ferrules with a front ferrule having a retaining projection with a necked down hinge portion, shown with the ferrules loosely inserted in the fitting nut.
Figure 15D:
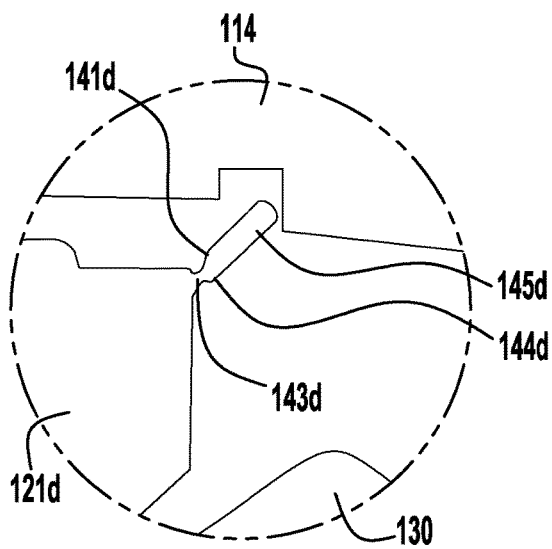
FIG. 15D is an enlarged partial cross-sectional view of another exemplary fitting nut and ferrules with a front ferrule having a retaining projection with a necked down hinge portion, shown with the ferrules loosely inserted in the fitting nut.
Figure 52:
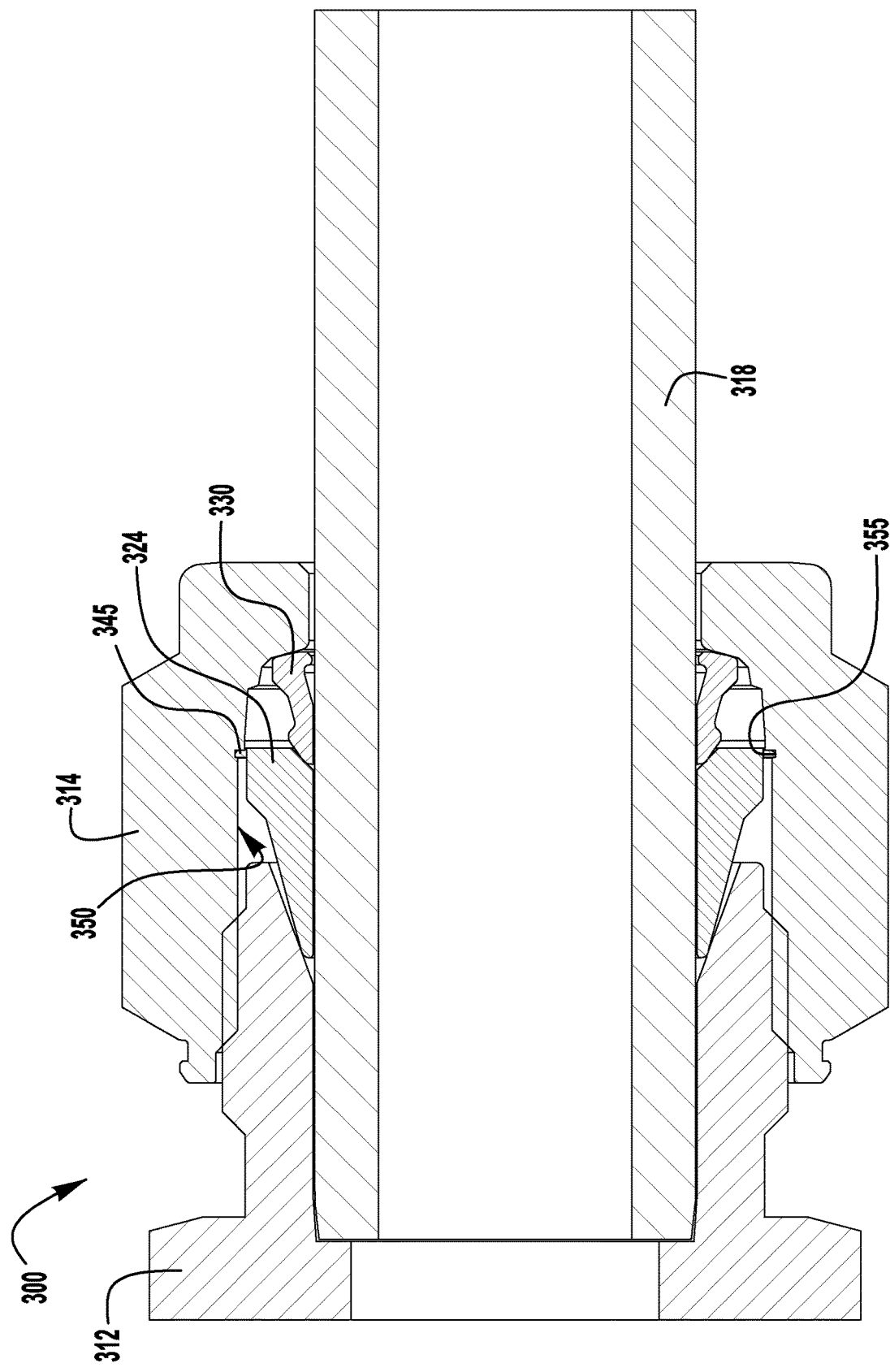
FIG. 52 is a longitudinal cross-sectional view of a conduit fitting assembly using the subassembly of FIG. 51, with the fitting assembly illustrated in a finger tight condition.

While the projection may be substantially symmetrical about a central axis of the projection, as shown in the baseball bat-shaped embodiment described above, in other embodiments, the projection may include non-symmetrical portions, for example, to control hinging deformation, load distribution, and/or relief contouring of the projection during fitting pull-up. As one example, as shown in the embodiments of FIGS. 15B, 15C, and 15D, a discontinuous notched or necked-down surface is formed on the inboard wall surface 141*b* (FIG. 15B), the outboard wall surface 144*c* (FIG. 15C), or both inboard and outboard wall surfaces 141*d*, 144*d* (FIG. 15D) to provide a reduced thickness hinge portion 143*b*, 143*c*, 143*d*. An additional embodiment including a front ferrule with a similar notched projection wall surface is illustrated in FIG. 52.

Figure 15E:
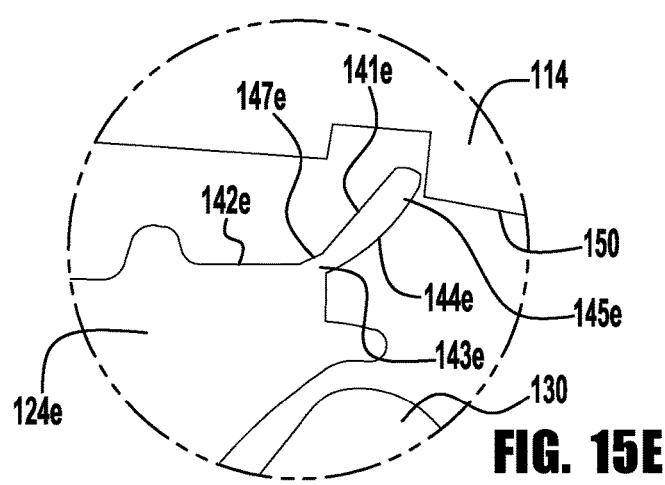
FIG. 15E is an enlarged partial cross-sectional view of another exemplary fitting nut and ferrules with a front ferrule having a retaining projection with a necked down hinge portion, shown with the ferrules loosely inserted in the fitting nut.

As another example, as shown in the embodiment of FIG. 15E, the outboard wall surface 144*e* of the projection 145*e* may be convex or otherwise enlarged, resulting in the base hinge portion 143*e* having a reduced thickness relative to the enlarged portion of the projection. The convex outboard wall surface 144*e* may additionally provide for relief contouring, by limiting contact between the folded-in projection 145*e* (upon pull-up) and the nut interior surface 150 to the radially outermost portion of the convex surface (in the folded condition). An additional embodiment including a front ferrule with a similar convex outer wall projection is illustrated in FIGS. 22-24, and described in greater detail below. The inboard wall surface 141*e* may be substantially flat. Alternatively, in another exemplary embodiment, as illustrated in FIGS. 47 and 47A, a ferrule 2241 may be provided with a projection 2451 having a substantially flat outboard wall surface, and a convex inboard wall surface, resulting in the base hinge portion having a reduced thickness relative to the enlarged portion of the projection. In still another exemplary embodiment (not shown), both the inboard and outboard wall surfaces may be convex to provide a reduced thickness base hinge portion.

As shown in FIG. 15E, the flat inboard wall surface 141*e* may transition to the outer circumferential recess 142*e* by a shallow taper portion 147*e*. Additional embodiments including a shallow taper transitional surface between the outer circumferential recess and the inboard wall surface of the projection are illustrated in FIGS. 32, 34, 36, 40, 44, 47, and 48.

Figure 16A:
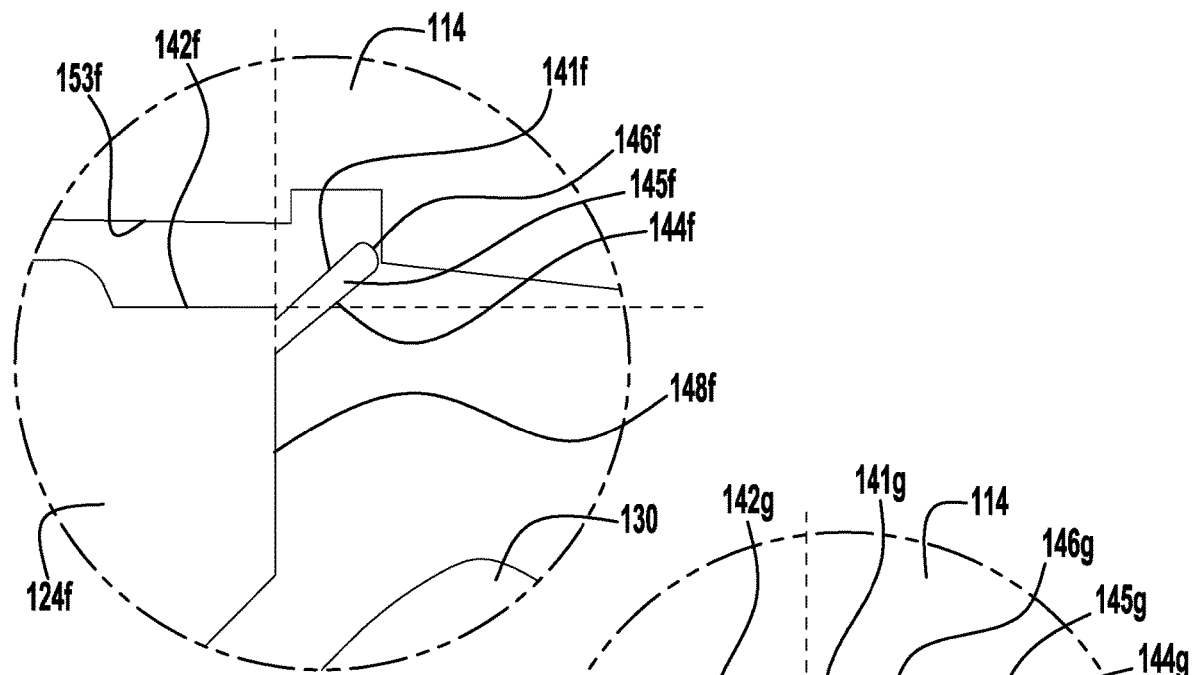
FIG. 16A is an enlarged partial cross-sectional view of an exemplary fitting nut and ferrules with a front ferrule having a retaining projection with a hinge portion located radially inward of an outer radial surface of the front ferrule, shown with the ferrules loosely inserted in the fitting nut.
Figure 16B:
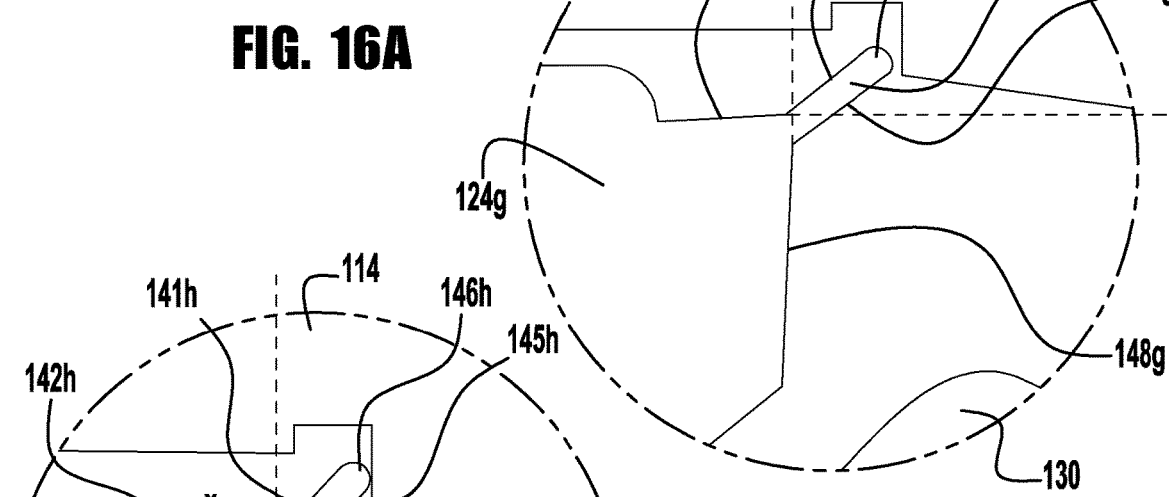
FIG. 16B is an enlarged partial cross-sectional view of another exemplary fitting nut and ferrules with a front ferrule having a retaining projection with a hinge portion located radially inward of an outer radial surface of the front ferrule, shown with the ferrules loosely inserted in the fitting nut.
Figure 16C:
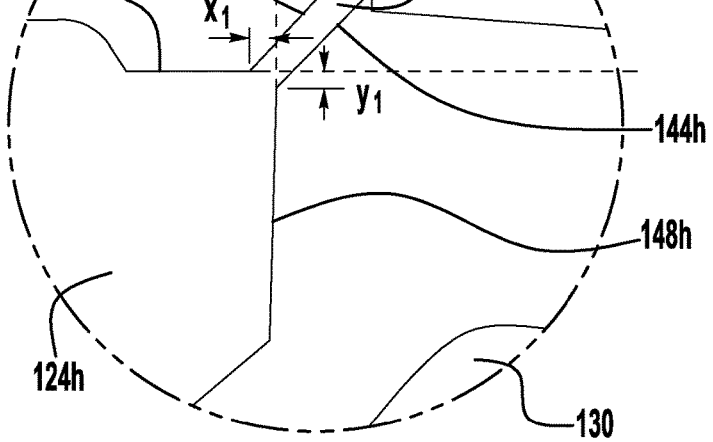
FIG. 16C is an enlarged partial cross-sectional view of another exemplary fitting nut and ferrules with a front ferrule having a retaining projection with a hinge portion located radially inward of an outer radial surface of the front ferrule, shown with the ferrules loosely inserted in the fitting nut.

As another example of a feature affecting release of the ferrules during pull-up, a cartridging projection of a ferrule may be formed to extend axially and radially outward from a rear or outboard end radial surface of the ferrule (as compared to extending from an outer circumferential surface as in the embodiment of FIGS. 7-12), such that the projection defines a hinge portion disposed at least partially radially inward and at least partially axially outward of an outer radial surface of the ferrule adjacent to the projection. By locating the projection hinge portion at least partially radially inward and axially outward of the outer circumferential surface, a more rapid radial reduction of the projection may be realized during fitting pull-up, for example, to facilitate release of the ferrules from the nut of the pulled-up or partially pulled-up fitting. In one such embodiment, as shown in FIG. 16A, the inboard wall surface 141*f* and the outboard wall surface 144*f* of the projection 145*f* each extend axially outward from the outboard end surface 148*f* of the ferrule 124*f* and radially outward from the outboard end surface 148*f* at locations radially inward of the adjacent outer radial surface 142*f*. In another embodiment, as shown in FIG. 16B, the inboard wall surface 141*g* and the outboard wall surface 144*g* of the projection 145*g* both extend axially outward from the outboard end surface 148*g* of the ferrule 124*g*, with the inboard wall surface 141*g* extending radially outward from the outer radial surface 142*g*, and the outboard wall surface 144*g* extending radially outward from the outboard end surface 148*g*, at a location radially inward of the adjacent outer radial surface 142*g*. An additional embodiment including a front ferrule with a similarly located projection is illustrated in FIGS. 17-21. In another embodiment, as shown in FIG. 16C, the inboard wall surface 141*h* of the projection 145*h* extends radially outward from the outer radial surface 142*h*, at a location axially inward of the outboard end surface 148*h*, by axial offset dimension $x_1$, and the outboard wall surface 144*h* extends radially outward from the outboard end surface 148*h*, at a location radially inward of the outer radial surface 142*h*, by radial offset dimension $y_1$. Additional embodiments including a front ferrule with a similarly located projection are illustrated in FIGS. 25-51, 55, and 56. In one such embodiment, radial offset dimension $y_1$ exceeds axial offset dimension $x_1$, such that a center of the projection base or hinge portion is radially inward of the outer radial surface 142*h*.

Figure 17A:
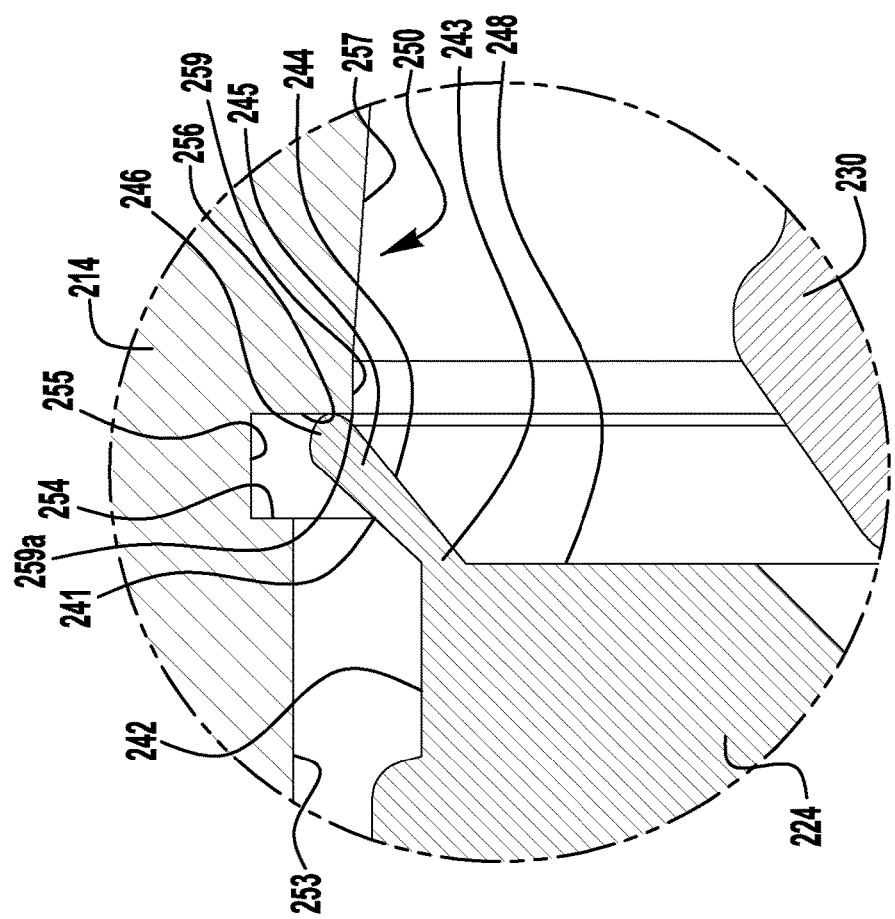
FIG. 17A is an enlarged view of the circled region of FIG. 17.
Figure 17:
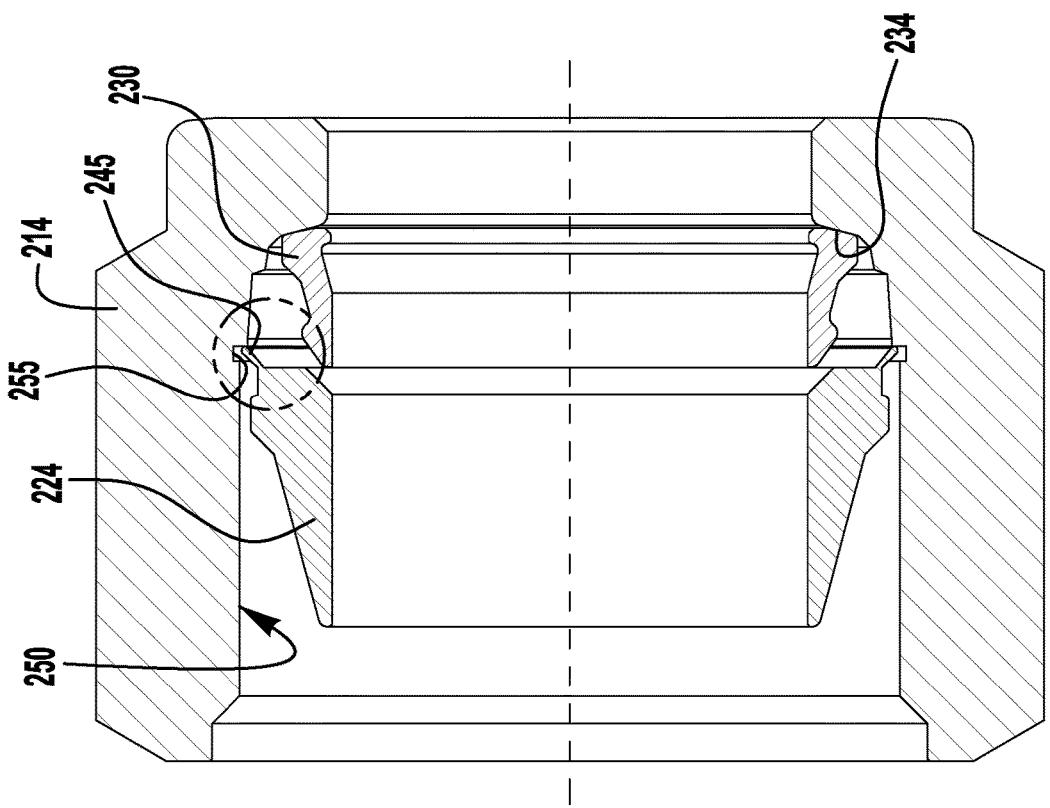
FIG. 17 is a longitudinal cross-sectional view of an exemplary fitting nut and ferrules, shown with the ferrules loosely inserted in the fitting nut.

FIGS. 17-21 illustrate an exemplary embodiment of one or more of the inventions, including a fitting body 212, nut 214, and front and rear ferrules 224, 230 (as shown in FIG. 17) duplicating many of the features of the fitting components 112, 114, 124, 130 of the embodiment of FIGS. 7-12, as described in greater detail above. The ferrule retaining structure of the embodiment of FIGS. 17-21 includes a radially and axially outward extending skirt or projection 245 on the front ferrule 224, having inboard and outboard wall surfaces 241, 244 that uniformly diverge from each other in a radially outward direction (e.g., at a difference angle of between about 1° and about 10°, or between about 2° and about 6°), such that an inner radial hinge portion 243 of the projection has a smaller thickness than an outer radial portion of the projection. The projection wall surfaces 241, 244 of the exemplary projection 245 are flat, tapered surfaces forming a baseball bat-like shape in axial cross-section, forming a more defined hinge portion at the narrow end. The inboard and outboard wall surfaces 241, 244 of the embodiment of FIGS. 17-21 extend from a rear end radial surface 248 of the ferrule 224, such that the hinge portion 243 of the projection 245 is radially inward of the outer circumferential surface of the front ferrule 224.

FIGS. 17 and 17A illustrate the fitting nut 214 and ferrules 224, 230 in a loose or pre-cartridged condition, with the rear ferrule 230 axially disposed between the front ferrule 224 and a radially extending annular shoulder or drive surface 234 of the fitting nut 214. Prior to cartridging, the circumferential projection or skirt portion 245 extends axially and radially outward, for example, at an angle between 30° and 70° with respect to the central axis X, or an angle between about 35° and about 55° with respect to the central axis, or at an angle of approximately 45° with respect to the central axis X. The circumferential recess 255 is defined by, and disposed between, inboard and outboard radial walls 254, 256 that may be similar to those of the embodiment of FIGS.

7-12. Prior to cartridging, the end portion 246 of the projection 245 is positioned radially inward of the inboard surface 253 of the nut interior wall 250, and radially outward of the outboard surface 257 of the nut interior wall 250, such that the projection end portion 246 of the front ferrule 224 may be loosely received into axial alignment with the circumferential recess 255 and into abutment with the outboard radial wall 256.

Figure 18A:
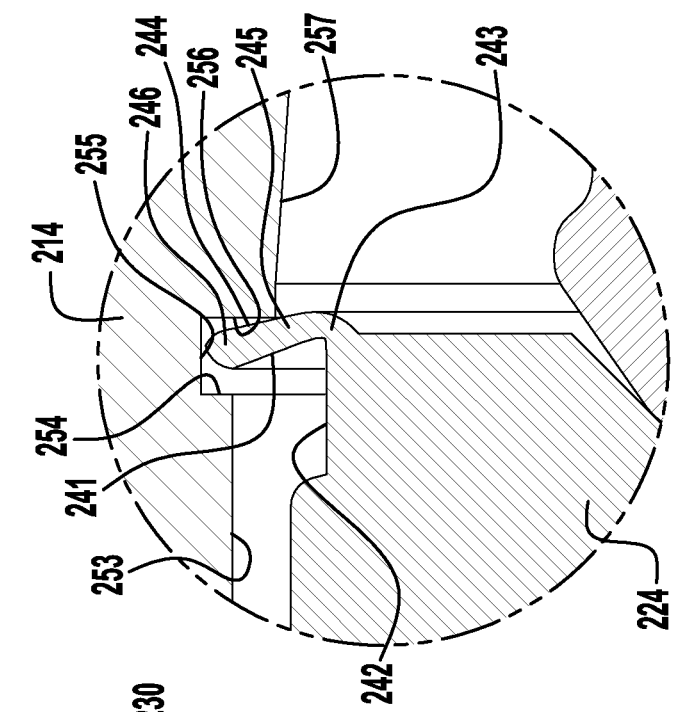
FIG. 18A is an enlarged view of the circled region of FIG. 18.
Figure 18:
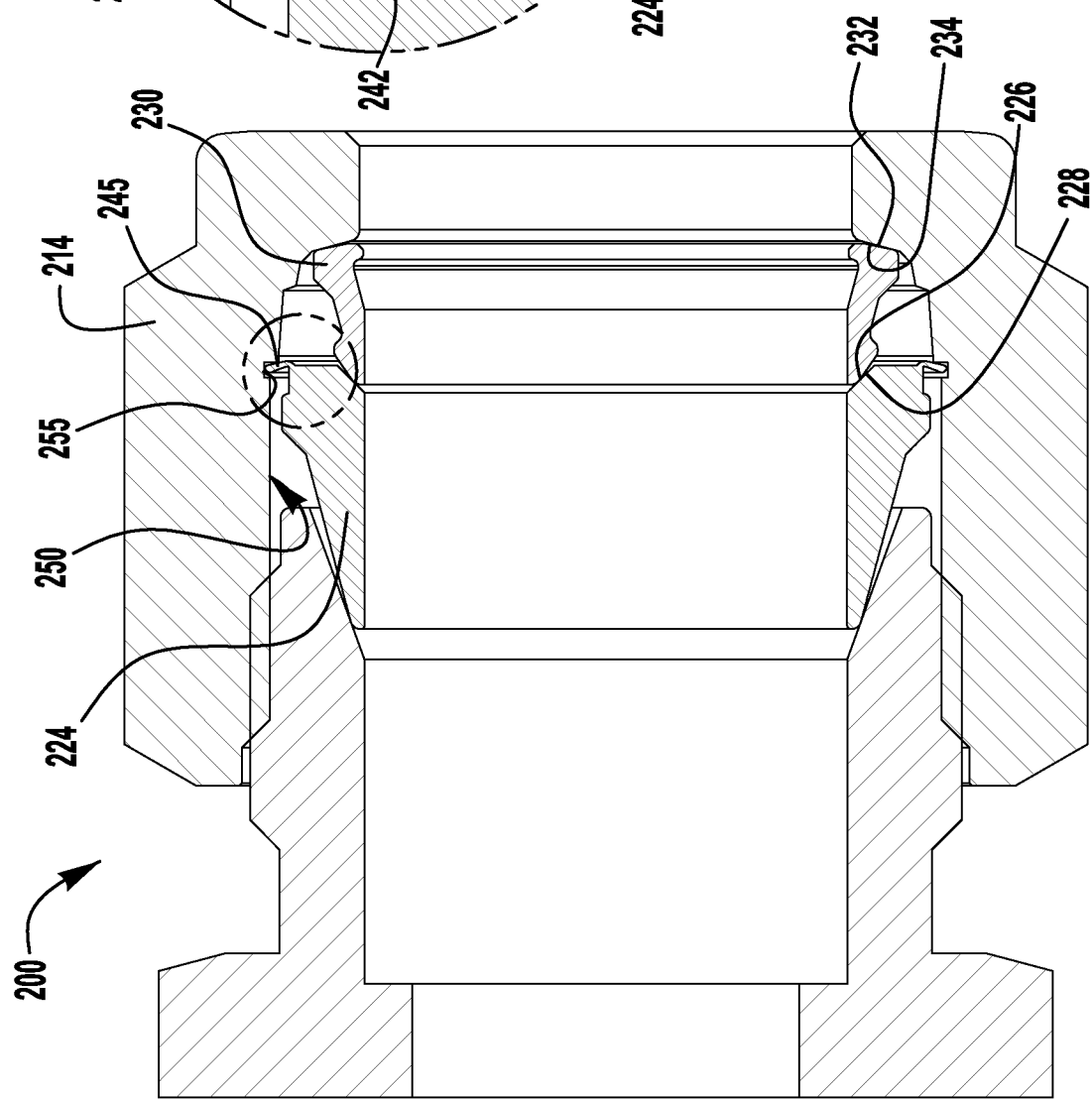
FIG. 18 is a longitudinal cross-sectional view of the fitting nut and ferrules of FIG. 17, shown assembled as a cartridged preassembly.

Similar to the embodiment of FIGS. 7-12, an axial force applied to the front ferrule 224 with the projection end portion 246 engaging the outboard radial wall 256 causes the projection 245 to bend or pivot (or be axially and radially deformed) about a radially inner hinge portion 243 in an axially inward and radially outward direction, such that the projection end portion 246 is radially expanded into radial alignment with the inboard radial wall 254, as shown in FIGS. 18 and 18A. In this aligned position, the plastically deformed projection 245 is axially captured between the inboard radial wall 254 and the outboard radial wall 256. As shown, the projection 245 may be disposed in a generally laterally extending orientation (e.g., between 85° and 95° with respect to the central axis X) to maximize radial overlap between the projection 245 and the inboard radial wall 254, and to minimize lateral movement of the cartridged ferrule 224, for more secure retention of the cartridged ferrule. In one such exemplary embodiment, the deformed cartridged projection 245 may be disposed on at least a slight inward angle (e.g., between 90° and 130° with respect to the central axis X). The inward angle of the cartridged projection 245, combined with the generally lateral orientation of the inboard radial wall 254 may provide resistance to outward bending of the projection 245 when the front ferrule 224 is bumped axially inward (e.g., when the cartridged fitting subassembly is bumped or dropped).

As discussed above, the narrower hinge portion 243 of the projection 245, resulting from the outwardly diverging wall surfaces 241, 244 of the projection reduces the axial force required to bend the projection, for example, to facilitate both cartridging and fitting pull-up, and may reduce the potential for cracking at the hinge portion by reducing the equivalent plastic strain at this portion of the projection. The narrower hinge portion 243 also focuses the bending at a more discrete hinge portion (as compared to a bend extending along a greater longitudinal portion of the projection), maintaining a greater effective length of the deformed projection 245 (for example, for increased interference with the inboard radial wall and minimized lateral movement of the cartridged ferrule in the nut). Further, a tight or sharp corner may be provided at the intersection defined by the projection inboard surface 241 and the outer recess 242, to provide a more discrete hinge point, maximizing the effective length of the deformed projection. The depth and shape of the outer circumferential recess 242 can be specified in combination with the thickness and shape of the projection 245 to define a substantially flush or blended outer diameter of the front ferrule 224 at the fully deformed or bent state of the projection 245. This final diameter may be selected to be equal to or exceed the diameter of the ferrule boss 225 to reduce or eliminate the contact between ferrule boss and retaining component recess outboard radial wall 256 and tapered interior wall 257 with further nut advancement in order to minimize assembly torque. It is further preferable to define the axial length of the recess to provide minimal or confined clearance for the inward bending of projection 245 such to support projection in reaction to axial tensile and compressive loads which may result during potential contact with the interior tapered wall 257 of the nut 214 during further inward axial movement resulting from further pull-up of the nut, thereby limiting or inhibiting elongation and/or fracture of the projection 245 during fitting assembly or remake, as a result of relative inward axial movement of the nut with respect to the front ferrule 224. As shown, the outboard radial surface of the front ferrule boss portion 225, defining an inboard edge of the recess 242, may be tapered or otherwise contoured to substantially match an inboard end surface of the projection 245. Likewise, the recessed axial surface of the recess 242 may be outwardly tapered in an outboard direction to substantially match the tapered inboard surface 241 of the projection 245.

The axial forces applied to the ferrule during cartridging may be controlled or limited, for example, by configuring the retaining arrangement such that when the projection end portion 246 is radially expanded as specified above, an outboard end surface or camming mouth 226 of the front ferrule 224 abuts an inboard end camming surface 228 of the rear ferrule 230, and an outboard end surface 232 of the rear ferrule 230 abuts the outboard annular shoulder 234 of the nut 214, as shown in FIG. 18, and/or by using one or more installation tools, as described in greater detail above. Further, the cartridged ferrules may be configured to be removed, for example, for replacement or reinstallation (e.g., after special cleaning or other treatment), for example, using the tools, methods, and retaining structure configurations described in greater detail above.

Figure 19:
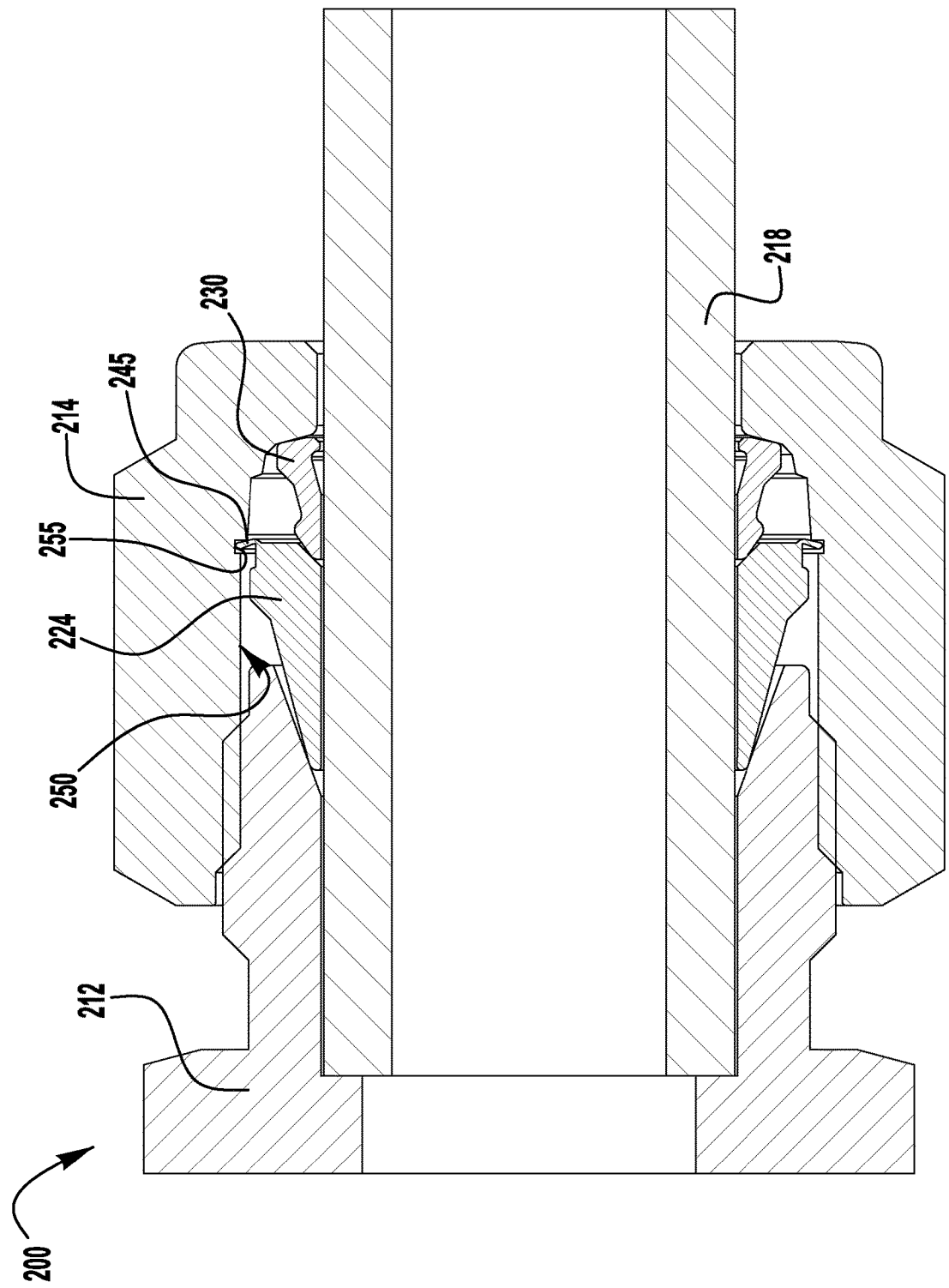
FIG. 19 is a longitudinal cross-sectional view of a conduit fitting assembly using the subassembly of FIG. 18, with the fitting assembly illustrated in a finger tight condition.
Figure 20A:
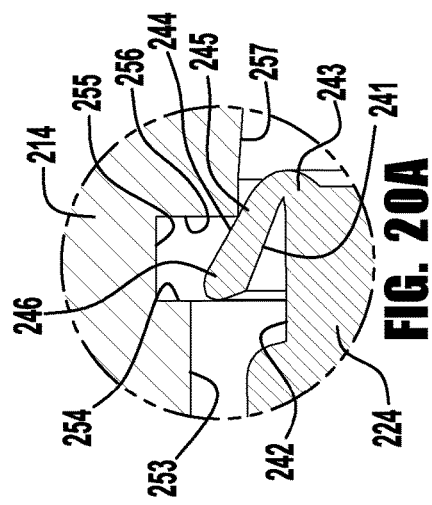
FIG. 20A is an enlarged view of the circled region of FIG. 20.
Figure 20:
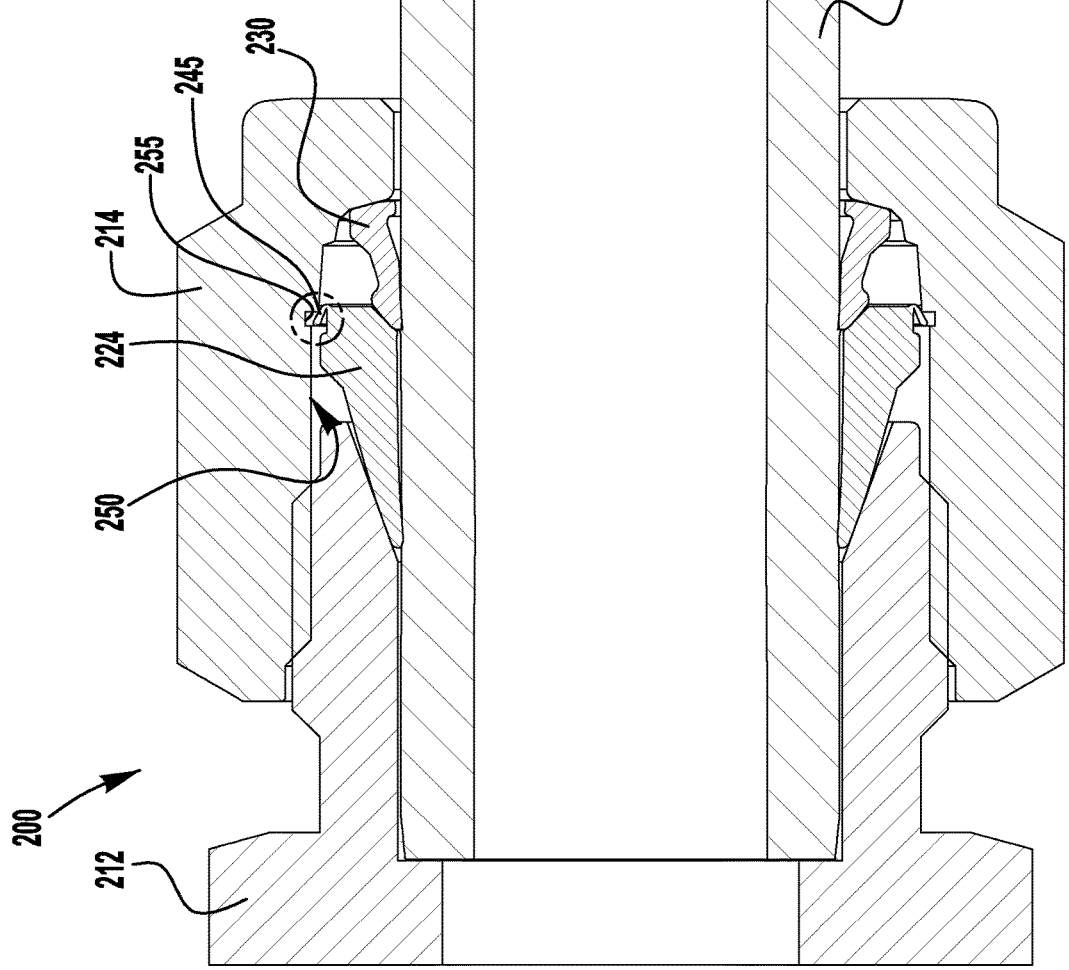
FIG. 20 is a longitudinal cross-sectional view of the conduit fitting assembly of FIG. 19, shown in a first pulled-up condition.

FIG. 19 illustrates the fitting assembly 200 in a finger-tight condition, meaning that the various parts 212, 214, 224, and 230 have been assembled onto the conduit 218 but are loosely assembled or slightly tightened or snugged up by manually joining the nut 214 and body 212 together. As shown in FIGS. 20 and 20A, when the fitting assembly 200 is tightened to an exemplary pulled-up condition (e.g., partial pull-up, initial complete pull-up, or remake), the front ferrule projection 245 is bent axially and radially inward by the outboard radial wall 256 and the outboard surface 257 to an angle (e.g., between 145° and 165° with respect to the central axis X) sufficient to position the projection end portion 246 radially inward of the inboard surface 253 of the nut interior wall 250. This release condition may be selected to coincide with a partial pull-up that is sufficient to cause the ferrules 224, 230 to begin plastically deforming the conduit 218, such that subsequent loosening or separation of the nut 214 from the body 212 permits the released ferrule 224 to maintain gripping engagement with the deformed conduit surfaces. Alternatively, this release condition may coincide with a different pulled-up condition (e.g., initial complete pull-up or remake). The released ferrules 224, 230, retained on the conduit 218, may be reassembled with a fitting body and nut (either the fitting body and nut from the previous assembly, or a new body and nut) for remake of a fitting connection on the conduit.

As discussed above, by locating the attachment or hinge portion 243 of the projection 245 radially inward of the outer circumferential surface of the ferrule 224, a more rapid radial reduction of the projection may be realized during fitting pull-up, for example, to facilitate release of the ferrules from the nut of the pulled-up or partially pulled-up fitting. In other embodiments, a hinge portion of the projection may be disposed on an outer circumferential surface of the ferrule at a location axially inward of the outboard end of the ferrule, or may be located axially and/or radially outward of the outboard end surface of the ferrule.

As the exemplary fitting 200 is tightened to a further pull-up position (e.g., a complete initial pull-up), as shown in FIG. 21, the projection 245 is bent further axially and radially inward (e.g., to an angle between 160° and 180° with respect to the central axis X), to receive the bent projection entirely axially outward of the circumferential recess 255. Engagement of the bent projection 245 with the tapered outboard surface 257 of the nut interior wall 250 may provide additional plastic deformation of the projection 245 up to about 170° to about 180° relative to the central axis while the tapered outboard surface 257 provides for release of the ferrules upon release of the axial nut load. The front ferrule 224 may also be provided with an outer circumferential recess or groove 242 that may be positioned adjacent to and axially inward from the projection 245 to provide clearance for this further inward bending of the projection 245. As shown, the focused hinging action of the inward tapered (or outward diverging) projection may facilitate bending such that the projection 245 is received in the outer groove 242, and above, flush with, or even recessed from the outer surface of the ferrule boss 225. The depth and shape of the outer circumferential recess can be specified in combination with the thickness and shape of the projection 245 to define the outer diameter of the front ferrule 224 at the fully deformed or bent state of the projection. This final diameter may be selected to be equal or exceed the diameter of the ferrule boss 225 to reduce or eliminate the contact between ferrule boss 225 and retaining component recess outboard radial wall 256 and tapered interior wall 257 with further nut advancement in order to minimize assembly torque. It is further preferable to define the length of the recess to provide minimal clearance for the inward bending of projection 245 such to support the projection 245 in reaction to axial tensile and compressive loads which may result during potential contact with the interior tapered wall 257 of the nut 214 during further inward axial movement resulting from further pull-up of the nut.

Still other features of a cartridging ferrule may be provided or adapted to improve or control hinging deformation, load distribution, and/or relief contouring of the projection during cartridging and/or during fitting pull-up (i.e., release of the cartridged ferrule). FIGS. 22-24 illustrate an exemplary embodiment of a retaining nut 614 and a cartridging front ferrule 624 including several such features, discussed in greater detail below. Any one or more of these features may be incorporated into any of the other exemplary embodiments described herein.

According to an exemplary aspect of the present application, a cartridging projection of a ferrule may be provided with multiple hinge portions or hinge points, for example, to accelerate hinging deformation during cartridging and/or release, and the resulting radial expansion (during cartridging) and/or contraction (during pull-up) of the projection, and/or to reduce the deformation and associated stresses at a single hinge point. In the illustrated embodiment of FIGS. 22-24, a cartridging projection 645 includes a first hinge portion 691 at a base of the projection, and a second hinge portion 692 radially outward of, and adjacent to, the first hinge portion 691 (FIG. 22A). Many different variations in properties between the first and second hinge portions may be used to provide for separate and/or sequential hinging action at the first and second hinging portions, including, for example, variations in thickness, shape, and/or material hardness. For example, as shown in the embodiment of FIGS. 22-24, the first hinge portion 691 has a first thickness to length ratio (e.g., a ratio of about 0.7 to 0.9), and the second hinge portion 692 has a second thickness to length ratio (e.g., a ratio of about 0.35 to 0.75) smaller than the first thickness to length ratio, such that an initial axial load applied to the end portion 693 of the projection 645 during cartridging and/or pull-up causes the projection to bend primarily at the second hinge portion 692 for radial expansion (during cartridging) and/or radial contraction (during fitting pull-up). During further pull-up of the fitting (and the resulting axial load applied to the end portion 693 of the projection 645), increased bending of the first hinge portion 691 occurs, causing the projection 645 to fold into the outer circumferential recess 642 between the first hinge portion and the outer radial flange or boss 625 of the ferrule 624.

In another example, all or part of the ferrule projection may be induction heated, laser annealed, or otherwise treated to provide greater ductility, lower material yield strength, or higher percent elongation of all or part of the ferrule projection. In one such example, only the outer, second hinge portion may be annealed or otherwise treated to increase ductility (as compared to the inner, first hinge portion), or the outer hinge portion may be treated to a greater extent than the inner hinge portion, providing for a sequential hinging action including initial bending of the second hinge portion and subsequent bending of the inner hinge portion.

In still another example, all or part of the ferrule projection may be segmented (e.g., slit or stamped) or otherwise non-continuous to facilitate plastic deformation of the projection during cartridging and/or pull-up. In one such example, only the outer, second hinge portion may be segmented or otherwise non-continuous for increased plastic deformation (as compared to the inner, first hinge portion), or the outer hinge portion may be segmented to a greater extent (e.g., more segments or larger gaps between segments) providing for a sequential hinging action including initial bending of the second hinge portion and subsequent bending of the inner hinge portion. FIG. 25 illustrates an exemplary alternative embodiment of a cartridging ferrule 724 having a segmented projection 745, with individual tabs 745a separated by slits 745b, for increased plastic deformation during cartridging and/or pull-up. In one embodiment, these slits may extend from the projection end portion 793 to the second hinge portion 792, but not into the first hinge portion 791, to provide for greater initial deformation of the second hinge portion, relative to the first hinge portion, during cartridging and/or initial pull-up. In another embodiment, the slits extend into the first hinge portion, but are wider in the second hinge portion and narrower in the first hinge portion to provide for greater initial deformation of the second hinge portion, relative to the first hinge portion, during cartridging and/or initial pull-up.

FIGS. 22 and 22A show the nut 614 and ferrules 624, 630 in an initial pre-cartridged condition. In the exemplary embodiment, the first hinge portion extends radially outward (e.g., about 90° with respect to the central axis X), with an outboard surface substantially flush with an outboard radial surface 648 of the ferrule. In the illustrated embodiment, the first hinge portion 691 has a thickness that narrows or tapers inward (e.g., at about 5° to about 10°) from a radially inner end to a radially outer end, and as shown, may include a fillet radius at the base of the inboard surface of the first hinge portion, for example, to provide increased rigidity, and/or to provide all or part of the tapering of the first hinge portion. The second hinge portion 692 of the exemplary embodiment extends radially outward and axially outboard between the first hinge portion 691 and an enlarged load bearing end portion 693 of the projection 645.

In the illustrated embodiment of FIGS. 22 and 22A, the second hinge portion 692 has a substantially uniform thickness, with parallel, frustoconical inboard and outboard wall surfaces. In other embodiments, the thickness may be tapered or otherwise varied. For example, as shown in FIG. 22B, a ferrule 624' may include a second hinge portion 692' having an outboard radius portion 695' extending between a radial outboard wall of a first hinge portion 691' and an enlarged outboard surface of an end portion 693' to provide a shorter and narrower second hinge portion. The resulting shortened length of the projection 645' may provide for an increased change in the radial dimension of the projection during bending (i.e., radial expansion during cartridging, radial contraction during pull-up), while the radiused, narrowed second hinge portion 692' may provide for reduced stress at the second hinge portion during bending. The circumferential recess 642' and outer radial boss 625' may be sized to correspond with this shorter projection 645'.

FIGS. 23 and 23A show the nut 614 and ferrules 624, 630 in a cartridged condition, for example, as a result of an outboard axial load applied to the front ferrule 624 (e.g., applied to an inboard surface of the ferrule boss portion 625), causing the projection 645 to engage and be deformed radially outward by the outboard radial wall 656 of the nut recess 655. As shown, the second hinge portion 692 is bent to an axially inward direction (e.g., at an angle of about 125° with respect to the central axis X) to cause the projection end portion 693 to extend radially into the nut recess between the inboard and outboard radial walls 654, 656, thereby axially retaining the front ferrule 624 (and with it, the captured rear ferrule 630) with the nut 614. The first hinge portion 691 is slightly bent to an axially inward direction (e.g., at an angle of about 100° with respect to the central axis X).

FIGS. 24 and 24A show the nut 614 and ferrules 624, 630 pulled up with a fitting body 612 on a conduit end 618, with the front ferrule projection 645 bent into a fully axially inboard direction (e.g., with the second hinge portion and projection end portion extending at an angle of about 185° with respect to the central axis X), such that the projection 645 is fully disengaged from the nut recess 655 and received in the outer circumferential recess 642 in the front ferrule 624, and above, flush with, or even recessed from the outer surface of the ferrule boss 625. As shown, the first hinge portion 691 is folded in an axially inboard direction (e.g., at an angle of about 130° with respect to the central axis X). The outer circumferential recess 642 may be shaped (e.g., tapered axially and radially inward) to provide clearance for the enlarged end portion 693 of the ferrule projection 645. The final diameter of the folded projection 645 may be selected to be equal or exceed the diameter of the ferrule boss 625 to reduce or eliminate the contact between ferrule boss 625 and retaining component recess outboard radial wall 656 and tapered interior wall 650 with further nut advancement in order to minimize assembly torque. It is further preferable to define the length of the recess to provide minimal clearance for the inward bending of projection 645 such to support the projection 645 in reaction to axial tensile and compressive loads which may result during potential contact with the interior tapered wall 657 of the nut 614 during further inward axial movement resulting from further pull-up of the nut.

The enlarged load bearing end portion 693 may be asymmetrical about a central axis, with an enlarged radius shape on an outboard side of the end portion, for example, to provide enhanced rigidity, and a flattened inboard side of the end portion to more closely correspond with the surface of the outer circumferential recess 642 when the projection is received in the recess during pull-up. Further, the outer surface of the ferrule boss portion 625 may be tapered radially inward and axially outward to form a reduced diameter at the outboard side (see FIG. 22A), such that when the rear end of the front ferrule 624 is expanded during fitting pull-up, the outer surface of the ferrule boss portion 625 more closely corresponds to the interior surface 650 of the nut bore.

The front ferrule may be configured to further reduce stresses at the hinge portions. For example, as shown in the illustrated embodiment, the enlarged outboard side of the load bearing end portion 693 of the projection 645 may be provided with an enlarged radius shape to focus the radial load between the nut interior surface 650 and the projection 645 at this enlarged region upon pull-up, thereby acting as a relief to radial loading (and the resulting stresses) at the narrower hinge portions. As another example, a relief recess or pocket 647 may be provided between the first hinge portion 691 and the outer circumferential recess 642, to minimize creasing (and the resulting stresses) at the first hinge portion upon pull-up.

As discussed above, the release condition of the front ferrule from the nut may be selected to coincide with a certain assembly or pull-up condition, for example, a partial pull-up condition (e.g., pull-up sufficient to cause the ferrules to begin plastically deforming the conduit, such that subsequent loosening or separation of the nut from the body permits the released ferrules to maintain gripping engagement with the deformed conduit surfaces), a complete initial pull-up condition, or a subsequent remake condition. To provide this release condition at a desired pull-up condition, one or more of the nut and ferrule interengaging features may be specifically sized, shaped, contoured or otherwise configured to affect the timing and rate of bending of the projection from a cartridged orientation (e.g., at an angle between about 90° and about 130° with respect to the central axis X) to a release orientation (e.g., at an angle between about 145° and about 165° with respect to the central axis X). As one example, since the bending of the front ferrule projection by engagement with the interior nut surfaces relies on relative axial movement of the nut with respect to the front ferrule during pull-up (i.e., during controlled axial movement of the nut relative to the fitting body), according to an aspect of the present application, one or more of the nut and ferrule interengaging surfaces may be configured to increase relative axial movement of the nut with respect to the front ferrule during initial fitting pull-up, by delaying or retarding axial advancement of the front ferrule to accelerate bending of the front ferrule projection during pull-up, thereby increasing initial relative axial movement of the nut with respect to the front ferrule. Several fitting conditions can contribute to, or affect the magnitude of, relative axial movement of the fitting nut with respect to the front ferrule, including, for example, amount of pull-up, tube wall thickness, tube material, an un-bottomed or partially bottomed tube end installed in the fitting. One or more of these conditions may be taken into consideration when selecting, designing, or dimensioning the nut and ferrule interengaging surfaces for increased relative axial movement of the nut with respect to the front ferrule during initial fitting pull-up.

Figure 26:
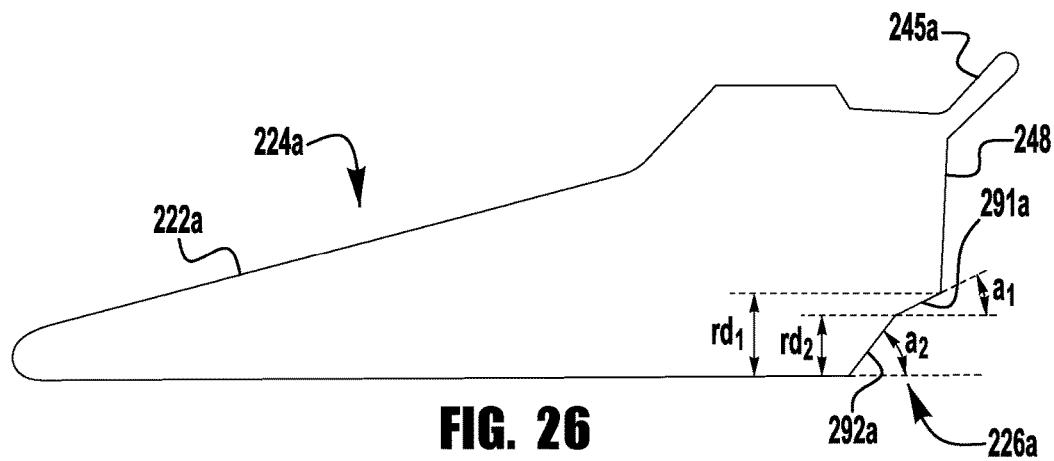
FIG. 26 is a partial longitudinal cross-sectional view of an exemplary front ferrule having a cartridging projection.
Figure 26A:
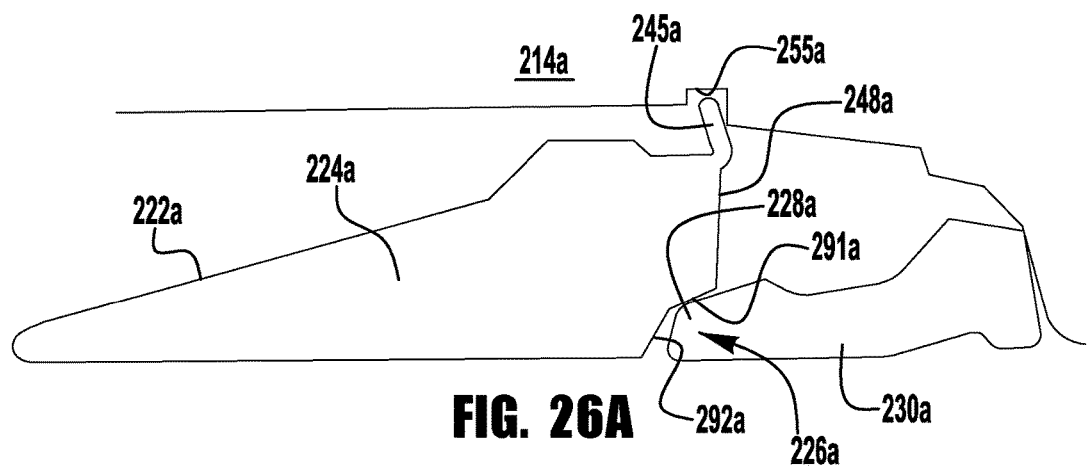
FIG. 26A is a partial longitudinal cross-sectional view of a fitting preassembly including the front ferrule of FIG. 26 cartridged with a nut and rear ferrule.
Figure 26B:
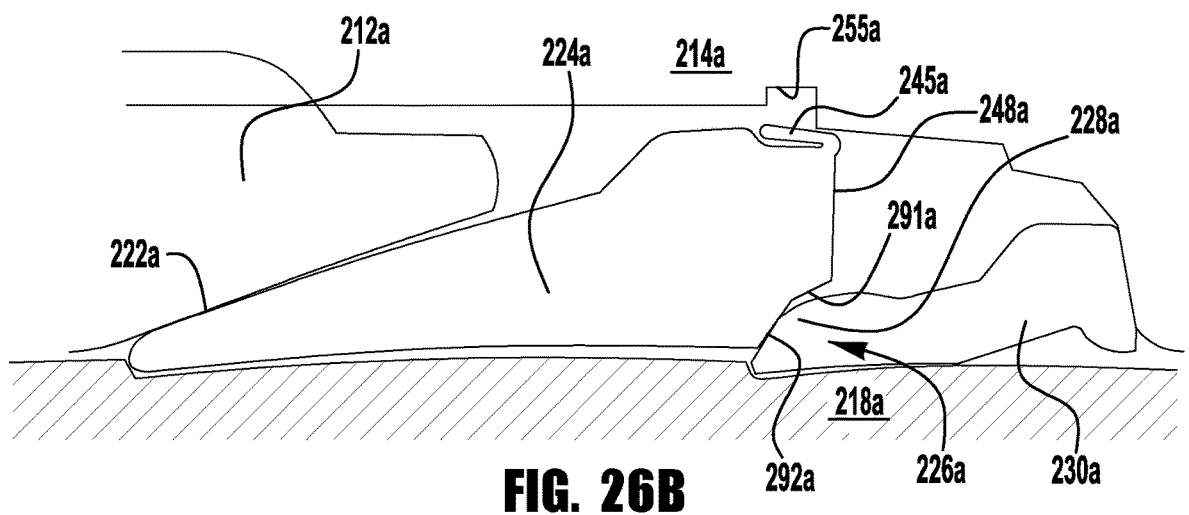
FIG. 26B is a partial longitudinal cross-sectional view of a fitting assembly including the front ferrule of FIG. 26, shown with the fitting pulled up on a conduit end.

While many different fitting surface arrangements may provide for this delayed axial advancement of the front ferrule during pull-up, as one example, the engaging camming surfaces of the front and rear ferrule may be contoured to increase initial relative axial movement of the rear ferrule with respect to the front ferrule, thereby increasing the initial relative axial movement of the nut with respect to the front ferrule. In an exemplary embodiment, as illustrated in FIG. 26, a front ferrule 224a may be provided with a rear camming mouth 226a having a shallower outer tapered portion 291a that is engaged by the front end portion 228a of the rear ferrule 230a initially (e.g. when the fitting assembly is in a finger tight condition) and during a first duration or portion of pull-up, as shown in FIG. 26A, allowing the rear ferrule front end 228a (and the nut drive surface 234a) surface to axially advance more rapidly with respect to the front ferrule 224a, thus limiting the axial advancement of the front ferrule. In an exemplary embodiment, the outer tapered portion 291a may extend at an angle $a_1$ with respect to the central axis X between about 15° and about 45°, or between about 25° and about 40°, or between about 30° and about 35°. A steeper (i.e., with respect to the outer tapered portion 291a) inner tapered portion 292a of the rear camming mouth 226a engages the front end portion 228a of the rear ferrule 230a during a second duration or portion of pull-up to facilitate radial indentation (and tube grip) of the rear ferrule front end 228a (FIG. 26B), as well as accelerated axial advancement of the front ferrule 224a with respect to the fitting body 212a for radial indentation of the front camming surface 222a of the front ferrule 224a caused by engagement with the body camming surface. In an exemplary embodiment, the inner tapered portion 292a may extend at an angle $a_2$ with respect to the central axis X between about 35° and about 55°, or between about 40° and about 50°, or about 45°.

A cartridging ferrule may be provided with a wide range of suitable dual camming taper combinations to provide for accelerated initial disengagement or de-cartridging of the ferrule from the nut and for sufficient radial compression of the ferrule(s) onto the installed conduit. In one such embodiment, the shallower outer tapered portion 291a is limited to ensure that sufficient radial compression of the ferrules occurs upon engagement of the front end portion 228a of the rear ferrule 230a with the inner tapered portion 292a of the front ferrule camming mouth 226a. In an exemplary embodiment, the ratio of the radial dimension $rd_2$ of the inner tapered portion 292a of the camming mouth 226a to the full radial dimension $rd_1$ of the camming mouth may be between about 0.4 and about 0.9, or between about 0.5 and about 0.8, or between about 0.6 and about 0.7. The dual taper surfaces 291a, 292a may be configured to synchronize disengagement or de-cartridging of the ferrule projection 245a from the nut recess 255a with a desired pull-up condition. In one embodiment, the desired pull-up condition is a partial pull-up that is sufficient to cause the ferrules 224a, 230a to begin plastically deforming the conduit 218a, such that subsequent loosening or separation of the nut 214a from the body 212a permits the released ferrule 224a to maintain gripping engagement with the deformed conduit surfaces. This release may occur before or after the rear ferrule front end 228a engages the inner tapered portion 292a. Additional embodiments including a similar dual-taper camming mouth on the front ferrule are illustrated in FIGS. 22-24, 27, 28, 34, 35, 40, 41, 42, and 43, but may be applied to any of the ferrules described and shown herein.

Figure 27:
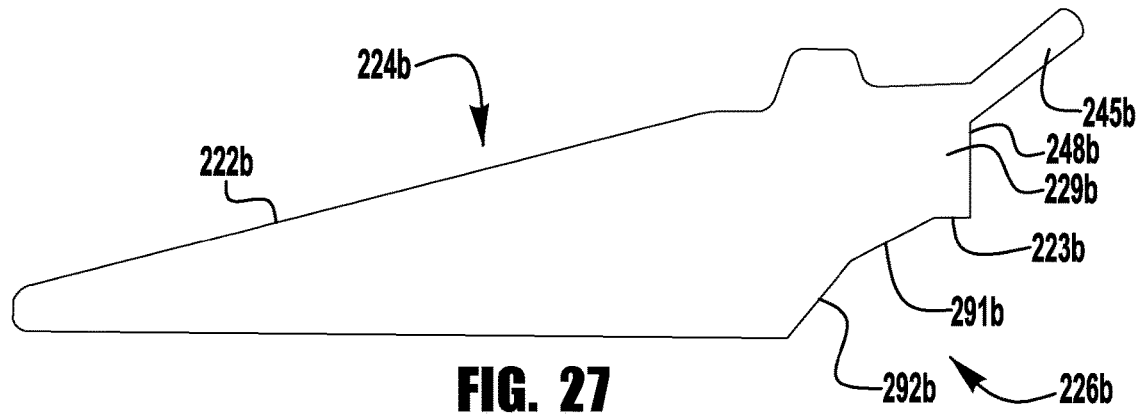
FIG. 27 is a partial longitudinal cross-sectional view of an exemplary front ferrule having a cartridging projection.
Figure 27A:
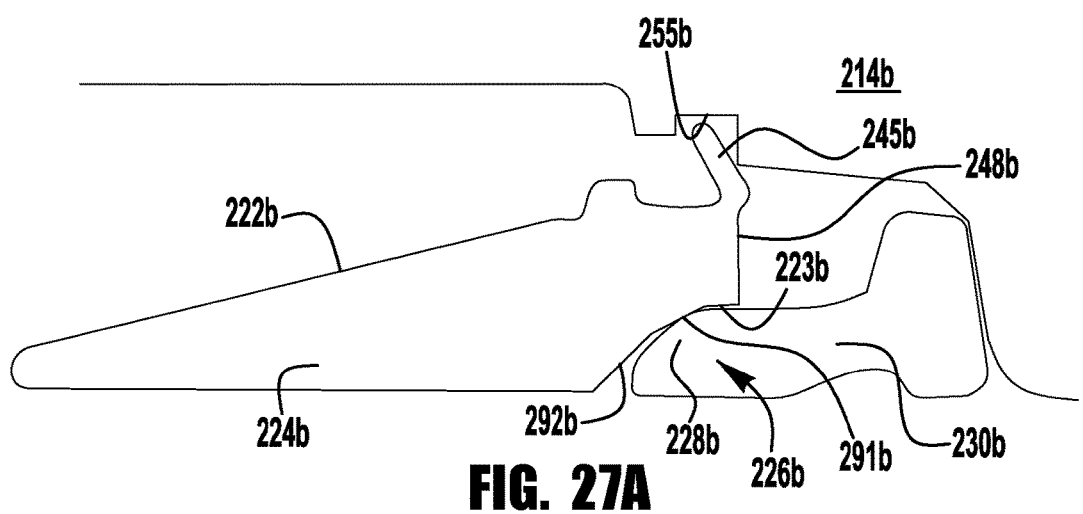
FIG. 27A is a partial longitudinal cross-sectional view of a fitting preassembly including the front ferrule of FIG. 27 cartridged with a nut and rear ferrule.
Figure 27B:
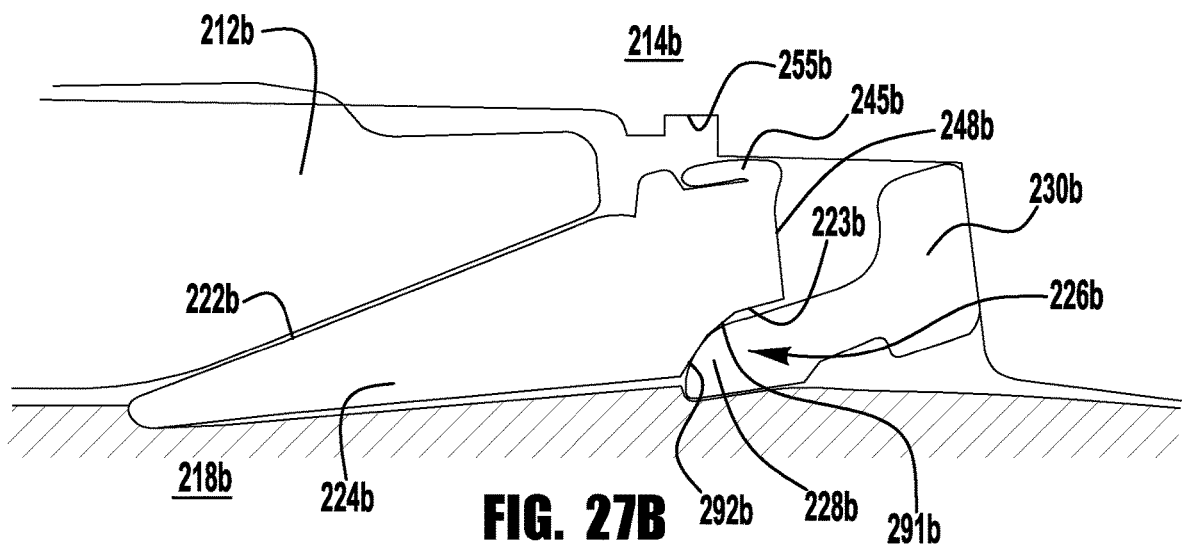
FIG. 27B is a partial longitudinal cross-sectional view of a fitting assembly including the front ferrule of FIG. 27, shown with the fitting pulled up on a conduit end.

In other embodiments, a front ferrule may include an axially extending rear bore that extends rearward of a dual-taper camming mouth (which may be dimensionally similar to the dual-taper camming mouth of the ferrule 224a of FIG. 26), for example, to provide a desired axial and radial alignment of the front and rear ferrules in a cartridged nut and ferrule preassembly. FIG. 27 illustrates an exemplary front ferrule 224b provided with a rear portion 229b extending axially rearward of the camming mouth 226b, with the ferrule retaining projection 245b extending directly from the rear portion 229b. The rear portion 229b defines a rear bore 223b, extending rearward from an outer tapered portion 291b of the camming mouth 226b, into which a radially outer front portion 228b of the rear ferrule 230b may be received for engagement of the back ferrule front portion 228b with the outer tapered portion 291b of the front ferrule camming mouth (FIG. 27A). This arrangement may facilitate suitable axial and radial alignment of the front and rear ferrules 224b, 230b during cartridging of the ferrules with the nut 214b, and within the cartridged subassembly, as described in greater detail above with respect to the embodiment of FIGS. 1-6. A steeper (i.e., with respect to the outer tapered portion 291b) inner tapered portion 292b of the rear camming mouth 226b engages the front end portion 228b of the rear ferrule 230b during pull-up to facilitate radial indentation (and tube grip) of the rear ferrule front end 228b (FIG. 27B), as well as accelerated axial advancement of the front ferrule 224b with respect to the fitting body 212b for radial indentation of the front camming surface 222b of the front ferrule 224b caused by engagement with the body camming surface. Additional embodiments including a similar bore defining rear portion of the front ferrule are illustrated in FIGS. 32-35, 40, and 41, but may be applied to any of the ferrules described and shown herein.

The use of a front ferrule have a multiple taper camming mouth may be desirable in other types of fitting assemblies, including fitting assemblies in which the front ferrule is not cartridged with the fitting nut, for example, to accelerate or retard axial advance of the front ferrule with respect to the rear ferrule during pull-up, to accelerate or retard axial advance of the front ferrule with respect to the fitting nut during pull-up, or to accelerate or retard axial advance of the front ferrule with respect to the fitting body during pull-up. In some embodiments (not shown) a front ferrule may be provided with a camming mouth having more than two different tapered portions.

Figure 28:
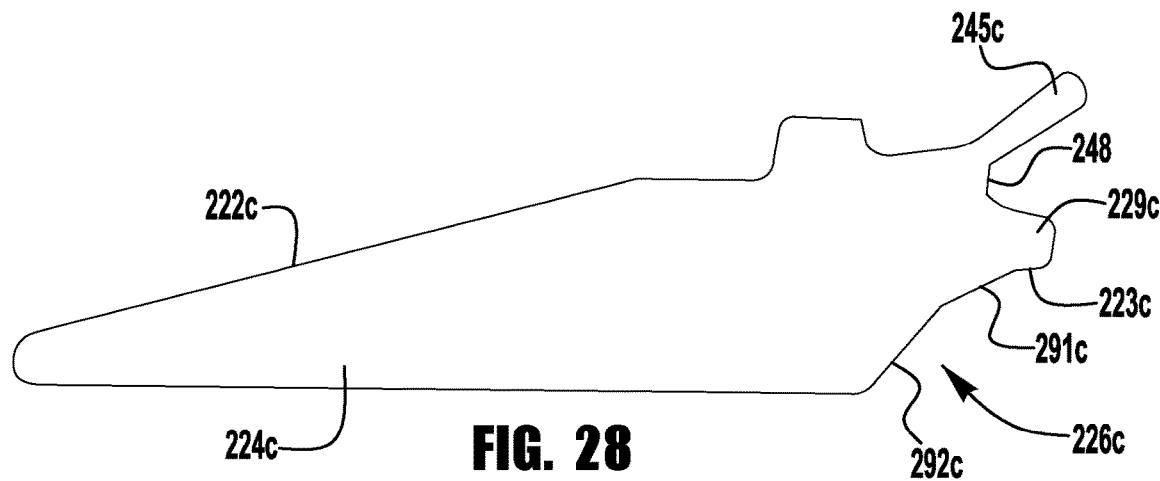
FIG. 28 is a partial longitudinal cross-sectional view of an exemplary front ferrule having a cartridging projection.
Figure 28A:
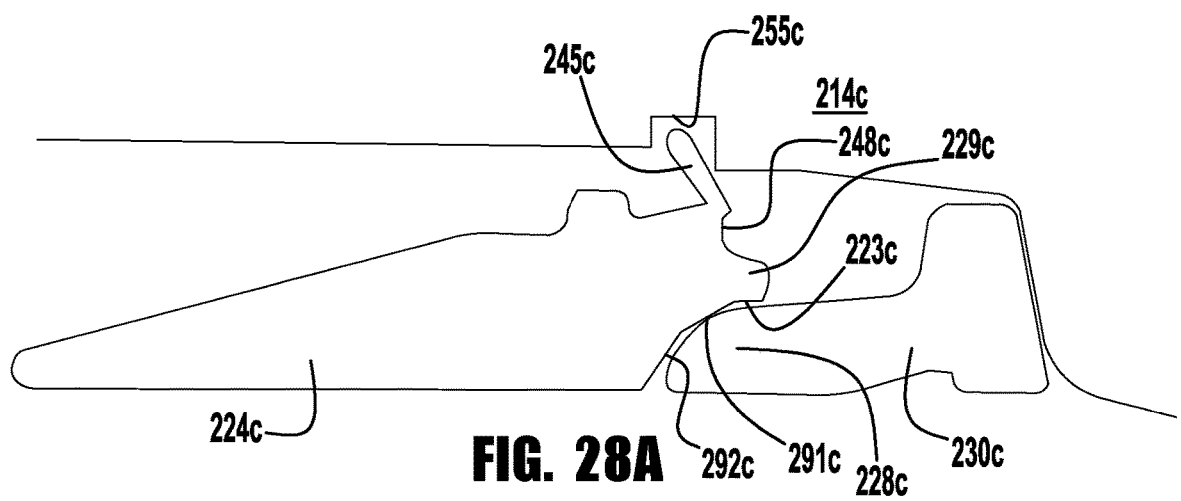
FIG. 28A is a partial longitudinal cross-sectional view of a fitting preassembly including the front ferrule of FIG. 28 cartridged with a nut and rear ferrule.
Figure 28B:
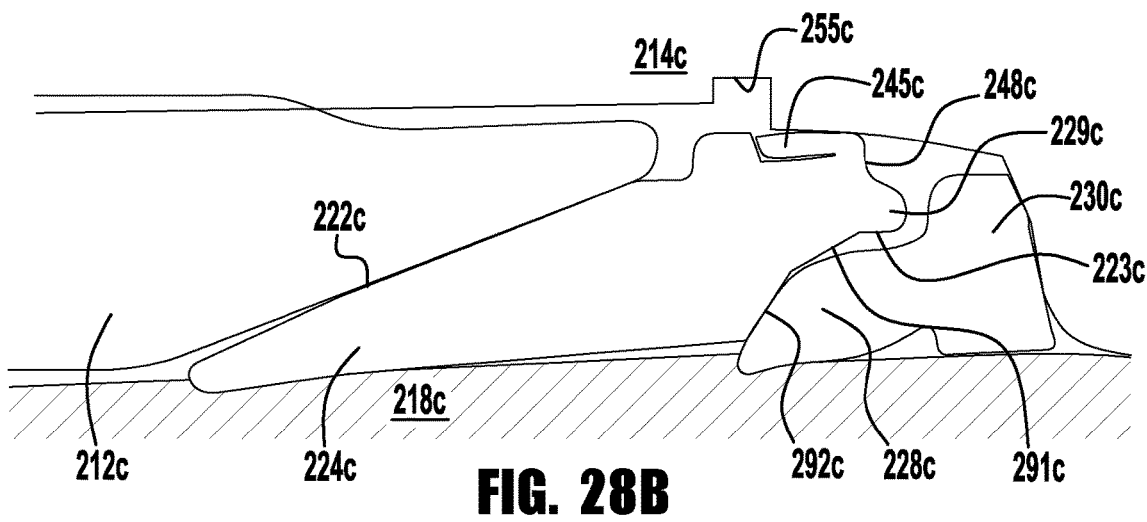
FIG. 28B is a partial longitudinal cross-sectional view of a fitting assembly including the front ferrule of FIG. 28, shown with the fitting pulled up on a conduit end.

FIG. 28 illustrates an exemplary front ferrule 224c provided with a rear portion 229c defining a necked down outboard axial projection extending axially rearward of the camming mouth 226c, and radially inward of the ferrule retaining projection 245c, with the ferrule retaining projection 245c extending from a rear end radial surface 248c axially inward of the outboard axial projection 229c. The outboard axial projection 229c defines a rear bore 223c, extending rearward from the outer tapered portion 291c of the camming mouth 226c, into which a radially outer front portion 228c of the rear ferrule 230c may be received (FIG. 28A). This arrangement may facilitate suitable axial and radial alignment of the front and rear ferrules 224c, 230c during cartridging of the ferrules with the nut 214c, and within the cartridged subassembly, as described in greater detail above with respect to the embodiment of FIGS. 1-6. A steeper (i.e., with respect to the outer tapered portion 291c) inner tapered portion 292c of the rear camming mouth 226c engages the front end portion 228c of the rear ferrule 230c during pull-up to facilitate radial indentation (and tube grip) of the rear ferrule front end 228c (FIG. 28B), as well as accelerated axial advancement of the front ferrule 224c with respect to the fitting body 212c for radial indentation of the front camming surface 222c of the front ferrule 224c caused by engagement with the body camming surface. Additional embodiments including a similar bore defining outboard axial projection of the front ferrule are illustrated in FIGS. 29-31, 36-39, and 42-49, but may be applied to any of the ferrules described and shown herein.

As one example, as shown in FIG. 29, the front ferrule 224' may be provided with a rear portion 229' extending axially rearward of the camming mouth 226', and radially inward of the ferrule retaining projection 245' (or other such radially outer retaining feature on the ferrule). The rear portion 229' defines a rear bore 223', extending rearward from the rear camming mouth 226', into which a radially outer front portion 228' of the rear ferrule 230' may be received. This arrangement may facilitate suitable axial and radial alignment of the front and rear ferrules 224', 230' during cartridging of the ferrules with the nut 214', and within the cartridged subassembly. As one benefit, this alignment can ensure sufficient radial alignment of the front and rear ferrules with each other, for example, for substantial radial alignment of the axial bores of the front and rear ferrules for ease of tube installation, for substantial radial alignment of the front ferrule camming mouth 226' with the rear ferrule front portion 228', and to prevent misalignment of the ferrules within the cartridged assembly (e.g., due to impact or vibration). As another benefit, this alignment can provide for sufficient concentricity of the rear ferrule 230' within the nut 214', for example, for proper radial alignment of the rear ferrule driven surface 232' with the nut drive surface 234'. As still another benefit, this alignment can provide for sufficient concentricity of the front ferrule 224' within the nut 214', for example, for proper radial alignment of the front ferrule retaining projection 245' and the nut retaining recess 255' to prevent misalignment and dislodging of the front ferrule from the nut of the cartridged assembly (e.g., due to impact or vibration).

Figure 30:
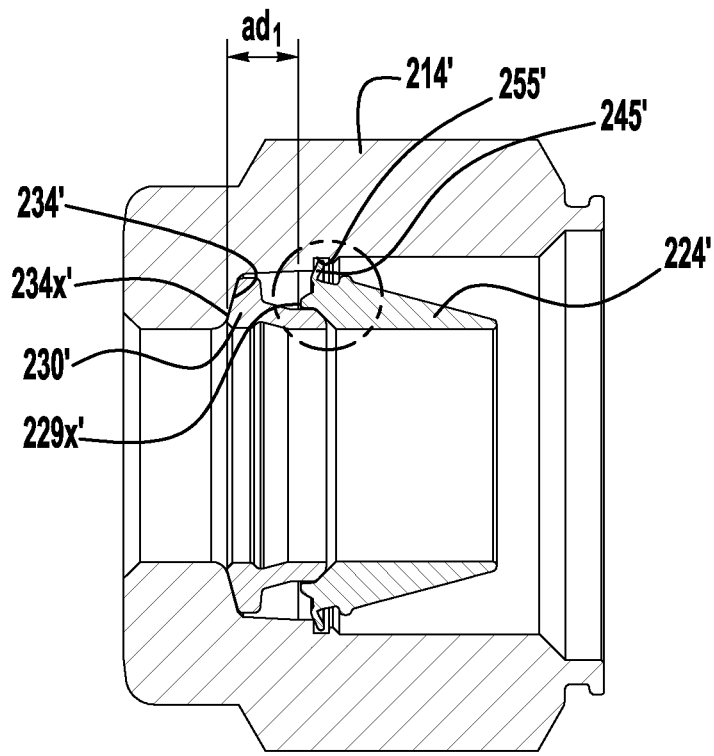
FIG. 30 is a longitudinal cross-sectional view of the fitting nut and ferrules of FIG. 29, shown assembled as a cartridged preassembly.
Figure 30A:
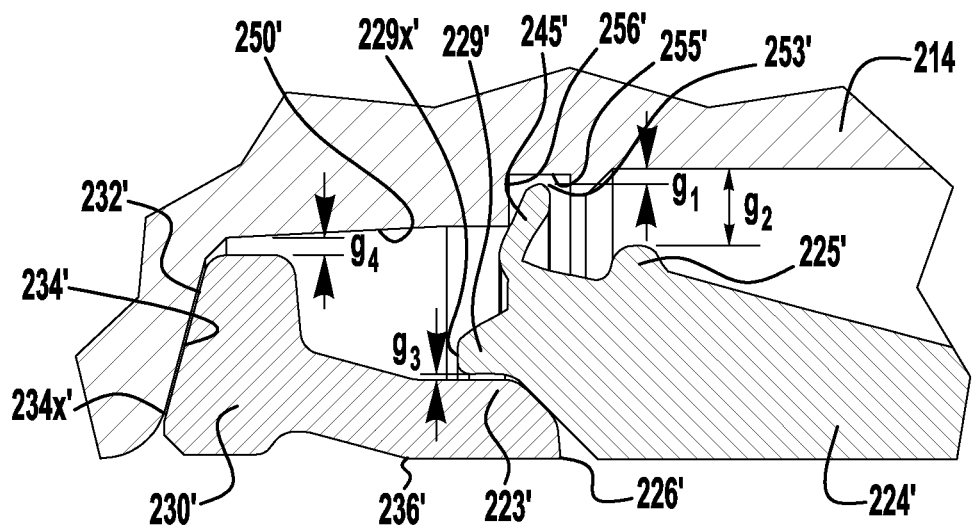
FIG. 30A is an enlarged view of the circled region of FIG. 30.
Figure 31A:
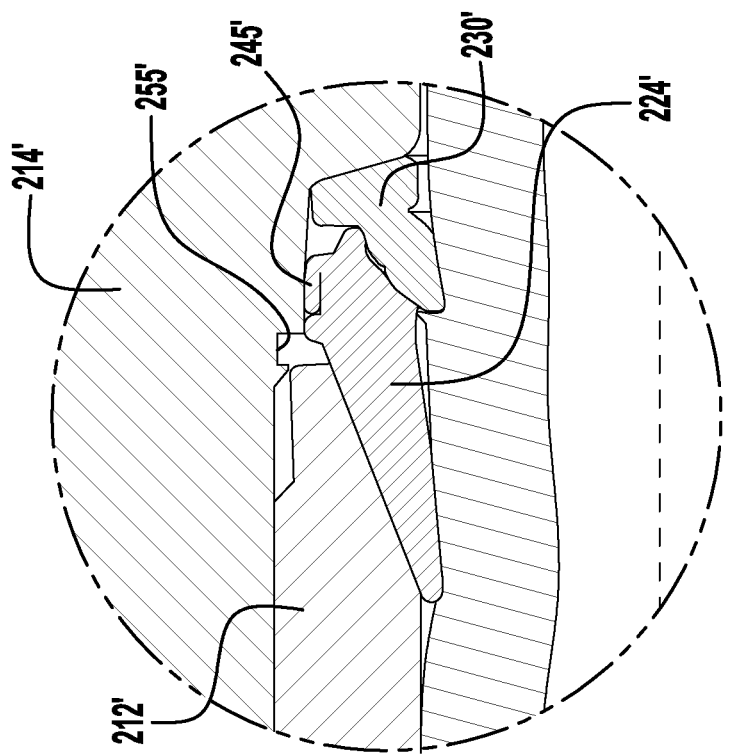
FIG. 31A is an enlarged view of the circled region of FIG. 31.
Figure 31:
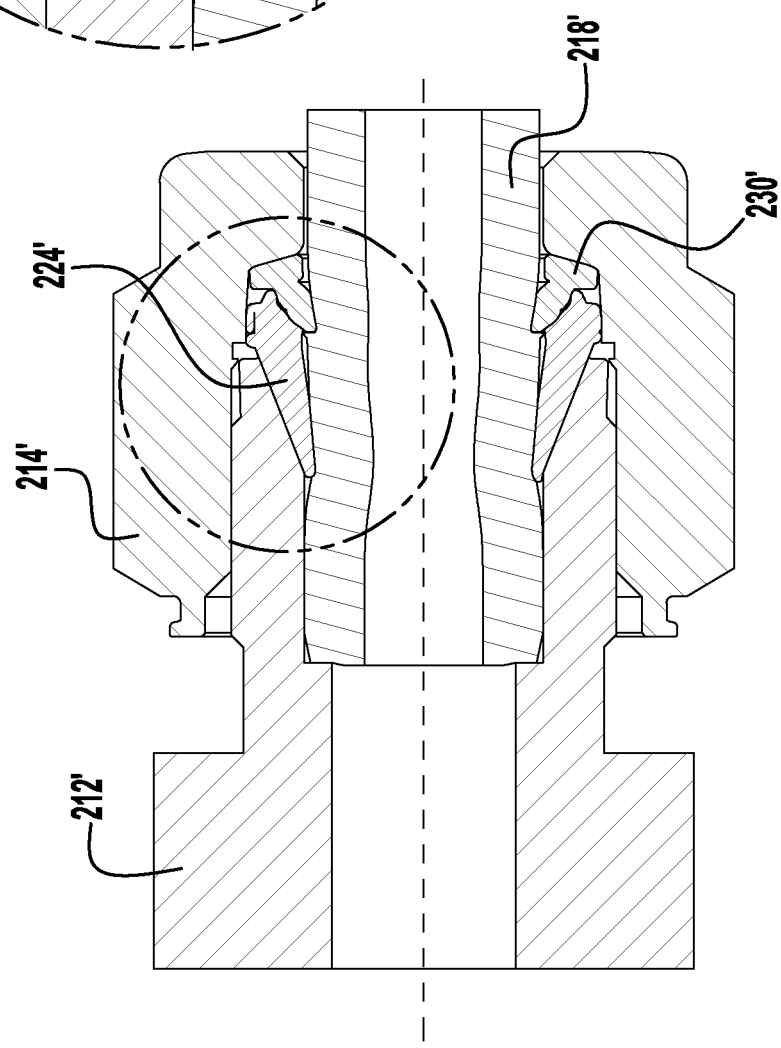
FIG. 31 is a longitudinal cross-sectional view of the fitting nut and ferrules of FIG. 29, shown assembled with a fitting body and pulled up on a conduit end.
Figure 39:
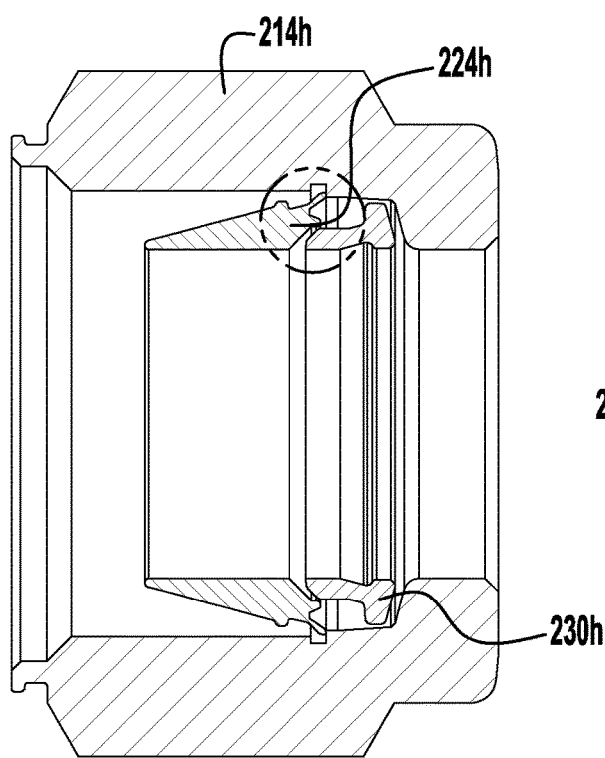
FIG. 39 is a longitudinal cross-sectional view of an exemplary fitting nut and ferrules, shown with the ferrules loosely inserted in the fitting nut.
Figure 39A:
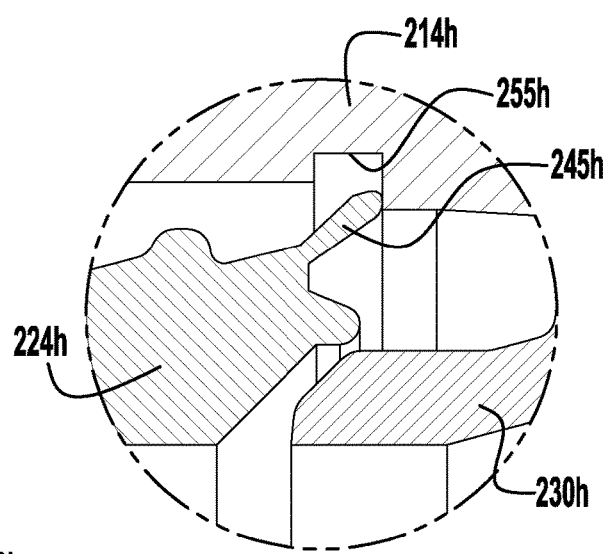
FIG. 39A is an enlarged view of the circled region of FIG. 39.
Figure 40:
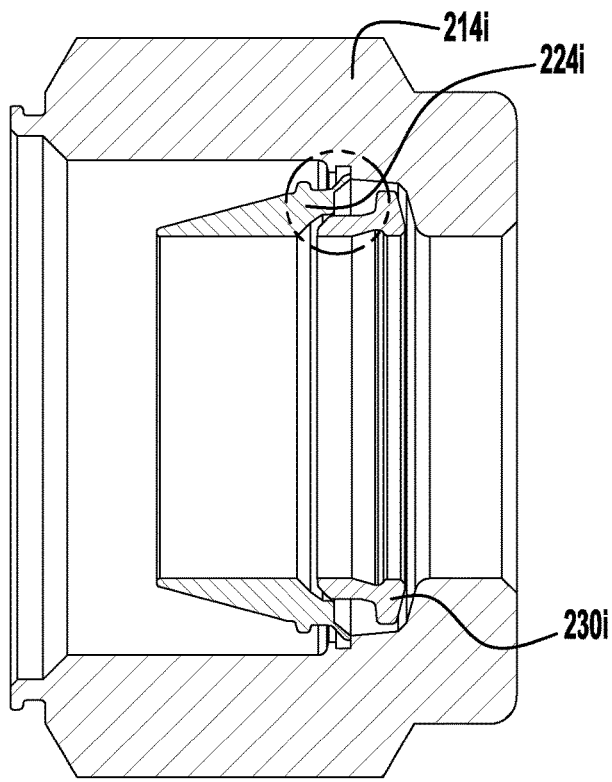
FIG. 40 is a longitudinal cross-sectional view of an exemplary fitting nut and ferrules, shown with the ferrules loosely inserted in the fitting nut.
Figure 40A:
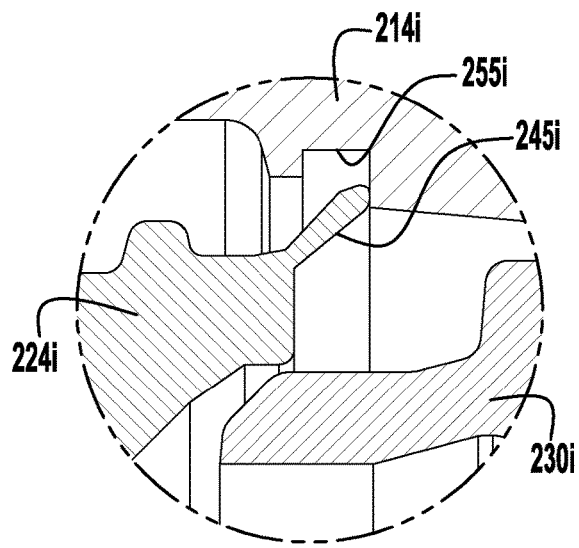
FIG. 40A is an enlarged view of the circled region of FIG. 40.
Figure 41:
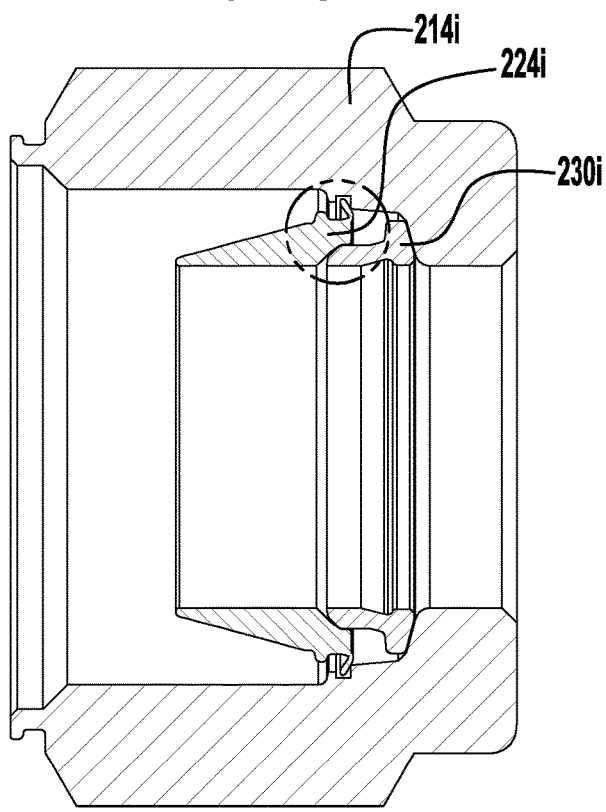
FIG. 41 is a longitudinal cross-sectional view of the fitting nut and ferrules of FIG. 40, shown assembled as a cartridged preassembly.
Figure 41A:
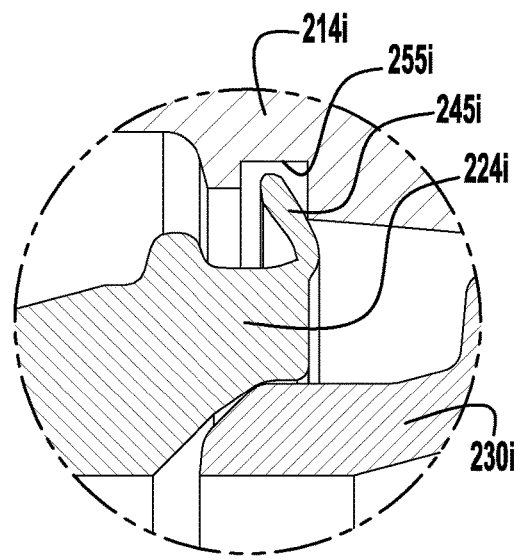
FIG. 41A is an enlarged view of the circled region of FIG. 41.
Figure 42:
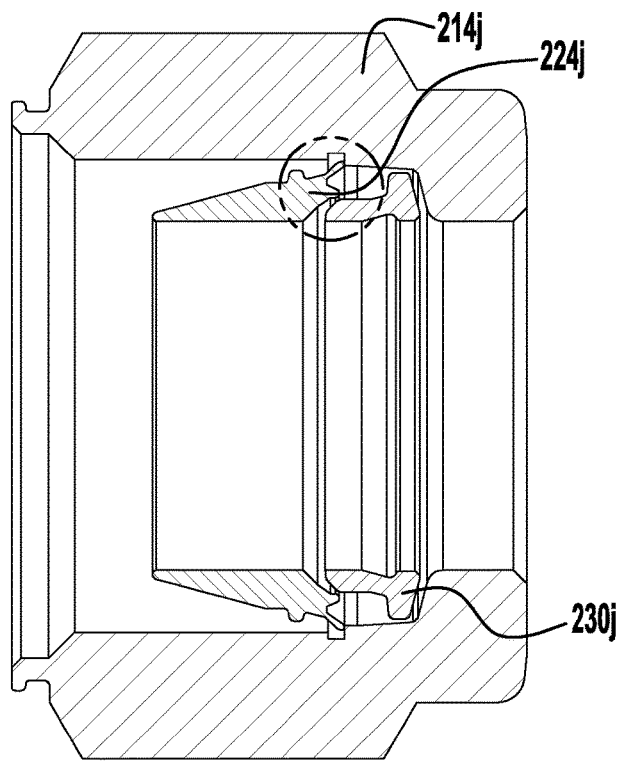
FIG. 42 is a longitudinal cross-sectional view of an exemplary fitting nut and ferrules, shown with the ferrules loosely inserted in the fitting nut.
Figure 42A:
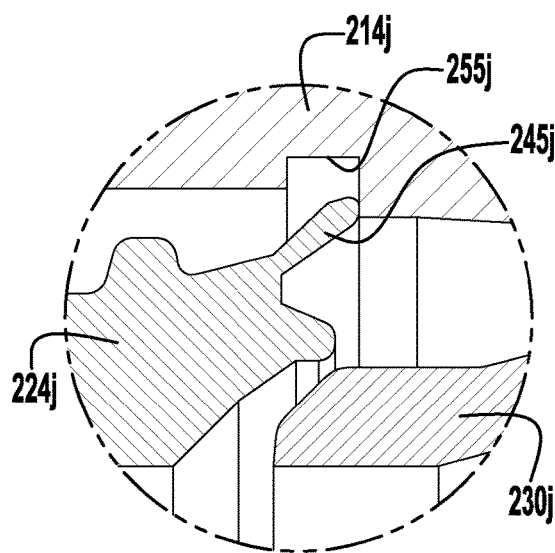
FIG. 42A is an enlarged view of the circled region of FIG. 42.
Figure 43:
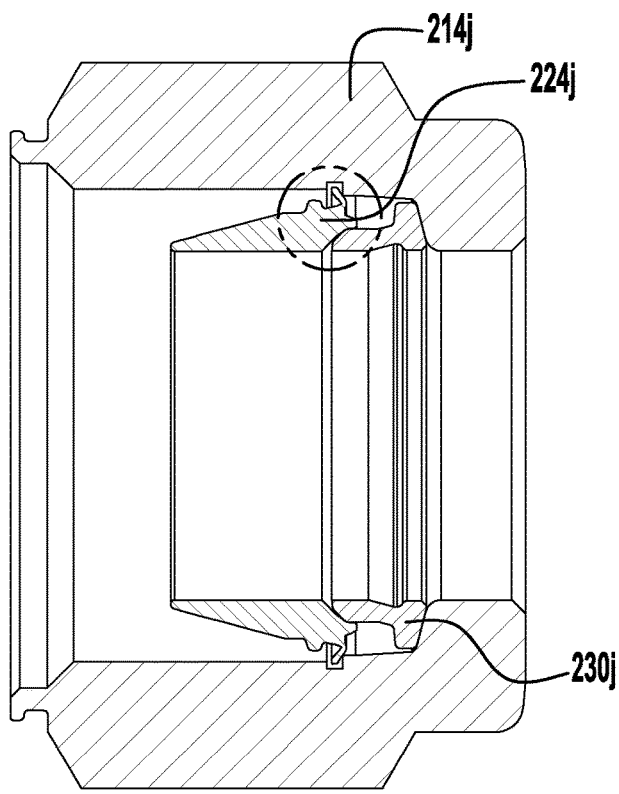
FIG. 43 is a longitudinal cross-sectional view of the fitting nut and ferrules of FIG. 42, shown assembled as a cartridged preassembly.
Figure 43A:
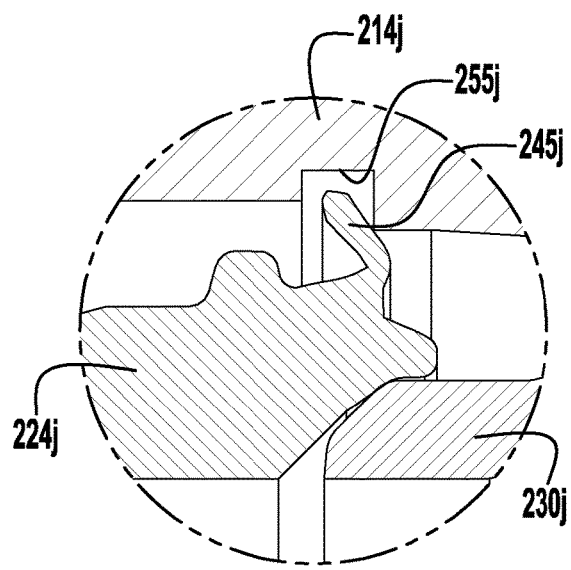
FIG. 43A is an enlarged view of the circled region of FIG. 43.
Figure 44:
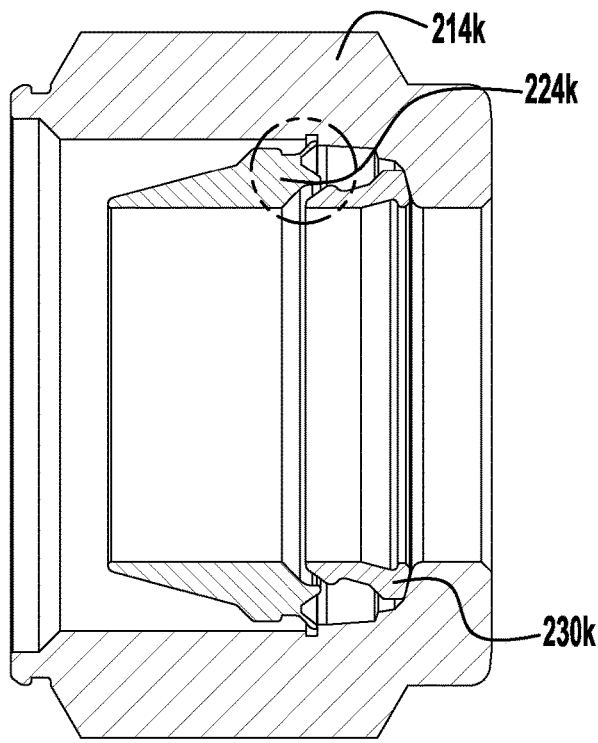
FIG. 44 is a longitudinal cross-sectional view of an exemplary fitting nut and ferrules, shown with the ferrules loosely inserted in the fitting nut.
Figure 44A:
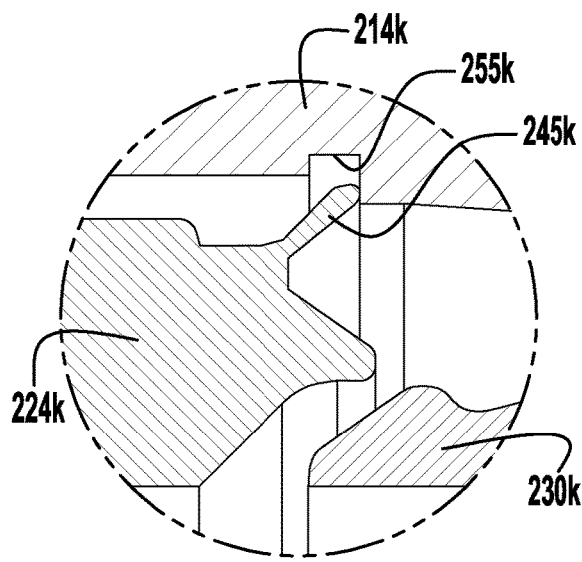
FIG. 44A is an enlarged view of the circled region of FIG. 44.
Figure 45:
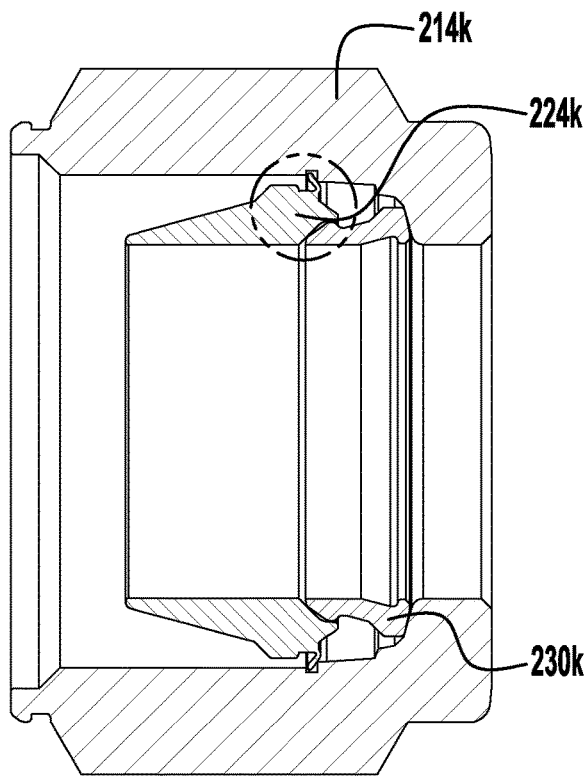
FIG. 45 is a longitudinal cross-sectional view of the fitting nut and ferrules of FIG. 44, shown assembled as a cartridged preassembly.
Figure 45A:
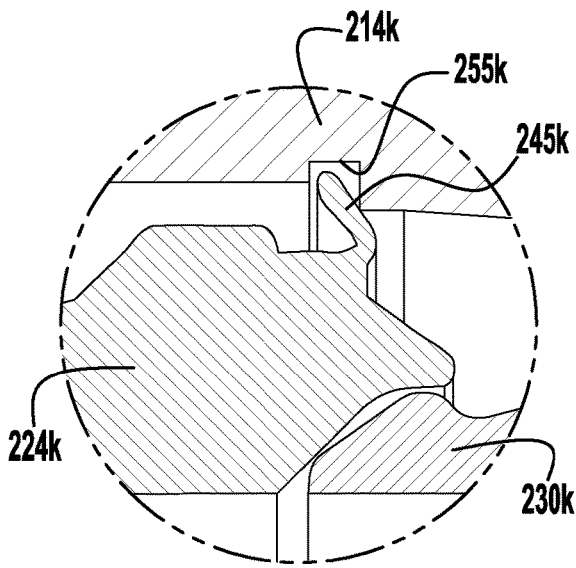
FIG. 45A is an enlarged view of the circled region of FIG. 45.
Figure 48:
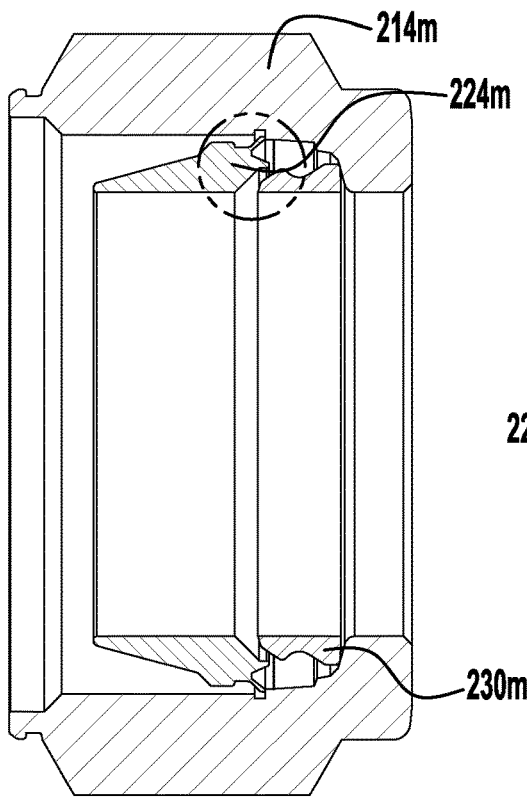
FIG. 48 is a longitudinal cross-sectional view of an exemplary fitting nut and ferrules, shown with the ferrules loosely inserted in the fitting nut.
Figure 48A:
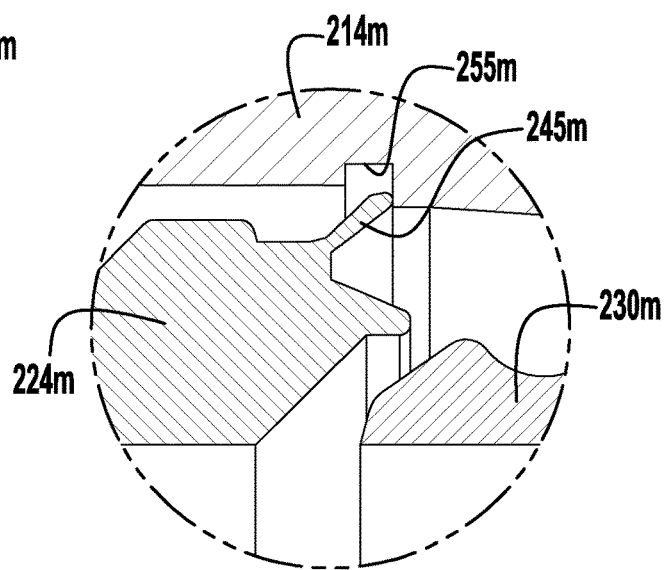
FIG. 48A is an enlarged view of the circled region of FIG. 48.
Figure 49:
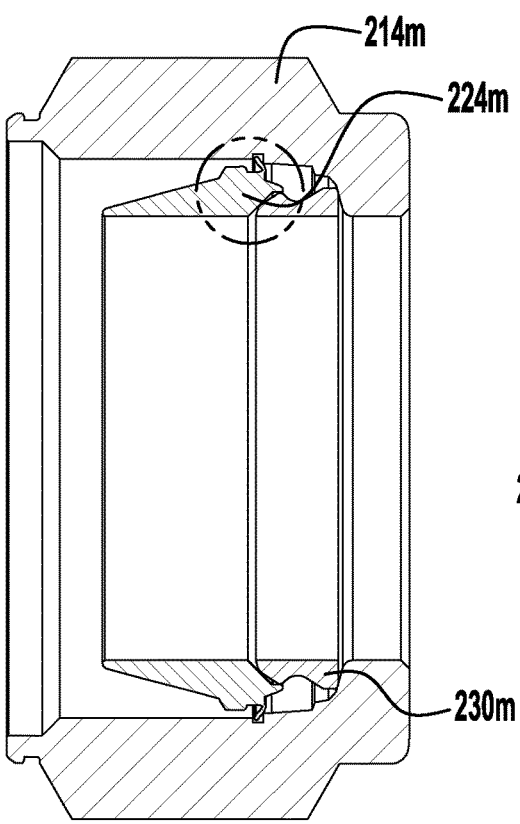
FIG. 49 is a longitudinal cross-sectional view of the fitting nut and ferrules of FIG. 48, shown assembled as a cartridged preassembly.
Figure 49A:
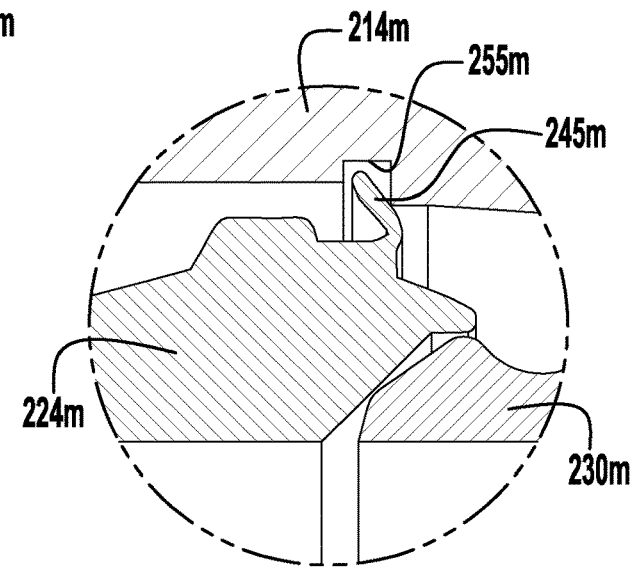
FIG. 49A is an enlarged view of the circled region of FIG. 49.

To control radial and axial alignment of the ferrules 224', 230', with each other and with the cartridging nut 214', the nut and ferrules may be dimensioned such that the radial gaps between the nut and ferrule interengaging surfaces, when centered on a longitudinal axis X (as shown, for example, in FIG. 30A), are minimized, including, for example: a radial gap g1 between the outer diameter of the front ferrule retaining projection 245' and the retaining recess 255' of the nut 214' (e.g., in the front ferrule's forward-most cartridged position); a radial gap g2 between the outer radial surface 225' of the front ferrule 224' and the aligned portion of the nut interior wall 250' (e.g., in the front ferrule's rearward-most cartridged position); a radial gap g3 between the rear ferrule's radially outer front portion 236' and the aligned front ferrule rear bore 223' (e.g., in the front ferrule's forward-most cartridged position and the rear ferrule's rearward most cartridged position), and a radial gap g4 between the radially outer edge of the rear ferrule driven surface 232' and the aligned portion of the nut interior wall surface 250' (e.g., in the rear ferrule's forward-most cartridged position). These gaps may be sized to be large enough to avoid a press fit or interference fit between the interengaging surfaces of the nut and ferrules, while reducing or minimizing radial movement radial movement as discussed about. For example, one or more of the radial gaps g1, g2, g3, g4 may be sized between about 0.00005 inches and about 0.015 inches, or between about 0.00005 inches and about 0.006 inches, or between about 0.00005 inches and about 0.003 inches, or between about 0.0005 inches and about 0.001 inches. In one embodiment, either or both of the rear ferrule radial gaps g3, g4 may be smaller than either or both of the front ferrule-nut radial gaps g1, g2, and may be reduced or minimized to further limit radial movement of the front ferrule 224', beyond the limits to radial movement of the front ferrule caused by the front ferrule-nut radial gaps g1, g2, for example, to prevent or impede misalignment of the retaining projection 245' and recess 255' and unintended disengagement of the front ferrule from the nut and ferrule subassembly. For example, the sum of the rear ferrule radial gaps g3, g4 may be smaller than either or both of the front ferrule-nut radial gaps g1, g2.

As another example, the front ferrule may be provided with an extended rear end section that defines a counterbore overhanging the rear ferrule front end or nose portion, which may prevent backwards installation of the rear ferrule, as a backwards installed rear ferrule would prevent cartridged installation of the front ferrule into the nut.

Further, the rear portion 229' of the front ferrule 224' may prevent backwards installation of the rear ferrule 230', by sizing the rear portion such that a backwards installed rear ferrule would prevent projection bending cartridging installation of the front ferrule 224' into the nut 214'. To provide for this misassembly prevention, the rear portion 229' may be sized such that when the front ferrule 224' is in the rearward most un-cartridged or non-retained position (i.e., with the end portion of the ferrule retaining projection 245' contacting the outboard radial wall 256', without bending the projection, of the nut interior wall, as shown in FIG. 29A), the axial distance $ad_1$ between the backwards rear ferrule engaging portion 234x' of the nut drive surface 234' and the backwards rear ferrule engaging portion 229x' of the outboard axial projection 229' is smaller than the axial distance $ad_2$ between the backwards rear ferrule engaged portion 236x' of the rear ferrule front portion 236' and the backwards rear ferrule engaged portion 232x' of the rear ferrule driven surface 232' (as shown in FIG. 29B). Further, the total end-to-end length of the stacked front and rear ferrule may be significantly greater when the rear ferrule is in a backwards orientation, such that a visual or measurement-based inspection of the ferrules prior to installation may confirm the improper orientation of the rear ferrule. Additionally or alternatively, the outboard axial projection may be sized such that engagement between the outboard axial projection of the front ferrule and the driven surface of the backwards installed rear ferrule prevents the threads of the fitting nut from engaging the threads of the fitting body.

Additionally or alternatively, the timing of the bending or hinging release of a retaining front ferrule projection may be controlled by axially locating the outboard radial wall of the nut recess within the nut relative to the outwardly narrowing tapered outboard surface of the nut interior wall. To allow for this selective placement of the outboard radial wall, as shown in FIG. 17A, a cylindrical surface portion 259 of the nut interior wall 250 extending from an inner end of the tapered outboard surface 257 to the outboard radial wall 256 may be sized to locate the outboard radial wall at a desired axial location, and at a more easily controlled inside diameter. This axial separation of the projection-engaging outboard radial wall 256 from the tapered outboard surface 257 may also allow for increased bending of the projection 245 prior to front ferrule engagement with the tapered outboard surface. The drive edge 259a defined by the intersection of the outboard radial wall 256 with the cylindrical surface portion 259 may be provided with an edge radius that is sharp enough to further facilitate bending of the projection 245 during tube fitting pull-up (e.g., by frictional gripping engagement between the drive edge 259a and the projection 245) without excessively gouging, tearing, or indenting the projection. Additional embodiments including a similar cylindrical interior wall adjacent the retaining recess of the nut are illustrated in FIGS. 29-31, 36-39, and 42-49. In other embodiments, as shown in FIGS. 22-24, a continuous tapered interior surface 650 may instead be provided for smoother contact engagement between the projection and the interior surface during pull-up, which may in some embodiments facilitate release of the ferrule from the nut during pull-up.

FIGS. 32-49 illustrate various other exemplary embodiments of fitting preassemblies including a retaining nut 214d-214m, a cartridging front ferrule 224d-224m including a projection 245d-245m received in a circumferential recess 255d-255m in the nut, and a rear ferrule 230d-230m captured between the cartridged front ferrule and an outboard drive surface of the fitting nut.

According to still another exemplary aspect of the present application, a conduit gripping device (e.g., a single ferrule or a front ferrule of a two ferrule arrangement) may be provided with a frangible radially extending projection that provides for retention with a retaining fitting component (e.g., fitting nut) in a preassembly or loosely assembled or finger-tight fitting assembly, and that separates or breaks away from the conduit gripping device during complete or partial pull-up, for example, to permit release of the conduit gripping device from the retaining fitting component upon fitting disassembly. Similar to the above described embodiments, the projection may be deformed (e.g., elastically and/or plastically) into radial alignment with an inboard radial wall in the retaining fitting component when an outward axial force is applied to the conduit gripping device, such that an end portion of the projection is axially captured in a circumferential recess of the retaining fitting component upon application of a controlled axial force to the conduit gripping device. When the fitting assembly is pulled up (partially and/or completely) on a conduit end, additional outward axial force applied to the conduit gripping device causes a frangible portion of the projection to break, separating the projection from the outer circumferential surface of the conduit gripping device. Upon subsequent disassembly of the fitting, the conduit gripping device is releasable from the retaining fitting component as the outermost surface of the conduit gripping device is radially inward of the inboard portions of the retaining fitting component.

FIGS. 50-53 illustrate an exemplary embodiment of one or more of the inventions, including a fitting body 312, nut 314, and front and rear ferrules 324, 330 duplicating many of the features of the fitting components of the embodiments of FIGS. 1-49, as described in greater detail above. The ferrule retaining structure of the embodiment of FIGS. 50-53 includes a radially and axially outward extending projection 345 on the front ferrule 324, attached to an outer circumference of the ferrule at a narrowed down or otherwise frangible portion 343. The end portion 346 of the projection 345 is contoured to permit radial outward and axial inward pivoting movement of the projection about the frangible portion 343 when an axial outward force is applied to the ferrule with the projection end portion 346 abutting the outboard radial wall.

FIGS. 50 and 50A illustrate the fitting nut 314 and ferrules 324, 330 in a loose or pre-cartridged condition, with the rear ferrule 330 axially disposed between the front ferrule 324 and a radially extending annular shoulder or drive surface 334 of the fitting nut 314. Prior to cartridging, the circumferential projection extends primarily axially outward from the frangible portion 343, but may also extend radially outward. A circumferential recess 355 in the fitting nut 314 is defined by, and disposed between, inboard and outboard radial walls 354, 356 that may be similar to those of the embodiments of FIGS. 7-49. Prior to cartridging, the end portion 346 of the projection 345 is positioned radially inward of the inboard surface 353 of the nut interior wall 350, and radially outward of the outboard surface 357 of the nut interior wall 350, such that the projection end portion 346 of the front ferrule 324 may be loosely received into axial alignment with the circumferential recess 355 and into abutment with the outboard radial wall 356. In other embodiments (not shown), the projection may be configured to snap into engagement with the recess for cartridged retention of the ferrules, similar to the embodiment of FIGS. 1-6.

Similar to the embodiments of FIGS. 7-49, an axial force applied to the front ferrule 324 with the projection end portion 346 engaging the outboard radial wall 356 causes the projection 345 to bend or pivot (or be axially and radially deformed) about the frangible portion 343 (functioning as a hinge portion) in an axially inward and radially outward direction, such that the projection end portion 346 is radially expanded into radial alignment with the inboard radial wall 354, as shown in FIGS. 51 and 51A. As shown, the projection end portion 346 may be contoured to facilitate the pivoting movement. In this aligned position, the plastically deformed projection 345 is axially captured between the inboard radial wall 354 and the outboard radial wall 356. As shown, the deformed, axially captured projection 345 may be disposed in a generally laterally extending orientation (e.g., between 80° and 110° with respect to the central axis X) to maximize radial overlap between the projection 345 and the inboard radial wall 354, and to minimize lateral movement of the cartridged ferrule 324, for more secure retention of the cartridged ferrule.

The axial forces applied to the ferrule during cartridging may be controlled or limited, for example, by configuring the retaining arrangement such that when the projection end portion 346 is radially expanded as specified above, an outboard end surface or camming mouth 326 of the front ferrule 324 abuts an inboard end camming surface 328 of the rear ferrule 330, and an outboard end surface 332 of the rear ferrule 330 abuts the outboard annular shoulder 334 of the nut 314, and/or by using one or more installation tools, as described in greater detail above.

FIG. 52 illustrates the fitting assembly 300 in a finger-tight condition, meaning that the various parts 312, 314, 324, and 330 have been assembled onto the conduit 318 but are loosely assembled or slightly tightened or snugged up by manually joining the nut 314 and body 312 together. As shown in FIGS. 53 and 53A, when the fitting assembly 300 is tightened to a partially or completely pulled up condition, a resulting axial load from the inward axial movement of the nut 314 relative to the front ferrule 324 is sufficient to sever or break the deformed projection 345 away from the outer circumference of the ferrule 324 at the frangible portion 343. When the fitting 300 is subsequently disassembled, the ferrules 324, 330 are released from the nut 314 as the outer diameter of the front ferrule 324 is smaller than the inboard interior surfaces of the nut 314. This release condition may be selected to coincide, for example, with a complete pull-up, or with a partial pull-up that is sufficient to cause the ferrules 324, 330 to begin plastically deforming the conduit 318, such that subsequent loosening or separation of the nut 314 from the body 312 permits the released ferrule 324 to maintain gripping engagement with the deformed conduit surfaces. The severed, annular projection 345 remains lodged in the circumferential recess 355, and therefore does not impede further use of the fitting 300.

As shown, the projection 345 may be shaped and sized to closely match the cross-sectional profile of the circumferential recess 355, thereby limiting both axial and radial movement of the cartridged ferrule 324. This closely received deformed projection 345 may further facilitate breakaway or shearing of the projection during pull-up, by limiting deformation of the end portion 346 of the projection 345 and focusing axial stresses on the frangible portion 343.

Other features or conditions of the embodiments of the inventions described herein may facilitate assembly of the cartridged subassembly. As another example, the front and rear ferrules may themselves include features for cartridging together, either prior to or synchronous with assembly with the fitting nut, similar to the cartridging ferrule embodiments described in pending U.S. Patent Application Pub. No. 2010/0148501, filed on Dec. 10, 2009 for FERRULE ASSEMBLY FOR CONDUIT FITTING (the "'501 Application"), and U.S. Patent Application Pub. No. 2015/0323110, filed on May 8, 2015 for CONDUIT FITTING WITH COMPONENTS ADAPTED FOR FACILITATING ASSEMBLY (the "'110 Application"), the entire disclosure of which is incorporated herein by reference, and in the above incorporated '810 Patent and '288 Application.

Figure 55:
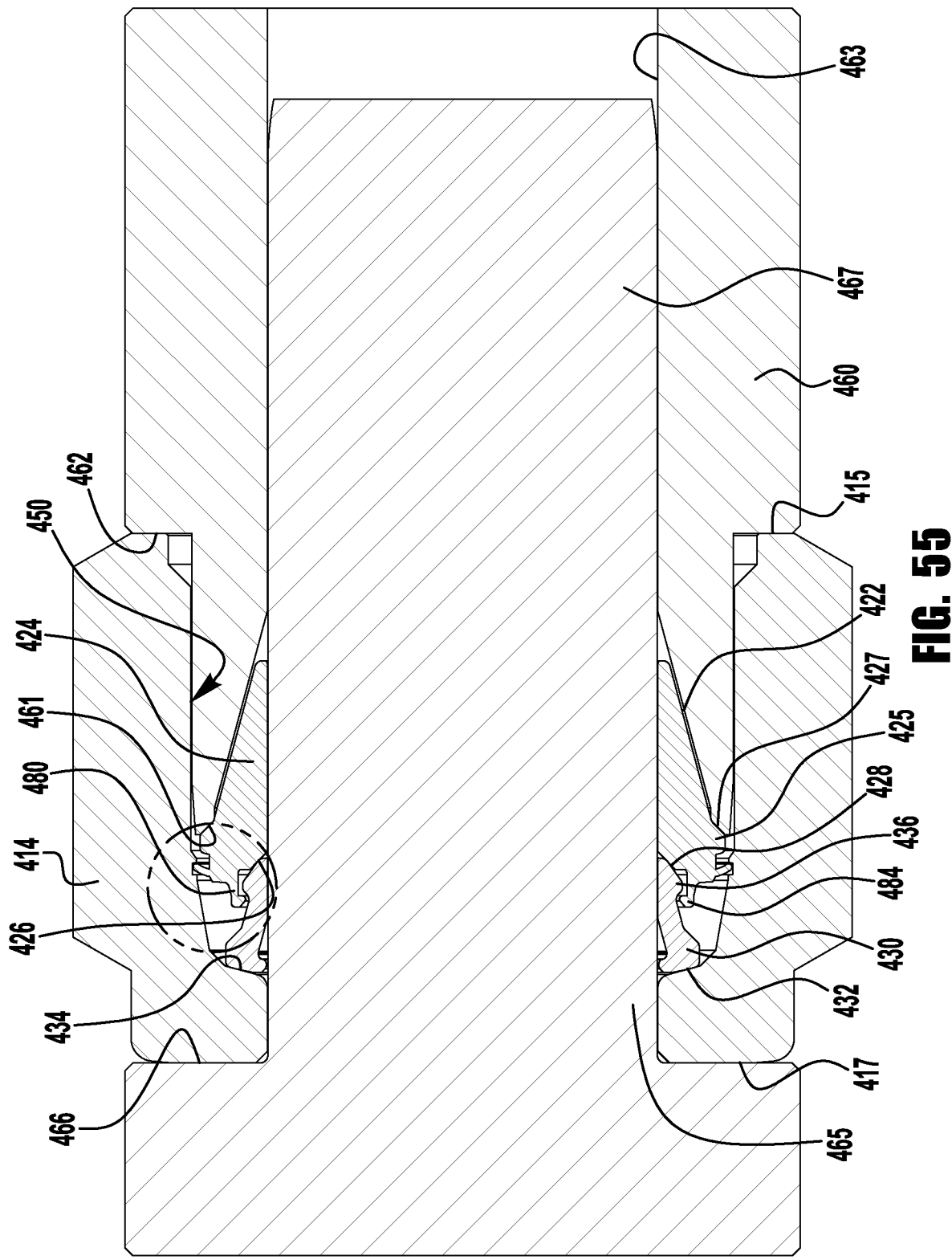
Figure 56:
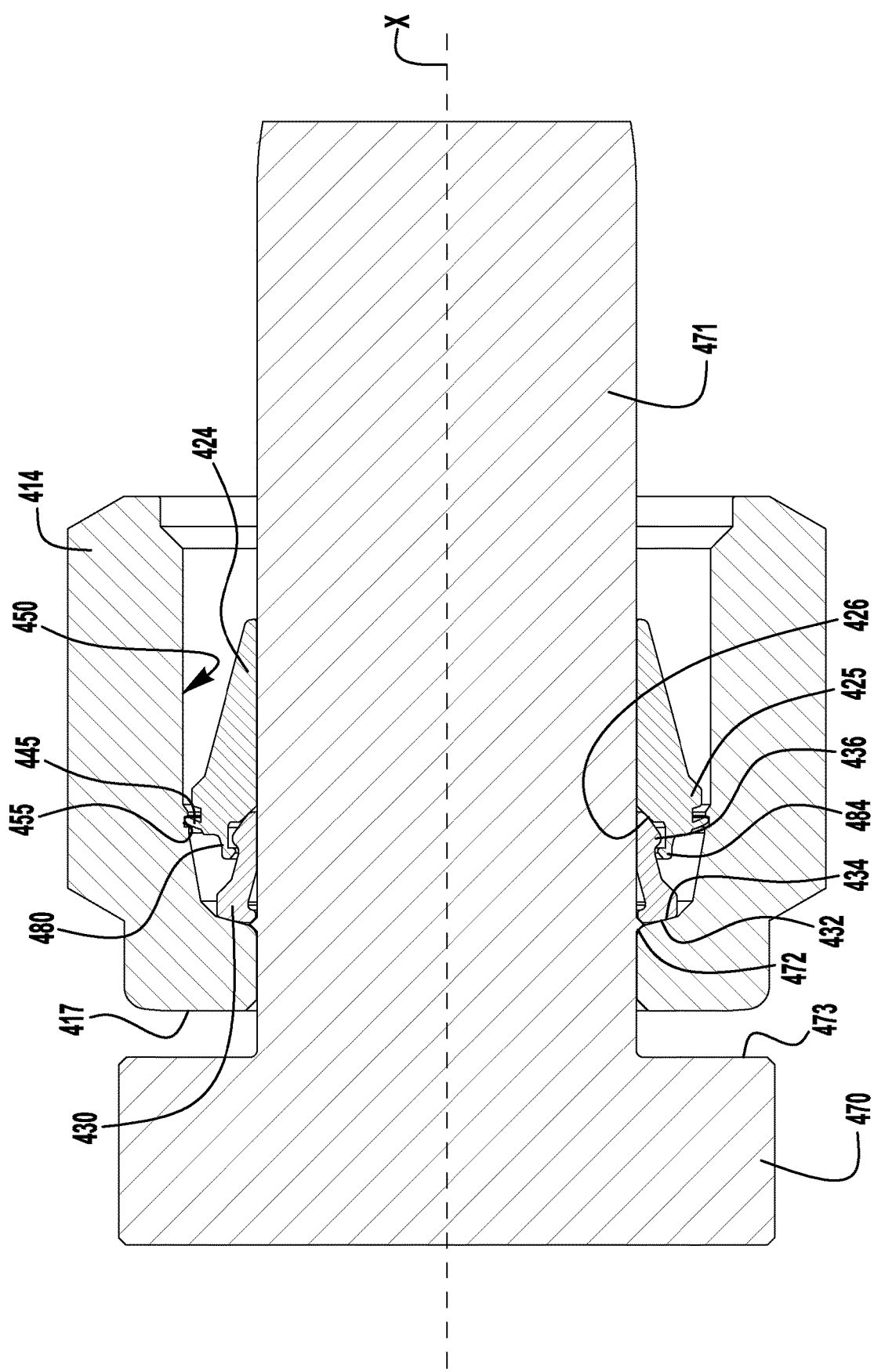

With reference to FIGS. 54-56, an exemplary embodiment is presented of a nut 414 and ferrules 424, 430 configured for both cartridged retention of the ferrules with the nut and cartridged retention of the ferrules together as a discrete ferrule subassembly. In this exemplary embodiment, the front ferrule 424 includes an annular rearward or axially outward projection or extension 480 that functions as the retaining structure. This extension 480 may take on any shape or configuration that is compatible with the front portion 428 of the rear ferrule 430, so that the extension 480 functions to hold the ferrules 424, 430 together.

Figure 55A:
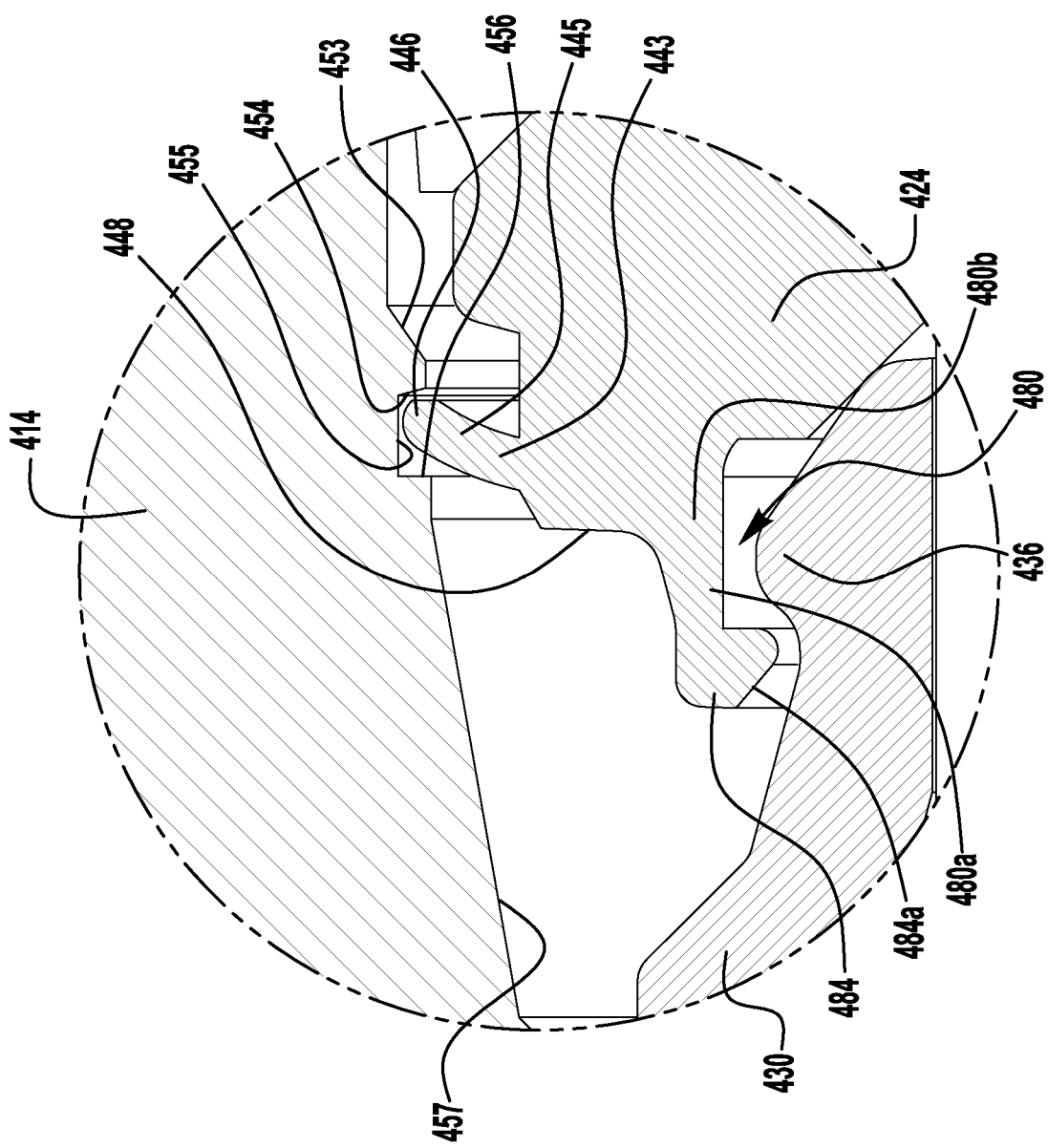

As shown, the extension 480 is generally annular and extends axially from a back wall or outboard radial surface 448 of the front ferrule 424. The extension 480 may act as a clip or tang that snaps over the crown 436 of the rear ferrule 430 when the ferrules are axially pressed together. To this end, the extension 430 may be provided with a degree of flexure or radial give so that it can radially expand sufficiently to allow the front portion of the rear ferrule to snap into the back end of the front ferrule, but will also relax back to a lower energy state in a position to hold the ferrules together with a robust connection to the degree of robustness needed for a particular use. The flexibility of the extension 480 may be controlled, for example, by controlling the geometry of the extension, particularly the radial thickness of the extension body 480a and its hinge or pivot connection region 480b. Typically, the extension body 480a will be substantially thinner than the engaging portion (such as the crown 436) of the rear ferrule 430 so that the press fit stress is taken up primarily by flexing of the extension 480 outward to allow the crown 436 to be received in the pocket 482 (FIGS. 55 and 55A). The extension 480 may in some cases then be viewed as a thin web of metal compared to the bulk metal body of the rear ferrule 430. Having a hinge region 480b of short axial length may also be used to control the flexibility of the extension 480. This would again be in contrast to a conventional press fit of a body being forced into a bore of a generally rigid continuous body. Further, the axially inward end of the extension 480 may include a radially enlarged lip portion 484 having a tapered camming surface 484a configured to direct a radially outward force from the rear ferrule 430 to the extension when an axial force is applied to the front ferrule 424. Other features and arrangements for providing radial flexure and snap-back retention of the extension are described in the above incorporated '501 Application.

Additionally or alternatively, a cartridging front ferrule may include a rear retaining extension that bends or flexes axially inward during the cartridging process to receive a portion of the rear ferrule (e.g., a radial protrusion or crown) into a cartridge recess of the front ferrule partially defined by the rear retaining extension. For example, in the illustrated embodiment of FIGS. 54-56, the radially inward extending lip portion 484 of the extension may be configured to be axially flexed inward by the crown portion 436 of the rear ferrule 430 when the front ferrule 424 is axially pressed against the rear ferrule. To provide increased axial flexure, the radial length of the lip portion may be increased, and/or the chamfered rear ferrule engaging surface 484a of the lip may be decreased or chamfered at a steeper angle, for example, to reduce the radial force component of the front and rear ferrule cartridging engagement. Other features and arrangements for providing axial flexure and snap-back retention of the extension are described in the above incorporated '110 Application.

Preferably, although not required, the extension 480 may accommodate the rear ferrule 430 and holds it so that the ferrules cannot be easily disassembled after they are connected together as a single unit. However, the degree or amount of force needed to separate the subassembly may be selected based on the particular application. In some cases it may be desirable to make it difficult to separate the ferrules after they have been joined together. For example, it may be desired in some cases to require a tool to separate the subassembly. But in other situations, it may be desirable to allow for easier separation. Therefore, as used herein, a cartridged ferrule subassembly includes connected together ferrules to the extent that the ferrules are held together so that the ferrules do not simply or easily fall apart under normal stress or handling.

In one embodiment, the front and rear ferrules 424, 430 of the embodiment of FIGS. 54-56 may be cartridged together as a cartridged ferrule preassembly prior to cartridged installation of the ferrule preassembly with the nut 414, for example, using the controlled axial force applying tools and arrangements described above. According to another aspect of the present application, a controlled axial force may be applied to an axially inward facing portion of the front ferrule 24, to simultaneously preassemble or "cartridge" the ferrules 424, 430 into the nut 414 and to cartridge the front ferrule 424 with the rear ferrule 430. The applied force may be an amount sufficient to bend the projection 445 enough to axially advance the projection past the tapered inboard surface 453 of the nut interior wall 450 and into alignment with the circumferential recess 455, while at the same time bending the extension 480 radially outward to receive the rear ferrule crown 436 in the pocket 482 defined by the extension 480. This controlled axial displacement and deformation of the projection 445 and extension 480 during cartridging may be facilitated by configuring the retaining arrangement such that when the projection 445 is axially advanced into cartridged alignment with the circumferential recess and the extension lip 484 snaps over the rear ferrule crown 436, an outboard end surface or camming mouth 426 of the front ferrule 424 abuts an inboard end camming surface 428 of the rear ferrule 430, and an outboard end surface 432 of the rear ferrule 430 abuts the outboard annular shoulder or drive surface 434 of the nut 414. The increased resistance to axial advancement at this position of front ferrule 424, rear ferrule 430, and nut 414 abutment provides a positive indication that the ferrules 424, 430 have been cartridged with each other and with the nut 414, and may prevent excessive bending of the projection 445 beyond the cartridged position. Other types of installation tools may be used to apply an axial cartridging force to the ferrules, including, for example, a front ferrule nose-engaging tool, a ferrule tilting or cocking tool, or a threaded installation tool, as described in greater detail above.

According to another exemplary embodiment, as shown in FIGS. 54B and 55, an installation tool 460 may be used to apply a controlled axial force to the front ferrule 424 to cartridge the ferrules with the nut. As shown, the tool 460 may be provided with an annular nose portion 461 that is inserted into the nut 414 between the camming surface 422 of the front ferrule 424 and the interior wall 450 of the nut. The nose portion 461 centers the ferrules 424, 430 within the nut 414 and may engage an inward facing surface 427 of an outer flange or boss portion 425 of the front ferrule 424, such that the axial force is applied to the outer flange portion 425 and not the camming surface 422. As shown, an alignment pin tool 465 may (but need not) additionally be assembled with the nut 414, by insertion of a shaft portion 467 of the alignment pin tool 465 through the interior wall 450 of the nut and into a central bore 463 in the installation tool 460, and abutment of an inner shoulder portion 466 with an outboard end surface 417 of the nut 414. A rear shoulder portion 462 of the tool 460 may be configured to abut an inboard end surface 415 of the nut 414 when the nose portion 461 has advanced the front ferrule 424 to axially align the projection 445 with the circumferential recess 455 and to snap the extension lip 484 over the rear ferrule crown 436 (as shown in FIGS. 55 and 55A), such that abutment of the tool shoulder portion 462 with the nut end surface 415 provides a positive stop indication that the ferrules 424, 430 have been cartridged with each other and with the nut 414.

As shown in FIG. 56, a second installation tool (shown in phantom at 470) may be used to apply a controlled inward axial force through the rear ferrule 430 to the front ferrule 424, to radially expand the projection 445 into increased radial interengagement with the inboard radial surface 454. The exemplary second installation tool 470 includes a central shaft portion 471 that is inserted through the ferrules 424, 430 to center the ferrules within the nut 414, and a raised circumferential rib or band 472 sized to be received through the outboard end of the nut for engagement with the outboard end surface 432 of the rear ferrule 430, such that the inward axial force is applied to the rear ferrule 430, and transmitted to the front ferrule 424. A rear shoulder portion 473 of the second installation tool 470 may be configured to abut an outboard end surface 417 of the nut 414 when the band 472 has axially retracted the front and rear ferrules 424, 430 an amount sufficient to engage the projection 445 with the inboard radial surface 454 for radial expansion of the projection within the recess 455, such that abutment of the shoulder portion 473 with the nut end surface 417 provides a positive stop indication that the front ferrule projection 445 has been sufficiently expanded. Other axially inward force applying tools may be utilized, including for example, a tool that grips or hooks onto the inner diameter of the outboard end surface 426 of the front ferrule or the outer diameter of the outer boss portion 425 of the front ferrule (not shown). Alternatively, a tool may be inserted through the inboard side of the nut to directly engage and axially bend the projection outward following the initial cartridge process (not shown).

According to another exemplary aspect of the present application, a tool applying an inward axial force to the ferrule or ferrules may be used to remove the cartridged ferrules from the nut, for example, to perform special cleaning or coating operations on the ferrules, to replace the previously installed ferrules with different ferrules (e.g., different materials, hardnesses, etc.), or for use of the nut on a different fitting arrangement (e.g., with an adapter that does not require ferrules, or with other ferrules that have already been compressed onto a conduit end). In such an embodiment, the tool (e.g., the tool 470 of FIG. 56) may include a rear shoulder portion 473 configured to abut the outboard end surface 417 of the nut 414 when the raised ferrule engaging rib or band 472 of the tool has axially retracted the front and rear ferrules 424, 430 an amount sufficient to axially move the projection 445 inboard of the narrowed inboard surface 453 of the nut interior wall 450, such that abutment of the shoulder portion 473 with the nut end surface 417 provides a positive indication that the cartridged front ferrule 424 (and with it, the rear ferrule 430) have been released from the nut 414. Other axially inward force applying tools may be utilized, including for example, a tool that grips or hooks onto the inner diameter of the outboard end surface 426 of the front ferrule or the outer diameter of the outer boss portion 445 of the front ferrule (not shown), for pulling the front ferrule 424 in the axially inward direction. As the rear ferrule 430 is not independently secured in the cartridged subassembly, the front and rear ferrules 424, 430 may remain cartridged together upon extraction or release from the nut 414. Other types of ferrule removal tools may additionally or alternatively be used, including, for example, a ferrule gripping/pulling tool, or a ferrule tilting/cocking tool, as described in greater detail above. Further, the cartridging features of either or both of the front ferrule and the nut may be configured to provide for a more easily releasable or "lightly cartridged" ferrule condition, as described in greater detail above.

When the fitting is pulled up (not shown, but see FIG. 3 of the above incorporated '501 Application), a radial inward compression of the crown 436 occurs as a result of the sliding contact between the contact surface 428 of the rear ferrule and camming mouth 426 of the front ferrule. This movement produces a reduction in the outer diameter of the crown 436 so that the crown no longer will engage the extension 480. This assures that the extension does not in any manner affect the pull-up and operation of the ferrules as the nut and body are tightened together. The ferrules move, grip and seal in the same manner, for example, as described in the above referenced patents. Note also that during pull-up the rear ferrule 430 tends to radially expand the back end of the front ferrule 424. This movement may also be used to assure that during pull-up the ferrules disengage from the retaining structure or extension 480. During pull-up, the ferrules 424, 430 are axially driven together to form the desired conduit grip and seal of the fitting assembly on the conduit. The axial position at which the crown 436 no longer engages the extension 480 will depend on various geometry considerations such as the diameter of the lip 484 and the diameter of the crown 436, as well as the various angles of contact which will determine how quickly the front portion of the rear ferrule is radially driven inward relative to axial displacement. The designer may choose to design the retaining structure so as to have the disengagement occur at a desirable axial position during pull-up. For example, the designer may prefer that the ferrules disengage or release from the retaining structure even after a partial pull-up, or almost immediately when the ferrules first start to be axially moved towards one another. In any case, the preferred technique is that the retaining structure not interfere with the normal pull-up operation of either ferrule or the nut and body fitting components.

The disengagement of the extension 480 from the rear ferrule crown 436 during fitting pull-up may occur in combination with (e.g., synchronously with or sequentially before or after) the disengagement of the front ferrule projection 445 from the nut circumferential recess 455 during fitting pull-up, as described in greater detail above in the description of the arrangement of FIGS. 1-6, and as shown in FIGS. 5, 5A, 6, and 6A.

While a cartridging connection between the front and rear ferrules may be unnecessary since the rear ferrule is captured between the front ferrule and the drive surface of the fitting nut, according to another inventive aspect of the present application, the front and rear ferrules may be provided with interengaging ferrule alignment features that do not axially capture or interlock the ferrules together (i.e., are non-cartridging), but still facilitate desired axial and radial alignment of the front and rear ferrules. As one example, the front ferrule may be provided with a rear counterbore into which a front end or nose portion of the rear ferrule may be received. This arrangement may facilitate suitable alignment of the front and rear ferrules within the cartridged subassembly, and may prevent misalignment of the ferrules within the subassembly (e.g., due to shock or vibration). As another example, the front ferrule may be provided with an extended rear end section that defines a counterbore overhanging the rear ferrule front end or nose portion, which may prevent backwards installation of the rear ferrule, as a backwards installed rear ferrule would prevent cartridged installation of the front ferrule into the nut.

According to another aspect of the present application, the interengaging cartridging surfaces of the nut and ferrules may be lubricated, coated, plated, polished, or otherwise treated to reduce friction between these interengaging surfaces, for example, to reduce distortion or galling of the ferrule projection and the nut interior surfaces during cartridging and fitting pull-up, or to increase or accelerate bending of the projection. Accordingly, in an exemplary embodiment, with reference to FIG. 17A, one or more of the ferrule projection outboard surface 244 and end surface 246, the inboard and outboard interior nut surfaces 253, 257, and the surfaces 254, 255, 256 of the nut recess are treated (e.g., lubricated, coated, plated, polished) for reduced friction. In another embodiment, portions of the cartridging surfaces of the nut and ferrules may be configured or treated for increased friction. As one example, with reference to FIG. 17A, the drive edge 259*a* of the nut 214 may be configured (e.g. with a sharp edge radius) or treated (e.g., by omitting or removing lubrication, coating, plating, polishing or other such treatment) to provide for increased friction engagement between the drive edge 259*a* and the projection 245.

Still other features may be utilized to facilitate installation and use of the cartridged subassembly. For example, a fitting nut (e.g., any of the fitting nuts described herein) may be provided with an external visual indicator (e.g., laser marking, knurling, ridge, band, or projection) to identify the nut as corresponding to a cartridged nut and ferrule subassembly. For example, as shown in the embodiment of FIGS. 50-53 (and also shown in the embodiments of FIGS. 29-49), the nut 314 may include an integral flange 358 that may serve to provide visual identification of a fitting nut for a cartridged nut and ferrule subassembly. In one embodiment, the flange 358 may be marked, for example, by printing or laser engraving (not shown), to specifically identify the cartridging properties. In another embodiment, the flange may facilitate attachment with an identifying ring or band (not shown), for example, a plastic or metal band sized to be snap-fit over the flange. The identifying band may be color coded and/or marked with a cartridging indicator (e.g., indicating ferrules cartridged together, ferrules cartridged with nut, or both). The flange may additionally or alternatively provide for attachment of a pull-up indicating collar, such as, for example, a stop collar or deformable collar identifying fitting pull-up (see, e.g., U.S. Pat. No. 6,640,457, incorporated herein by reference in its entirety), or a deformable torque collar providing a measurable or noticeable torque increase during initial assembly or remake to confirm sufficient pull-up (see, e.g., U.S. Patent Application Pub. No. 2015/0323110, the "'110 Application," incorporated herein by reference in its entirety).

Figure 57:
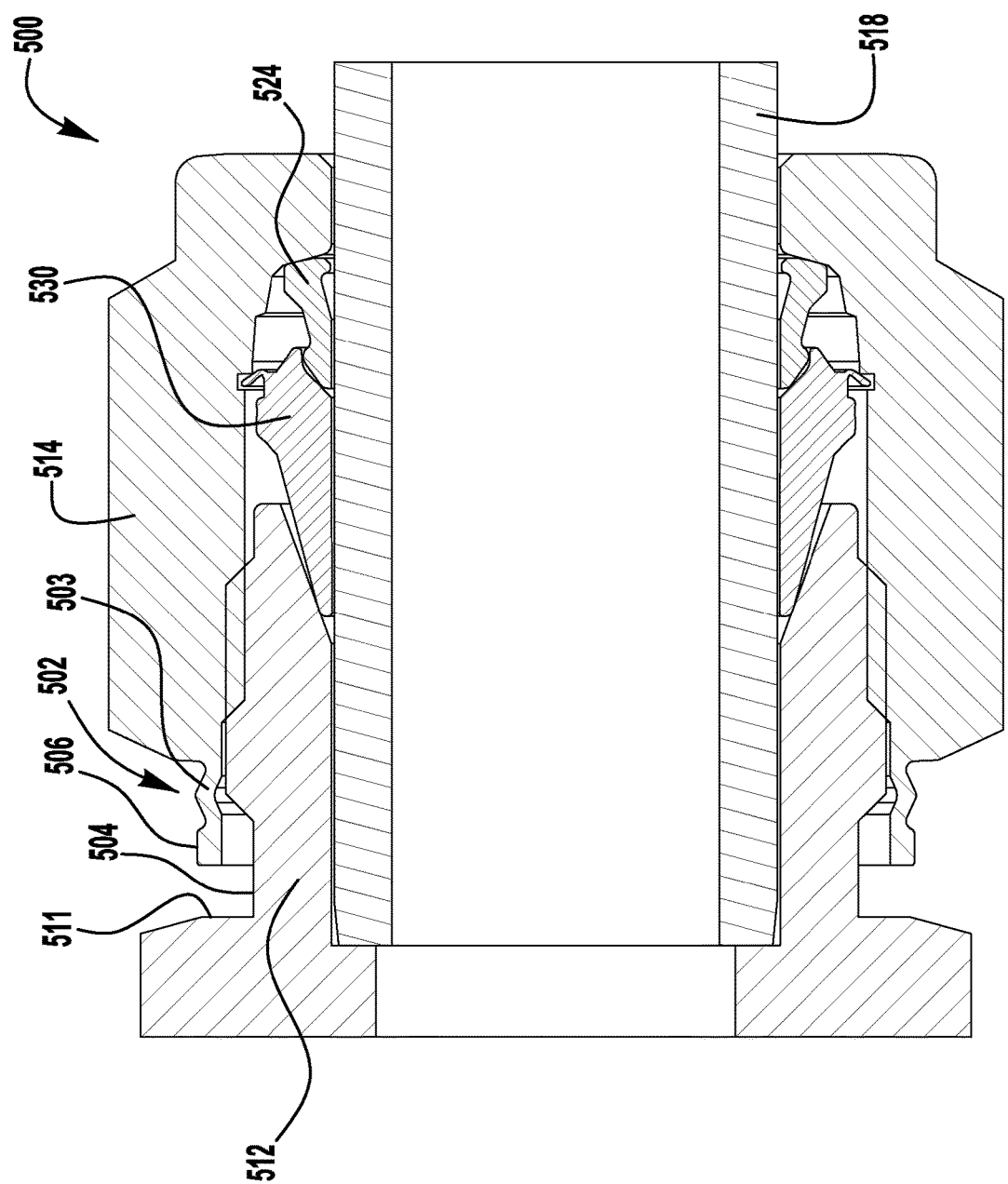

In still other embodiments, a ferrule retaining fitting nut, as described herein, may be provided with an integral torque collar or stroke resisting projection, similar to one or more of those described in the above incorporated '110 Application. FIG. 57 illustrates an exemplary fitting 500 including a fitting body 512, nut 514, and front and rear ferrules 524, 530 duplicating many of the features of the fitting components 212, 214, 224, 230 of the embodiment of FIGS. 17-21, as described in greater detail above. The nut 514 includes an integral torque collar in the form of an annular stroke resisting or stroke limiting member 502 including a radially extending flange portion 506 connected to an inboard end of the nut 514 by an axially deformable web portion 503. When the fitting is pulled up, once the flange portion 506 of the stroke resisting member 502 contacts a contacting surface 511 of the body 512, further relative rotation between the body 512 and the nut 514 applies an axial load or compression on the member 502. The resistance to axial deformation of the member (e.g., based on web portion wall thickness, materials used, contours and/or friction of interengaging surfaces) results in a measurable or noticeable increase in the assembly torque beyond this relative rotational position. The components may be designed, dimensioned, or otherwise configure to produce a measurable or noticeable increase in the assembly torque that is distinguishable from other torque increases corresponding to fitting pull-up (e.g. resistance of the ferrules to compression, bending of the front ferrule projection to disengage from the nut). Such an arrangement may be configured and used as described in the above incorporated '110 Application.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A preassembly for a conduit fitting, the preassembly comprising:
    an annular fitting component having an interior wall extending along a central axis from an inboard end to an outboard end, the interior wall including an inboard surface, an outboard surface and an intermediate surface recessed from the inboard surface by an outward facing inboard radial wall extending radially inward to a first diameter at an outboard edge of the inboard surface, and recessed from the outboard surface by an inward facing outboard radial wall extending radially inward to a second diameter at an inboard edge of the outboard surface, the second diameter being smaller than the first diameter; and
    at least a first conduit gripping device retained within the annular fitting component and including a projection extending radially outward of an outer circumferential surface of the first conduit gripping device; wherein when the projection is bent axially toward an inboard end of the first conduit gripping device, an end portion of the projection is configured to be axially captured between the inboard radial wall and the outboard radial wall;

wherein when the projection is bent axially toward an outboard end of the first conduit gripping device to a predetermined angle between about 30° and about 70° with respect to the central axis, the end portion extends radially outward to a diameter greater than the second diameter and smaller than the first diameter.

2. The preassembly of claim 1, wherein the projection extends at an angle between about 90° and about 130° with respect to the central axis.

3. The preassembly of claim 1, wherein the projection extends around an entire circumference of the outer circumferential surface of the first conduit gripping device.

4. The preassembly of claim 1, wherein the projection is plastically deformable about a radially inward hinge portion of the projection.

5. The preassembly of claim 4, wherein the hinge portion has a first thickness and the end portion has a second thickness greater than the first thickness.

6. The preassembly of claim 1, wherein when an outward axial force is applied to the first conduit gripping device to force the end portion of the projection against the outboard radial wall, the projection is bent axially inward to position the end portion of the projection at a third diameter smaller than the first diameter, to permit removal of the first conduit gripping device from the annular fitting component.

7. The preassembly of claim 1, further comprising a second conduit gripping device axially captured between the first conduit gripping device and an annular shoulder at the outboard end of the annular fitting component.

8. The preassembly of claim 7, wherein when the second conduit gripping device is axially positioned such that an outboard end surface of the second conduit gripping device abuts the annular shoulder of the annular fitting component, and the first conduit gripping device is axially positioned such that the end portion of the projection abuts the outboard radial wall of the annular fitting component, an outboard end surface of the first conduit gripping device abuts an inboard end surface of the second conduit gripping device.

9. The preassembly of claim 1, wherein the outboard radial wall extends at an angle between about 90° and about 135° with respect to the central axis.

10. The preassembly of claim 1, wherein the projection comprises a circumferential skirt having an inboard wall surface and an outboard wall surface together defining a thickness of the skirt.

11. The preassembly of claim 10, wherein the inboard wall surface and the outboard wall surface diverge from each other in a radially outward direction, such that an inner radial portion of the skirt has a smaller thickness than an outer radial portion of the skirt.

12. The preassembly of claim 10, wherein the inboard wall surface extends radially outward from the outer circumferential surface of the first conduit gripping device, and the outboard wall surface extends radially outward from an outboard end surface of the first conduit gripping device at a location radially inward of the outer circumferential surface.

13. The preassembly of claim 10, wherein when an outward axial force is applied to the first conduit gripping device to force an inner radial portion of the skirt axially outward of the outboard radial wall, the skirt is bent to engage a portion of the outboard wall surface with the outboard surface of the interior wall.

14. The preassembly of claim 10, wherein the outboard surface of the annular fitting component interior wall is tapered radially inward from the outboard radial wall.

15. The preassembly of claim 1, wherein the projection is plastically deformable about a radially inward first hinge portion of the projection and about a second hinge portion disposed radially between the first hinge portion and the end portion.

16. The preassembly of claim 15, wherein the first hinge portion has a first property and the second hinge portion has a second property different from the first property, such that when an outward axial force is applied to the conduit gripping device, engagement of the projection end portion against the outboard surface causes the second hinge portion to initially bend to a greater extent than the first hinge portion.

* * * * *